US 6,493,725 B1

(12) United States Patent
Iwai et al.

(10) Patent No.: US 6,493,725 B1
(45) Date of Patent: Dec. 10, 2002

(54) DATABASE MANAGING SYSTEM

(75) Inventors: Toshiyuki Iwai, Kyotanabe (JP); Kanji Nakagawa, Soraku-gun (JP); Hidetoshi Takizawa, Yamatokoriyama (JP); Kazushi Kamakura, Nara (JP); Fusayuki Fujita, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/311,302

(22) Filed: May 14, 1999

(30) Foreign Application Priority Data

| May 18, 1998 | (JP) | 10-135782 |
| May 18, 1998 | (JP) | 10-135786 |
| Jan. 13, 1999 | (JP) | 11-007034 |

(51) Int. Cl.$^7$ ............................................. G06F 17/30
(52) U.S. Cl. ........................ 707/200; 707/7; 707/8; 707/201; 709/103; 709/248
(58) Field of Search ............... 707/200, 6, 8, 707/201, 7; 709/103, 248

(56) References Cited

U.S. PATENT DOCUMENTS

| 5,684,984 A | * | 11/1997 | Jones et al. | 707/10 |
| 5,765,172 A | * | 6/1998 | Fox | 707/204 |
| 5,926,816 A | * | 7/1999 | Bauer et al. | 707/8 |
| 6,026,394 A | * | 2/2000 | Tsuchida et al. | 707/3 |
| 6,073,141 A | * | 6/2000 | Salazar | 707/204 |
| 6,081,806 A | * | 6/2000 | Chang et al. | 707/8 |
| 6,169,794 B1 | * | 1/2001 | Oshimi et al. | 379/207 |
| 6,223,187 B1 | * | 4/2001 | Boothby et al. | 707/201 |
| 6,226,650 B1 | * | 5/2001 | Mahajan et al. | 707/201 |
| 6,230,164 B1 | * | 5/2001 | Rekieta et al. | 707/201 |

FOREIGN PATENT DOCUMENTS

| JP | 9-6693 A | 1/1997 |
| JP | 10-149308 A | 6/1998 |

OTHER PUBLICATIONS

Hiketa et al., *Personal Information Manager for Multimedia PowerPIMM*, Sharp Gihou No. 68, Aug. 1998 (with partial translation).

* cited by examiner

*Primary Examiner*—John Breene
*Assistant Examiner*—Cheryl Lewis
(74) *Attorney, Agent, or Firm*—Nixon & Vanderhye P.C.

(57) ABSTRACT

Information processing devices each creates a dirty bit indicative of the presence or absence of update per tip in a sharing region, and updates the dirty bit in accordance with an operation on the tip. A synchronize processing section compares dirty bits of corresponding tips in a synchronous process so as to judge whether the tips have been updated in the both parties. When there is an update in the both parties, a priority side is decided in accordance with a predetermined rule, for example, such as the promoting side of the synchronous process before transmitting the entire contents of the tips. Further, the synchronous processing section sends the contents of the tip on the priority side to the information processing device on the non-priority side so as to replace the contents of the tip on the non-priority side, thereby realizing a database managing device capable of carrying out the synchronous process with a small effort and a small amount of communications data without increasing the size of the database even when plural data corresponding to each other are independently updated.

102 Claims, 52 Drawing Sheets

F I G. 6
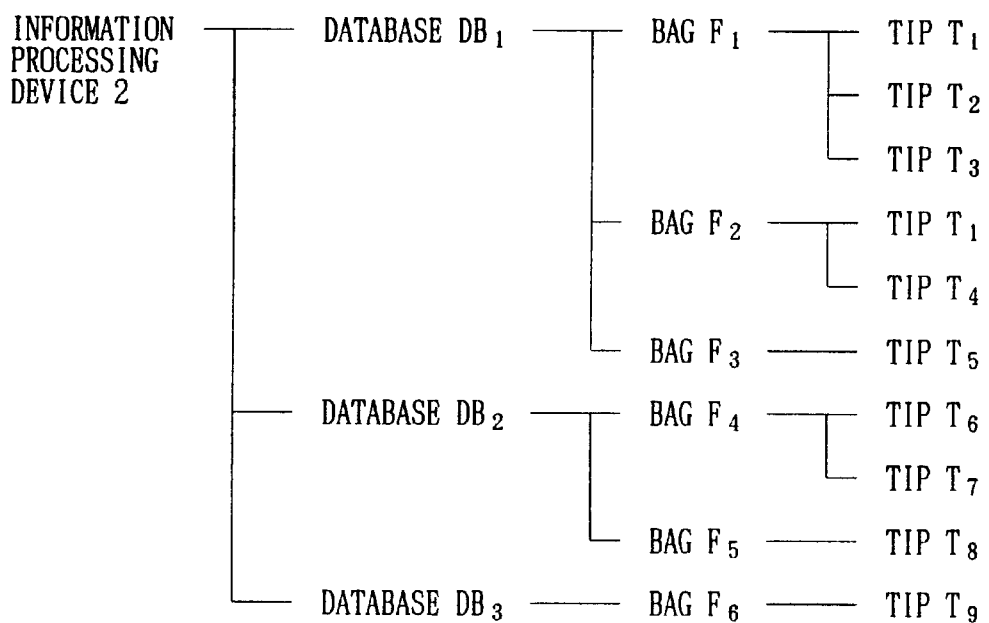

|  |  | ADDITION BIT BI | |
|---|---|---|---|
|  |  | ON | OFF |
| DELETION BIT BO | ON | K | O |
|  | OFF | I | X |

FIG. 14
[BEFORE SHARING SETTING]
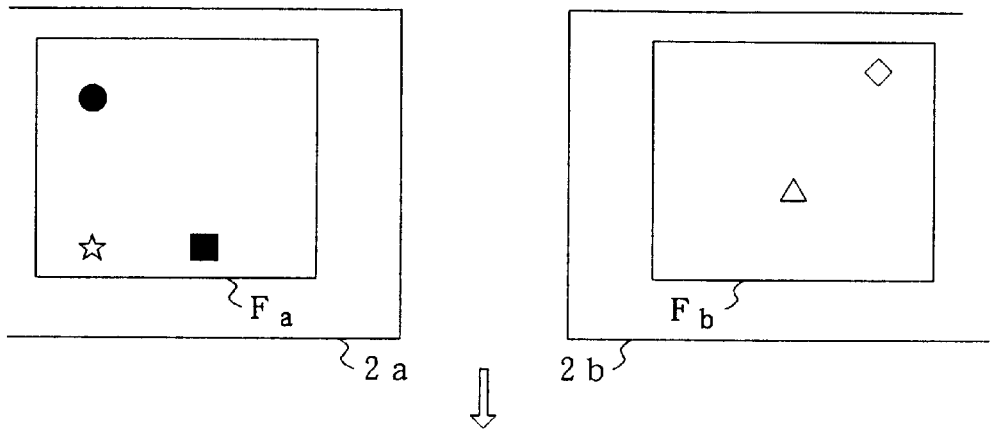
[AFTER SHARING SETTING]
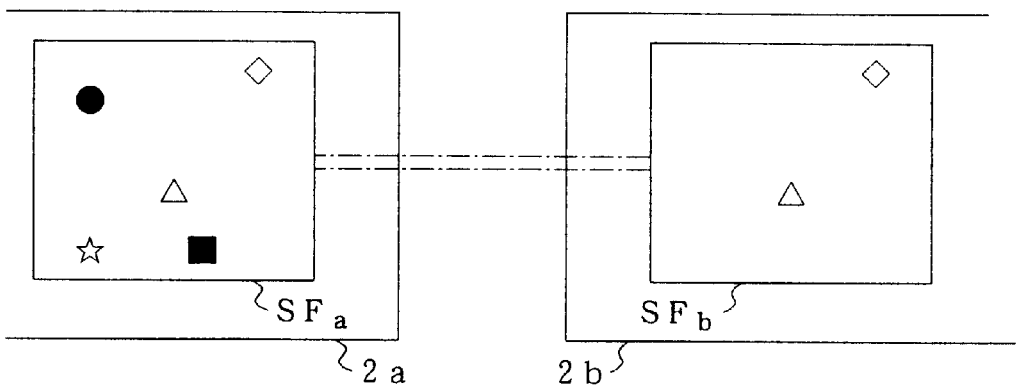

FIG. 15
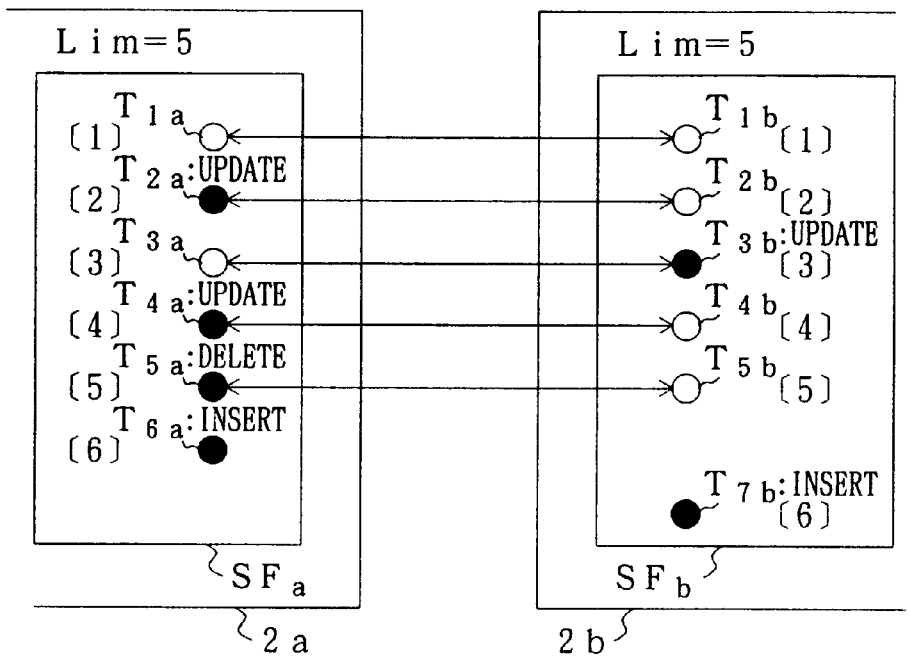
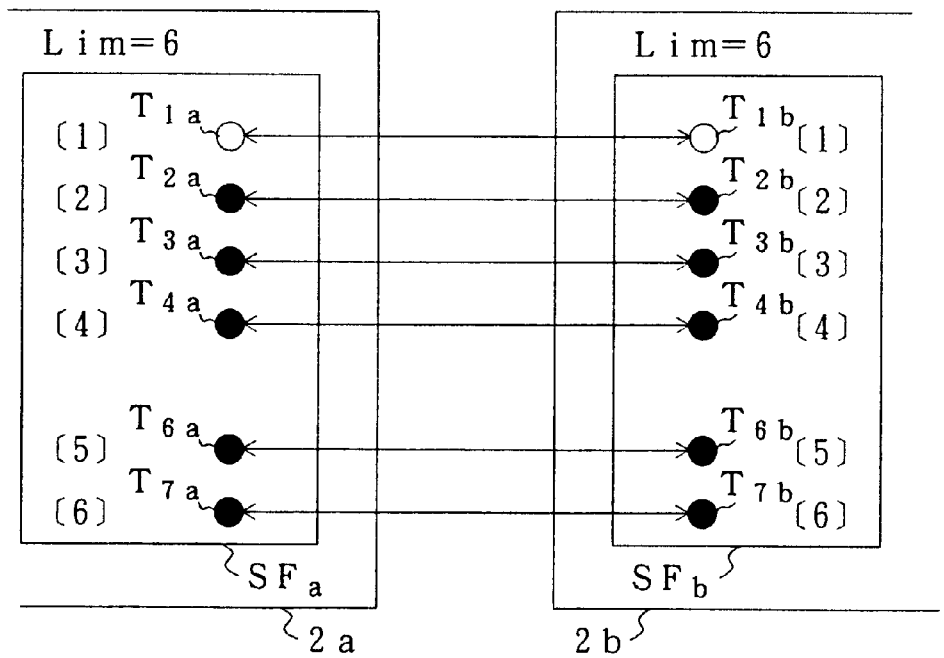

FIG. 18

[BEFORE SHARING SETTING]

2a    2b

[AFTER SHARING SETTING]

|  | MAINTAIN | | | UPDATE | | | OUTSIDE OF BAG | NO DIRTY BIT |
|---|---|---|---|---|---|---|---|---|
|  | STILL MAINTAIN | INSERT MAINTAIN | REMOVE MAINTAIN | STILL UPDATE | INSERT UPDATE | REMOVE UPDATE | NO EFFECT | |
|  | Xp | Ip | Op | Xm | Im | Om | K | |
| CREATE TIP | — | — | — | — | — | — | — | Im |
| UPDATE TIP | Xm | Im | Om | Xm | Im | Om | K | Im |
| DELETE TIP | Op | Op | Op | Om | Om | Om | K | — |
| INTO BAG | — | — | Ip | — | — | Im | Im | Im |
| OUT OF BAG | Op | Op | — | Om | Om | — | — | — |

MAINTAIN:p vs MAINTAIN:p → NO CONTENT UPDATE
MAINTAIN p

MAINTAIN:p vs UPDATE:m → CONTENT CONFORM
WITH UPDATE SIDE
MAINTAIN p

UPDATE:m vs UPDATE:m → COLLISION
MAINTAIN p

FIG. 41

|  |  | SOLUTION TIMING ||
|  |  | IMMEDIATE SOLUTION MODEL | DELAY SOLUTION MODEL |
| --- | --- | --- | --- |
| SOLUTION PARTY | TALK MODEL | NEGOTIATION SOLUTION MODEL | APPLICATION SOLUTION MODEL |
| | SELECTION SOLUTION MODEL | CLIENT SOLUTION MODEL | CLIENT DELAY MODEL |
| | AUTOMATIC SOLUTION MODEL | AUTOMATIC SOLUTION MODEL | |

FIG. 48

| | TIP $T_{8a}$ OF INFORMATION PROCESSING DEVICE 2a | TIP $T_{8b}$ OF INFORMATION PROCESSING DEVICE 2b |
|---|---|---|
| PREVIOUS SYNCHRONOUS PROCESS TIME | JANUARY 1 0:00 ||
| UPDATED TIME | JANUARY 2 21:00 | |
| | | JANUARY 20 11:00 |
| | | FEBRUARY 3 6:00 |
| | MARCH 30 18:00 | |
| CURRENT SYNCHRONOUS PROCESS TIME | APRIL 1 0:00 ||
| RESULT OF DECISION ON PRIORITY SIDE | TIP $T_{8a}$ IS NEWER (PRIORITY) ||

FIG. 50
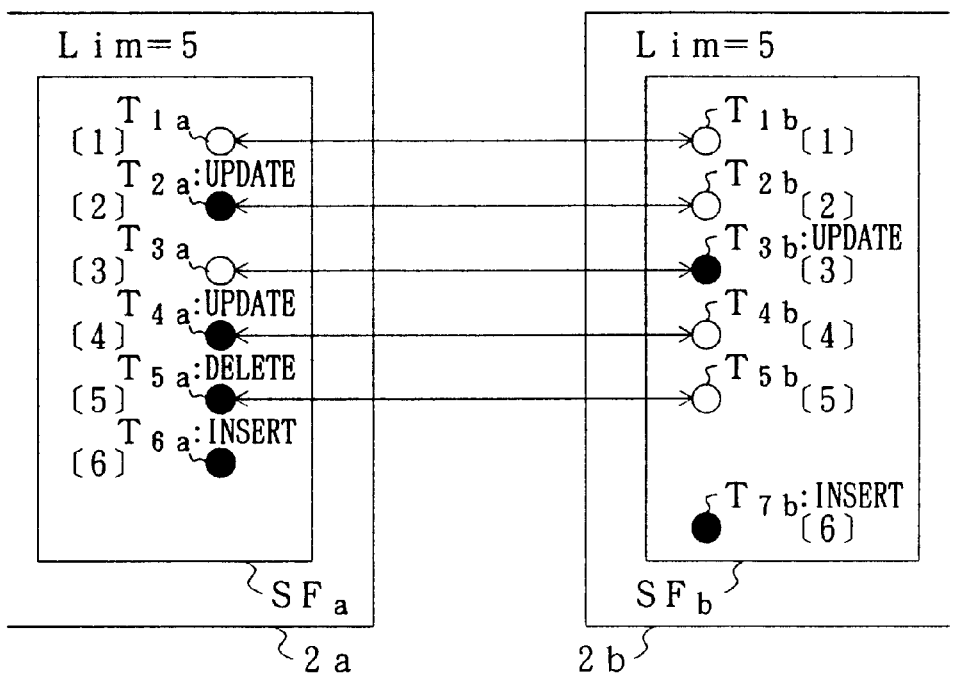
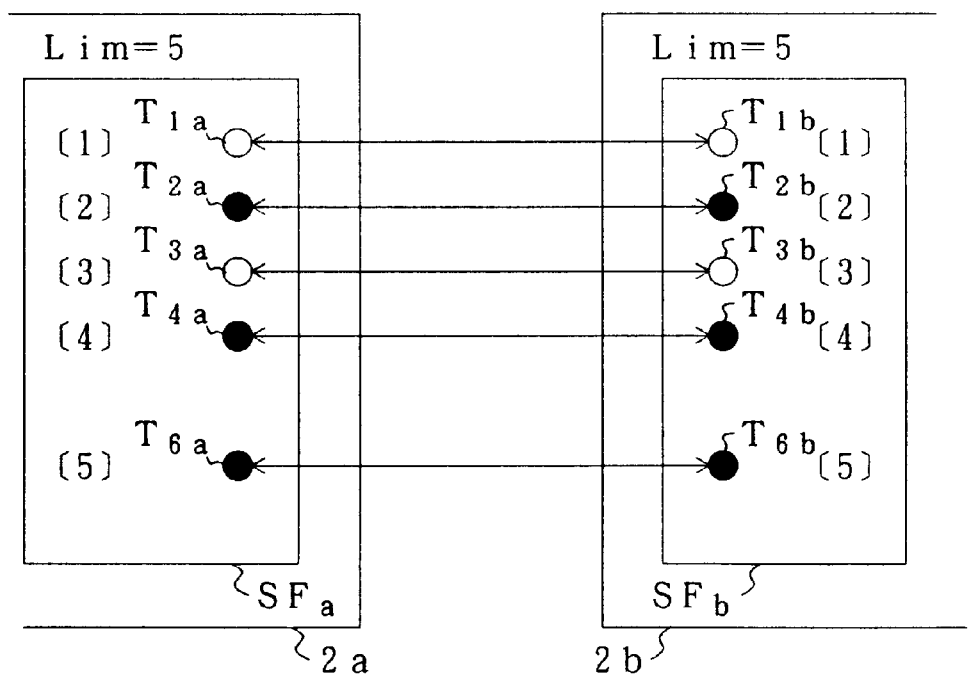

FIG. 52
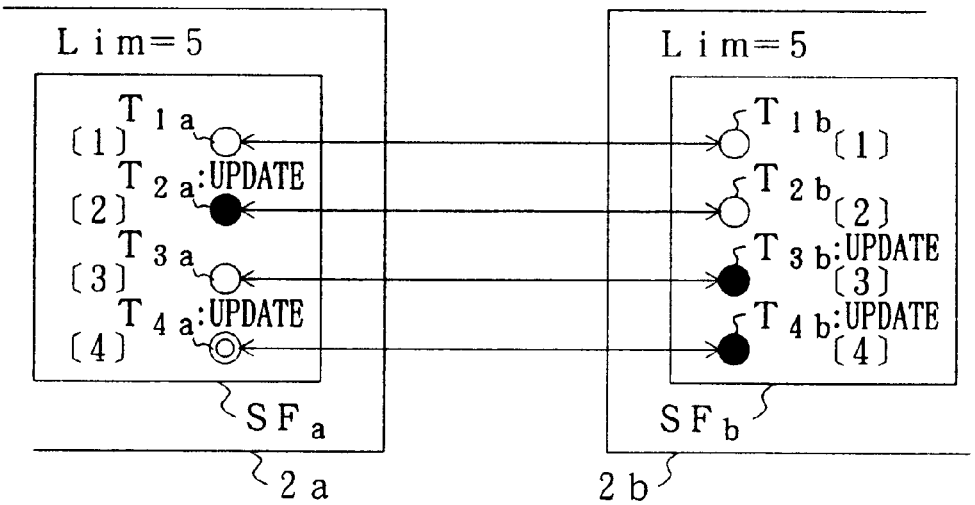
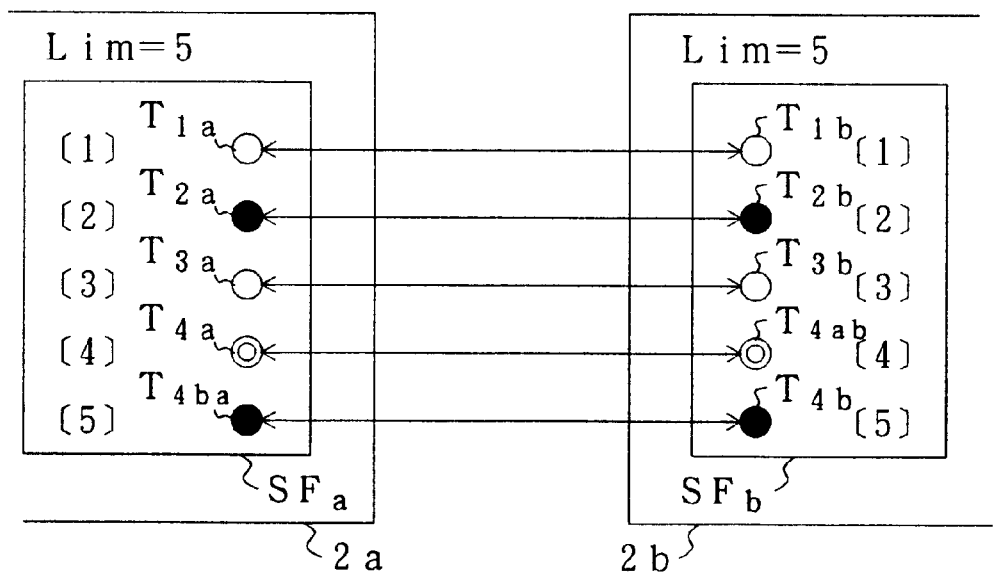

FIG. 54
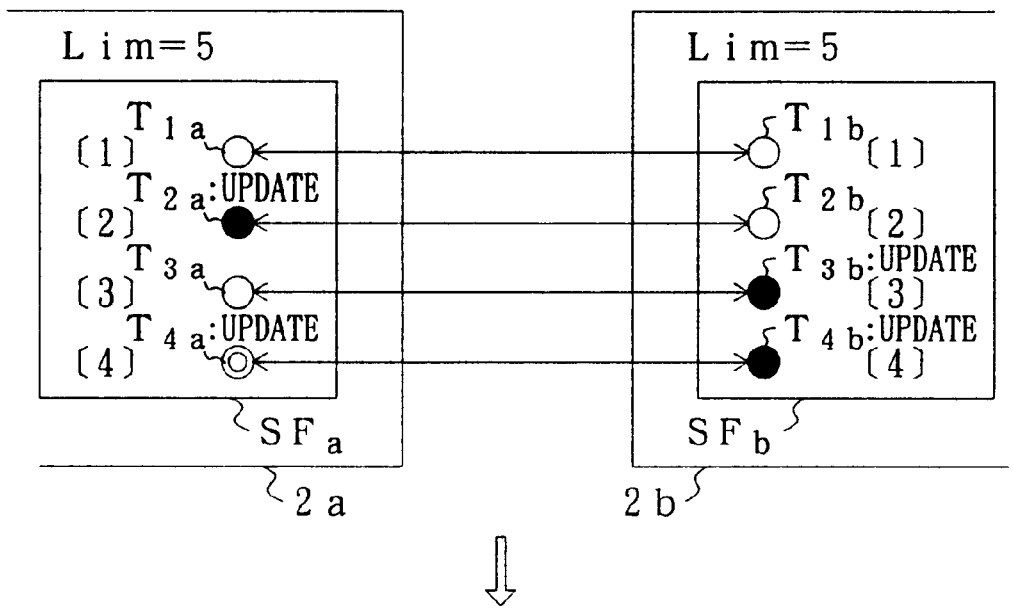
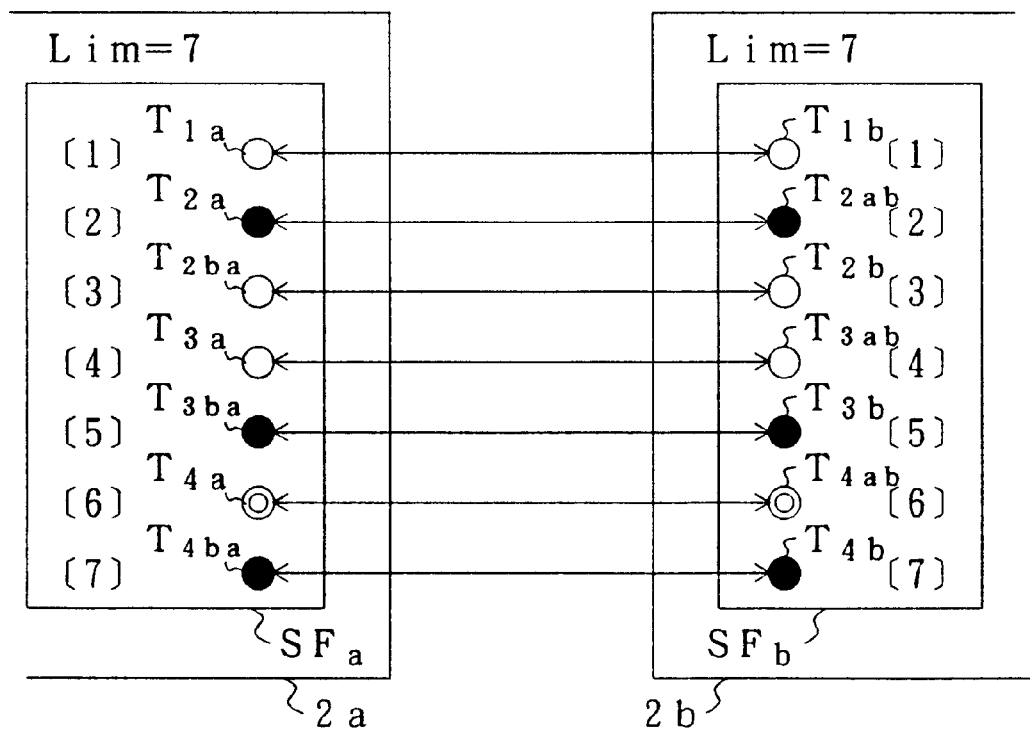

INFORMATION ──── DATABASE $DB_1$ ( BAG $F_1$ ) ─┬─ TIP $T_1$
PROCESSING                                      └─ TIP $T_2$
DEVICE 12

FIG. 64

|  | MAINTAIN ||| UPDATE ||| OUTSIDE OF BAG | NO DIRTY BIT |
|  | STILL MAINTAIN | INSERT MAINTAIN | REMOVE MAINTAIN | STILL UPDATE | INSERT UPDATE | REMOVE UPDATE | NO EFFECT | |
|  | Xp | Ip | Op | Xm | Im | Om | K | |
| CREATE TIP | — | — | — | — | — | — | — | Im |
| UPDATE TIP | Xm | Im | Om | Xm | Im | Om | K | Im |
| DELETE TIP NO DELETION OF ENTITY | Op | Op | Op | Om | Om | Om | K | — |
| DELETE TIP DELETION OF ENTITY | K | K | K | K | K | K | K | — |
| INTO BAG | — | — | Ip | — | — | Im | Im | Im |
| OUT OF BAG NO DELETION OF ENTITY | Op | Op | — | Om | Om | — | — | — |
| OUT OF BAG DELETION OF ENTITY | K | K | — | K | K | — | — | — |
| DELETE ENTITY OF TIP OUTSIDE OF BAG | — | — | K | — | — | K | — | — |

DATABASE MANAGING SYSTEM

FIELD OF THE INVENTION

The present invention relates to a database managing system for making the same contents between parties which are ready to communicate, and particularly to a database managing system capable of reducing the amount of data transmitted or processed during a synchronous process.

BACKGROUND OF THE INVENTION

Conventionally, information processing devices have been in wide use, and it is not rare in recent years for one individual to own a plurality of information processing devices, for example, such as a high-performance information processing device like a desk-top personal computer and a portable information processing device like a portable information terminal. When personal information, for example, such as schedules and address book are to be managed by these plurality of information processing devices, there is a need to maintain the same contents of data in any of databases provided in these information processing devices. Thus, in the case of managing, for example, personal information between a personal computer and a portable information terminal, a master database is managed by the personal computer and the data of the master database are copied to the database (portable database) of the portable information processing device, thus carrying the personal information.

In this manner, when managing the same data between a plurality of database managing devices, when the data are changed in one database managing device, it is required to update the database of all the other database managing devices. Here, if each database managing device is in communications all the time, the change in data is immediately reflected in each one of these devices when the updated database managing device informs the other database managing devices that the data have been changed. However, it is not always the case that each database managing device is in communications all the time with the other devices, for example, as in the case where the database managing device is a portable information terminal. In such a case, a change in data in one device is not reflected in the databases of the other database managing devices at the time when the change is made. Thus, in order to maintain the same database, it is required to carry out a process for making the same contents of database between parties at the time when communications are made between the database managing devices; namely, a synchronous process is required.

In the case of the above example, when data are changed in the portable information terminal, a synchronous process is carried out at the time when the portable information terminal is brought back to home or office, in which the data become the same between the portable database of the portable information terminal and the master database of the computer.

As an example of a conventional synchronous process, upload and download are known. Specifically, when data are changed in the personal computer, the contents of the master database are copied to the portable information terminal (download). On the other hand, when data are changed in the portable information terminal, the contents of the portable database are copied to the personal computer (upload).

Another example is a synchronous process employing a sum of sets. In this synchronous process, the contents of the both databases are compared at the time when communications are made between the two database managing devices, and a sum of sets, which contains all the information added to each database is created as a new database. Thereafter, the database thus created is stored the both database managing devices.

For example, when the both databases initially contain data "A", and data "B" is added to one database managing device X, and data "C" is added to the other database managing device Y, the database managing device X sends its contents "A+B" to the database managing device Y. The database managing device Y creates a sum of sets "A+B+C" of the data "A+B" received and its contents "A+C" and stores the sum of sets as a database. The database managing device Y then sends the contents of the database "A+B+C" back to the database managing device X. As a result, the contents of the database of the database managing device X are updated to "A+B+C", which are the same as that of the database managing device Y.

However, the conventional database managing device carrying out the described synchronous process has a problem that the data amount (communications volume) transmitted between the database managing devices in the synchronous process and the data amount computed in each database managing device are extremely large.

Specifically, in download and upload, all the contents of one of the databases are transmitted to the other database managing device regardless of the number of data updated. For example, in the case of a database having the data of 1000 items, the data of all the 1000 items are sent even when only one item is changed. As a result, the communications volume transmitted between the database managing devices is increased. Further, in the database managing device on the receiving side, the contents of the database are replaced with the database on the sending side, and thus a change in data on the receiving side is lost.

Also, in the synchronous process employing a sum of sets, in order to create a sum of sets, a database of one party is sent to the other database, and the sum of sets created is sent back as a new database. Thus, in this synchronous process, all the contents of the database are required to be sent back and forth between the database managing devices, and this further increases the communications volume in the synchronous process.

Further, in the case where the data are deleted only in one of the devices, the data remain in the other device. Thus, the data are included again in a new database and are not deleted. As a result, the memory space required for storing the database is increased, and the communications volume in the synchronous process is further increased.

In order to solve these problems, another example of the synchronous process is disclosed, for example, in Japanese Unexamined Patent Publication No. 6693/1997 (Tokukaihei 9-6693), in which update information indicative of a change or no change in data is given to all the data contained in the database. Specifically, each database managing device stores, per each data stored in the database, ID information for identifying the data and update information indicative of no change/correction/addition/deletion, and when the data are changed, the update information corresponding to the data is updated. Also, in the synchronous process, one database managing device informs the other database managing device the ID information and update information of all data. The database managing device on the receiving side searches through its database data corresponding to the data of the sending side based on the ID information received so as to compare the update information of the both sides. When a change is made only on one side, unchanged data are replaced with the data changed. When there is a change on the both sides, the data of one party are added to the database of the other party, and vice versa. With this arrangement, in the case where there is no change of data in any of the database managing devices, sending of such data can be omitted, thus reducing the communications volume in the synchronous process.

Even so, with the above arrangement, when correction of data is made on the both sides, the data corrected in one device are added to the other database, and vice versa, and the number of data contained in the database is increased. As a result, the memory space required for storing the database is increased, resulting in an increase in communications volume. Further, in order to suppress an increase in the number of data, it is required to delete unnecessary data after the synchronous process. However, this operation is troublesome because it is required to extract data to which correction was made in each party and compare the data of the both parties thus extracted, and the data to be deleted need to be specified. Further, this operation is usually made on one database managing device, and for this reason there is a need to reflect deletion of data in the other database managing device, and as a result the communications volume between the database managing devices are further increased.

Furthermore, in the case where whether to carry out the synchronous process is set in the database unit, it is also required to carry out the synchronous process with respect to data which do not require the synchronous process, or create a new database composed only by data which require the synchronous process. Also, in the case where whether to carry out the synchronous process is instructed per data, the process becomes very troublesome.

Furthermore, it is required to transmit ID information and update information with respect to the entire database. Also, when correction is made on the both sides, there is a need to add the data corrected in one device to the other database, and vice versa. Thus, in effect, the communications volume in the synchronous process is not actually reduced.

SUMMARY OF THE INVENTION

A first object of the present invention is to provide a database managing device which is capable of carrying out a synchronous process with a small effort and a small amount of communications data without resulting in an increase in size of a database even when plural data corresponding to each other are independently updated.

A second object of the present invention is to provide a database managing device in which a memory space required for storing the presence or absence of data change is small and the amount of data transmitted and processed in the synchronous process can be further reduced.

A third object of the present invention is to provide a database managing device which is capable of carrying out the synchronous process with a small amount of communications data without resulting in an increase in size of a database even when plural data corresponding to each other are independently updated, and which is also capable of operating the synchronous process, and sharing setting and sharing release before and after the synchronous process, respectively, with a small effort.

A database managing device of the present invention is for constituting a database system which includes a plurality of database managing devices and a synchronous process section for making a coincidence of corresponding data between databases respectively stored in the plurality of database managing devices which are ready to communicate, and in order to achieve the first object, the database managing device includes: at least one database; a state information storing section for storing state information indicative of a change in data which occurs in a non-synchronous period between a previous synchronous process and a next synchronous process, the state information storing section storing the state information per data corresponding to data of a database of another party; a collision detecting section for detecting in a synchronous process whether data changed in a pair of the corresponding data are plural based on state information of each data of the pair; and a priority side deciding section for deciding, when data changed are plural, which of the data should be given a priority before transmitting all contents of the plural data changed so that data contents on a non-priority side are replaced with data contents on a priority side by the synchronous process section.

With this arrangement, when a collision of data occurs, data to be given a priority is decided before transmitting the entire contents of the data, and the entire contents of data are transmitted in one direction from a database managing device on a priority side to a database managing device on a non-priority side. Thus, compared with the case where the contents of data are replaced by deciding the priority side after transmitting the entire contents of data, the amount of data transmitted and processed between database managing devices can be reduced. Further, because the priority side is decided at the time of the data collision, the number of data contained in the database of each database managing device does not increase even when the data are updated in a plurality of database managing devices. As a result, the memory space required for storing the database and the amount of data transmitted and processed in the synchronous process can be reduced.

Also, a database managing device in accordance with another preferable embodiment of the present invention is for constituting the database system, and in order to achieve the second object, includes: at least one database; a sub set setting section for setting a sub set in the at least one database, the sub set being set as a sharing region with a database of another party; a state information storing section for storing state information with respect to data which had been contained in the sub set at least at a time when a previous synchronous process was finished, the state information including (a) update information indicative of whether the data had been updated in a non-synchronous period and (b) movement information indicative of whether the data had been moved in and out of the sub set in the non-synchronous period; and a state information update section for monitoring data whose corresponding state information is stored in the state information storing section so as to update respective state information of the data in the non-synchronous period.

Thus, it is possible to identify with certainty data which exist both in the previous synchronous process and the next synchronous process, and whose contents are not changed (updated) between the both processes, even with respect to data which were moved in and out of the sub set. As a result, the amount of data transmitted to the database managing device of another party and the amount of data processed in the synchronous process can be reduced.

Also, a database managing device in accordance with still another preferable embodiment of the present invention is for constituting the database system, and in order to achieve the second object, includes: at least one database; an order storing section for storing an order of data which are contained at least in a sharing region of the database managing device and for setting a same order of data with that of another party in a previous synchronous process; a corresponded order storing section for storing a corresponded order indicative a last position of the order in the previous synchronous process; and an order managing section for managing an order of data so that the corresponded order and an order before the corresponded order of the order stored in the order storing section are maintained in a non-synchronous period, and data newly contained in the sharing region in the non-synchronous period are placed after the corresponded order.

With this arrangement, each database managing device stores the correspondence as an order of data which are stored therein. Thus, compared with the case of storing the correspondence as correspond information indicative of the data of another party, the memory space required for storing the correspondence and the arithmetic volume in the synchronous process can be reduced, and it is also possible to reduce the amount of data transmitted and processed in the synchronous process.

A database managing device in accordance with yet another preferable embodiment of the present invention is for constituting the database system, and in order to achieve the third object of the present invention, includes: a plurality of priority side deciding sections for deciding a priority side when data changed in the corresponding data are plural in a non-synchronous period, and for instructing the synchronous process section to replace data contents on a non-priority side with data contents on a priority side; and a selecting section for selecting one of the plurality of priority side deciding sections to be used, the selecting section making the selection at the time of sharing setting for specifying before the synchronous process the sharing regions, which store corresponding data, between the databases.

With this arrangement, when a collision of data occurs, the contents of data on the non-priority side are replaced with the contents of data on the priority side. Therefore, the number of data in the database and the amount of data transmitted and processed in the synchronous process can be reduced, and it is also possible to reduce the steps of the operation compared with the conventional technique in which individual data are deleted after the synchronous process. Also, because the priority side deciding section is selected at the time of the sharing setting, each database managing device can refuse the use of an undesirable priority side deciding section, thus realizing a safer database system.

A database managing device in accordance with still another preferable embodiment of the present invention is for constituting the database system, and in order to achieve the third object, includes: at least one database; and a priority side deciding section for deciding, when data changed in the corresponding data are plural in a non-synchronous period, a priority side based on a database managing device which instructed a start of the synchronous process or sharing setting, and the priority side deciding section for instructing the synchronous process section to replace data contents on a non-priority side with data contents on a priority side.

With this arrangement, when a collision of data occurs, the contents of data on the non-priority side are replaced with the contents of data on the priority side, thus reducing the number of data in the database and the amount of data transmitted and processed in the synchronous process. Also, because the start of the synchronous process and specifying of sharing setting can be instructed by the same operation as specifying of the priority side, the steps in the operation can be further reduced.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory drawing of a tree structure composed of tips, bags, and databases, showing how tips are stored.

FIG. 14 is an explanatory drawing showing sharing setting of a bag fused model in the database system.

FIG. 15 is an explanatory drawing showing a synchronous process in the database system.

FIG. 18 is an explanatory drawing showing sharing setting of a new bag creating model as another modification example of the database system.

FIG. 19 is an explanatory drawing showing a change in dirty bits in response to various operations in a non-synchronous period in the database system.

FIG. 41 is an explanatory drawing showing a relationship between a solution party and a solution timing of a tip collision in the database system.

FIG. 48 is an explanatory drawing showing how each tip is updated in the database system.

FIG. 50 is an explanatory drawing showing a download in the database system.

FIG. 52 is an explanatory drawing showing the case of changing a correspondence by copying when the tips collide in the database system.

FIG. 54 is an explanatory drawing showing the case of changing a correspondence by copying when the tips are changed in the database system.

FIG. 64 is an explanatory drawing showing, as a modification example of the present invention, a change in dirty bit in response to various operations in the non-synchronous period in the database system.

DESCRIPTION OF THE EMBODIMENTS

[First Embodiment]

The following will describe one embodiment of the present invention referring to FIG. 1 through FIG. 61, and FIG. 64 through FIG. 72. Namely, a database system in accordance with the present embodiment is a system which is suitably adopted when there is a need to maintain the same contents of corresponding data between a plurality of databases, each of which can update its data independently, whose communications time is limited, for example, as in the case where personal information is managed by a plurality of database managing devices. The system structure may vary, and in the present embodiment, explanations will be given through the case where the system is composed of portable information terminals; namely, a database system which is composed of equivalent database managing devices.

Figure 2:
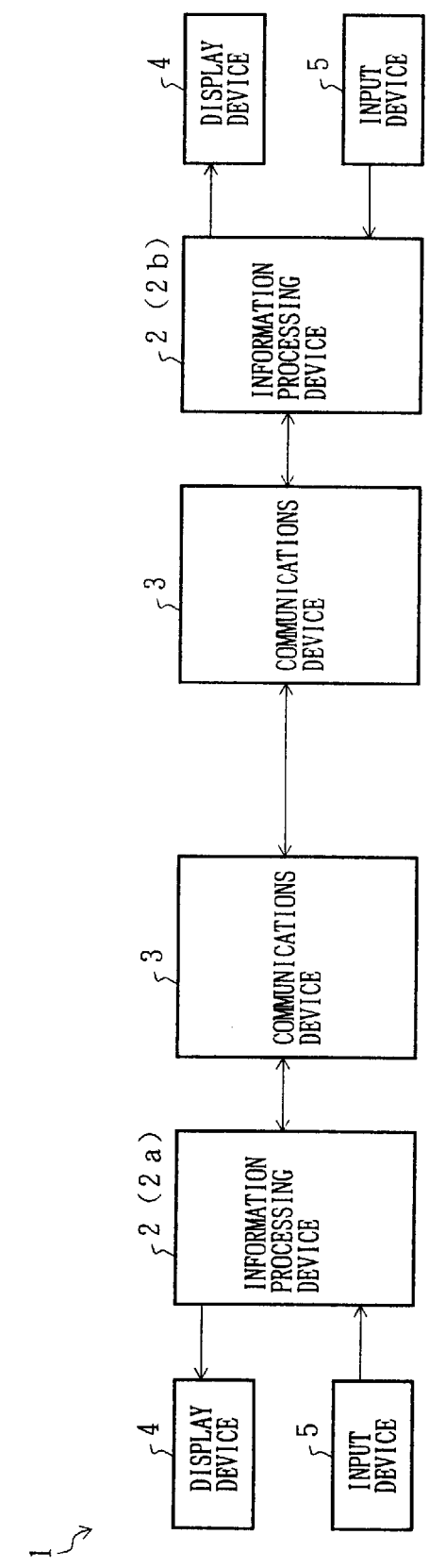
FIG. 2 is a block diagram showing an example of a database system constituted by using the information processing device.

Specifically, for example, as shown in FIG. 2, a database system 1 in accordance with the present embodiment includes information processing devices (database managing devices) 2 for storing databases, and each information processing device 2 is connected to a communications device (communications means) 3 for communicating with the other information processing device 2, and to a display device 4 and an input device 5 for performing input and output processes with the user.

The communications device 3, for example, is an interface such as a LAN interface or an RS232C interface, a modem, an IR ray transmitter, or a radio wave transmitter, and can communicate with the other communications device 3 via at least one of various communications media, such as a cable, a public telephone line network, an IR ray, and a radio wave in accordance with an instruction from the information processing device 2. The display device 4, for example, is a CRT display or a liquid crystal display, and can display various information such as database contents of the information processing device 2 and the results of operation on the database, in accordance with an instruction from the information processing device 2. The input device 5, for example, is a keyboard, a mouse, a pen, or a touch panel provided on the display device 4, and allows an input of user's instruction to the information processing device 2.

Figure 1:
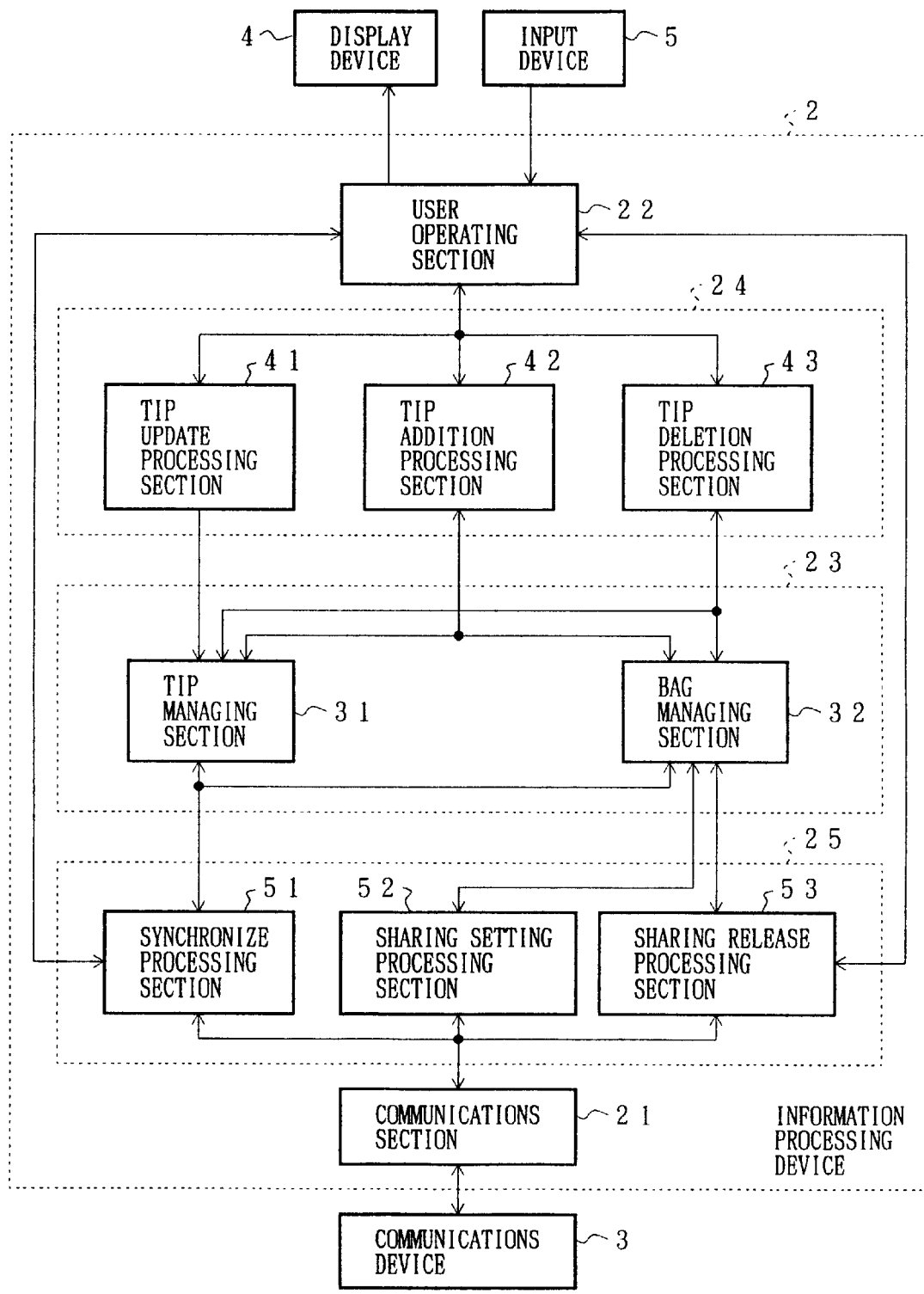
FIG. 1 is a block diagram showing a main component of an information processing device in accordance with one embodiment of the present invention.

As shown in FIG. 1, the information processing device 2 in accordance with the present embodiment includes a communications section 21, connected to the communications device 3, for communicating with the other information processing device 2 via the communications device 3, a user operating section 22, connected to the display device 4 and the input device 5, constituting a user interface, a database managing section 23 storing database DB, a database processing section 24 for controlling the database managing section 23 in accordance with an instruction from the user operating section 22, and a synchronizing section 25 for controlling the communications section 21 and the database managing section 23 so as to perform a process associated with a synchronous operation with the other database DB. These members may be realized by hardware, or by functional blocks which are realized by execution of a predetermined program by a CPU. The latter is easier because it can realize the above members by providing a recording medium storing the predetermined program and only by running the recording medium on a computer which can read such a recording medium. Note that, the database managing section 23 corresponds to a database, state information storing means, order storing means, and corresponded order storing means of the claims, and the database processing section 24 corresponds to state information update means and order managing means of the claims.

Figure 3:
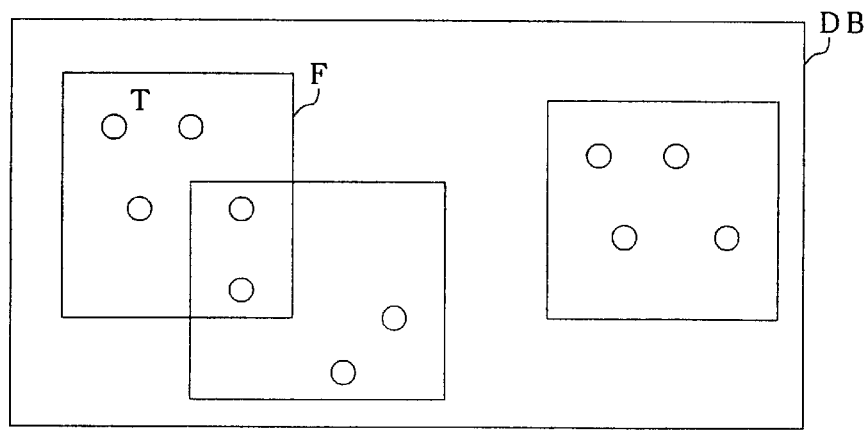
FIG. 3 is an explanatory drawing showing a relationship between a tip indicative of single data and a bag which is a set of tips.

In the present embodiment, as shown in FIG. 3, the database DB is managed in the unit of a tip T, indicative of single data, and a bag F, which is a set of tips T, and the database managing section 23 includes a tip managing section 31 and a bag managing section (subset setting means) 32 for storing a database. The database processing section 24 includes a tip update processing section 41, a tip addition processing section 42, and a tip deletion processing section 43 for updating, adding, and deleting the tip T, respectively. Note that, the database processing section 24 also includes members associated with other operations of the database DB, for example, such as searching and displaying of the tip T, and changing of the relationship of inclusion between the tip T and the bag F. As a result, it is possible to generate a bag F by searching a tip T which satisfies a predetermined condition, such as a tip T with predetermined contents, and select a predetermined tip T from displayed tips T and insert the tip T thus selected into a predetermined bag F.

The synchronizing section 25 includes a synchronize processing section 51 for subjecting tips T to a synchronous process, a sharing setting processing section 52 for carrying out sharing setting (mentioned later) prior to the synchronous process, and a sharing release processing section 53 for releasing the sharing setting, for example, when the synchronous process is no longer required. Note that, the synchronize processing section 51 corresponds to synchronous process means, correspond means, judging means, inside-outside synchronous process means, priority side judging means, data contents synchronizing means, data adding means, added data correspond means, corresponded order update means, and first and second order deleting means of claims. Also, the structures of the database processing section 24 and the synchronizing section 25 are closely associated with the data stored in the database managing section 23, and they are characterized by the operations which are heavily based on the data stored in the database managing section 23. Thus, the following explanations only deal with the structure of the database managing section 23, and the structures of the database processing section 24 and the synchronizing section 25 will be described in relation to their operations.

Figure 4:
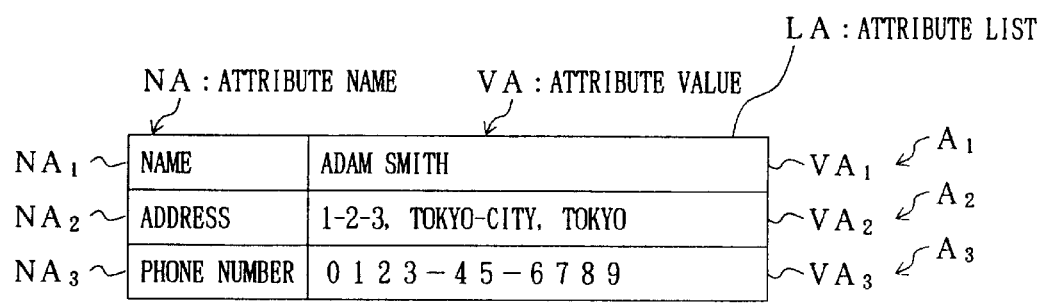
FIG. 4 is an explanatory drawing showing how tips are stored in the information processing device.

Specifically, the tip managing section 31 manages single data with a data structure called a "tip". Each tip T includes a tip ID for distinguishing itself from the other tips T in the database DB, and an attribute list LA containing single data. As shown in FIG. 4, the attribute list LA stores a list in a combination of attribute name NA indicative of a type of attribute A, and attribute value VA indicative of a value of attribute A in the data stored in the tip T.

For example, in the case of storing addresses in the database DB, each tip T corresponds to single address data. When the address data are composed of three kinds of data, indicative of name, address, and phone number, respectively, each tip T is defined as a set of three attributes $A_1$ through $A_3$ of the name, address, and phone number, and the attribute list LA of the tip T is represented by a list as shown in FIG. 4, in which combinations of attribute name NA and attribute value VA are listed in an orderly manner. For example, the attribute list LA of a first tip stores, as attribute A1, a combination of attribute $NA_1$ "Name" and attribute value $VA_2$ "Adam Smith". In the same manner, a combination of "Address" and "1-2-3, Tokyo City, Tokyo", and a combination of "Phone Number" and "0123-45-6789" are stored in the attribute list LA.

Figure 5:
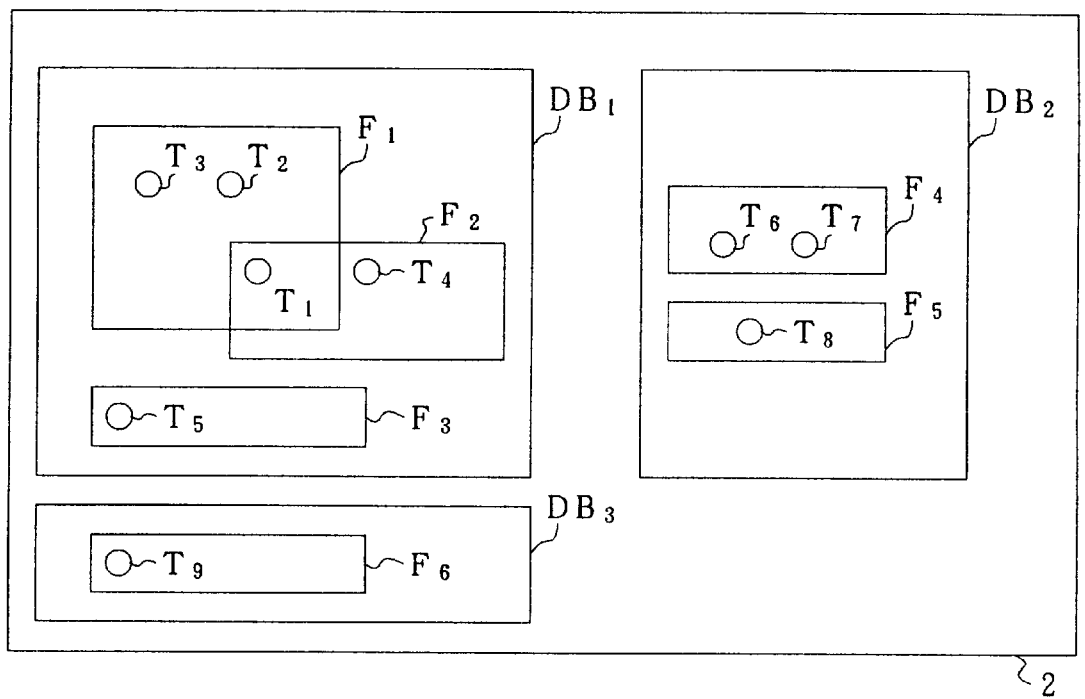
FIG. 5 is an explanatory drawing showing a relationship between tips, bags, and a database in the information processing device.

The bag managing section 32 stores bags F contained in the database DB and the relationship of inclusion between each tip T and the bags F. As shown in FIG. 5, for example, in the case where a single information processing device 2 contains a plurality of databases $DB_1$, $DB_2$, and $DB_3$, a relationship of information processing device 2∋database DB∋bag F∋tip T is established. The bag managing section 32 stores this relationship in the form of tree structure S as shown in FIG. 6.

In the tree structure S, a tip T may be contained in a single bag F, as with the tip $T_2$ contained in the single bag $F_1$, or contained in a plurality of bags, as with the tip $T_1$ in the bags $F_1$ and $F_2$. Thus, the tip $T_1$ contained in a plurality of bags $F_1$ and $F_2$ can be represented as shown in FIG. 5.

Note that, as long as the tree structure S is stored, the entire tree structure S may be stored, or the tree structure S may be stored in the form of a plurality of lists by dividing it into a list of databases DB contained in the information processing device 2, a list of bags F per each database DB, and a list of tips T per each bag F. In the present embodiment, as with the tip T, an ID is also given to each of the information processing device 2, the database DB, and the bag F to distinguish them from the others, and thus the lists of the information processing device 2, the database DB, and the bag F are stored as the lists of IDs. Note that, when the information processing device 2, the database DB, and the bag F are stored in the form of lists, while a tip T contained in a certain bag F can be found immediately by referring to the lists, a bag F containing the tip T results in the worst case and it is required to search all the lists. Thus, when a shorter search time is required, it is preferable to provide a list of bags F containing the tip T per each tip T, in addition to the lists as described above.

Figure 7:
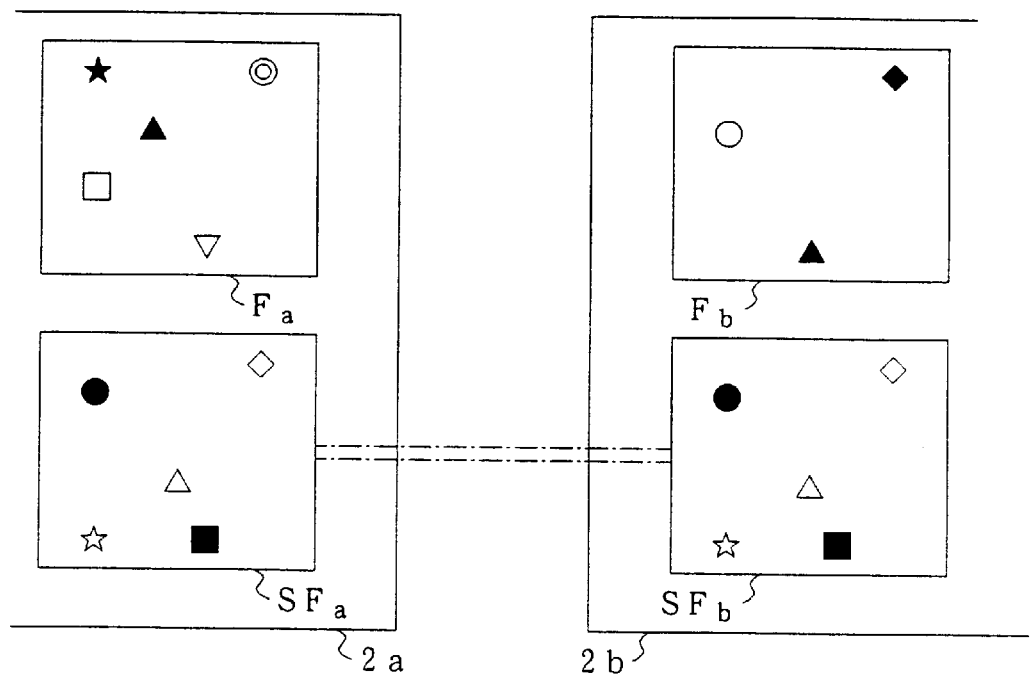
FIG. 7 is an explanatory drawing showing a relationship between a sharing bag to be a sharing region of the information processing device and a sharing bag of another information processing device in the database system.

In the database system 1 in accordance with the present embodiment, as shown in FIG. 7, a region (sharing region) subject to the synchronous process is determined in the unit of a bag F, and whether or not a tip T is shared between databases DB is determined by whether the tip T belongs to a bag (sharing bag SF), to which sharing has been set beforehand.

As a rule, an access to the other information processing device 2 via a device such as the communications device 3 is considerably slow as compared with the case where an access is made internally within the information processing device 2, and for this reason the time required for the synchronous process tends to be long. Therefore, there is a need to reduce the time required and the amount of data transferred between the information processing devices 2a and 2b. Note that, an internal access within the information processing device 2 is relatively fast, and thus there is no large increase in processing time even when the volume of processes in a period (non-synchronous period) between a previous synchronous process and a next synchronous process is increased.

The bag managing section 32 in accordance with the present embodiment stores a dirty bit list LD composed of dirty bits D, each indicative of the state of each tip T in the non-synchronous period, so as to reduce the amount of data. The dirty bit list LD is managed such that the order of dirty bits D in one information processing device 2 is the same as that of the dirty bits D in the other information processing device 2 between corresponding tips T, and as will be described later, the dirty bit list LD also indicates a correspondence of tips T. The bag managing section 32 also stores a sink limit Lim indicative of the number of tips T which were made corresponded in the previous synchronous process, so that it is possible to judge whether the tips T corresponding to dirty bits D have already been made corresponded to the tips T of the sharing bag SF of the other information processing device 2.

Figure 8:
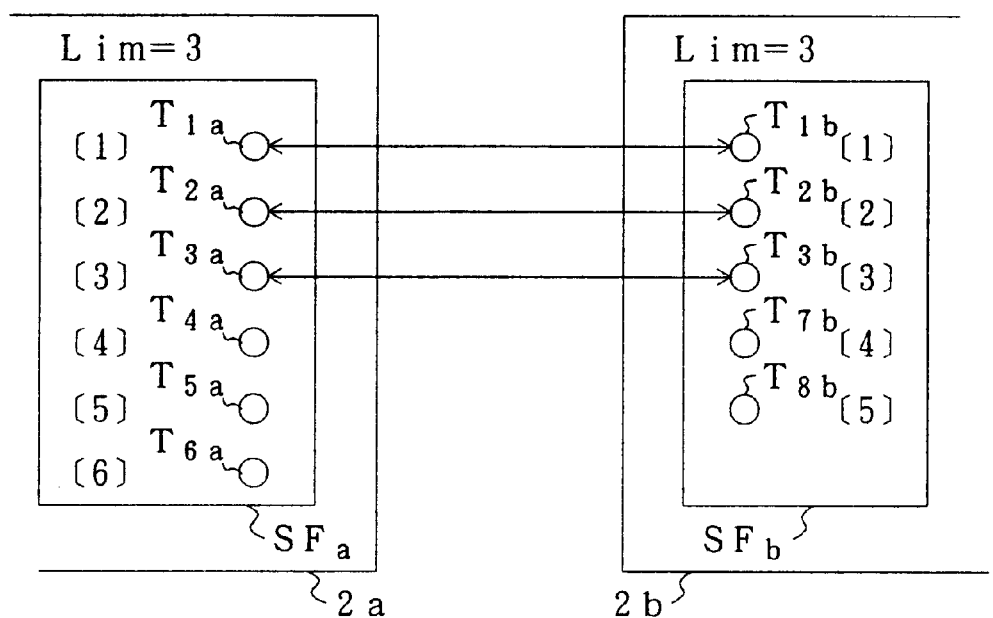
FIG. 8 is an explanatory drawing showing correspondence of tips and how the correspondence is stored in the database system.
Figures 9, 10:
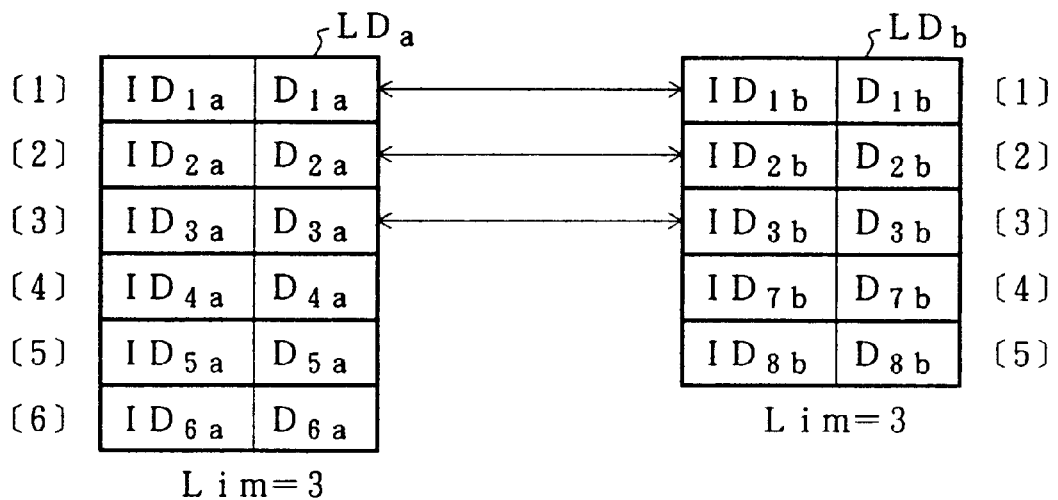
FIG. 9 is an explanatory drawing showing a dirty bit list stored in each information processing device of the database system.
FIG. 10 is an explanatory drawing showing an example of how movement parameters of dirty bits making up the dirty bit list are stored.

For example, as shown in FIG. 8, in the case where three tips T ($T_{1a}$ through $T_{3a}$) and ($T_{1b}$ through $T_{3b}$) are made corresponded to each other between the sharing bags $SF_a$ and $SF_b$, "3" is stored as a sink limit Lim in each of the information processing devices 2a and 2b. Also, as shown in FIG. 9, a dirty bit list $LD_a$ of the information processing device 2a stores dirty bits $D_{1a}$ through $D_{6a}$, corresponding to tips $T_{1a}$ through $T_{6a}$, respectively, in this order. Similarly, a dirty bit list $LD_b$ stores dirty bits $D_{1b}$ through $D_{3b}$, corresponding to tips $T_{1b}$ through $T_{3b}$, respectively, and also dirty bits $D_{7b}$ and $D_{8b}$, corresponding to tips $T_{7b}$ and $T_{8b}$, respectively, in this order. In this case, because the sink limit Lim is "3", tips $T_{4a}$ through $T_{6a}$ and tips $T_{7b}$ and $T_{8b}$, whose dirty bits D are stored after the third position of the lists are not made corresponded to the tips T of the sharing bag SF of the other party. Note that, FIG. 9 only shows one example of the storing method of the dirty bit list LD, in which a combination of a dirty bit D and a corresponding tip ID is stored in succession.

Note that, in the following, for convenience, the position of a dirty bit D in the dirty bit list LD will be referred to as a sink tag and represented by the number in a bracket [ ]. Also, corresponding data such as a dirty bit D and a tip T will be represented by the same subscript, for example, as in dirty bit $D_{1a}$ and tip $T_{1a}$. Further, the information stored in the information processing device 2a will be represented by the subscript "a", as in the tip $T_{1a}$, so as to distinguish it from the information stored in the information processing device 2b, to which the subscript "b" is given. Note that, when there is no need to indicate a correspondence of information, or when referring to information in general, the subscripts are omitted.

The dirty bits D are created so that they correspond one by one to the tips T which have existed in a sharing bag SF even once during the non-synchronous period, and each dirty bit D includes an update parameter indicative of whether the corresponding tip T has been updated during the non-synchronous period, and a movement parameter indicative of whether the tip T has been moved in and out of the sharing bag SF during the non-synchronous period. The update parameter takes the value of either "m", which indicates update, or "p", which indicates maintain. The movement parameter takes the value of either "X", which indicates still, or "I", which indicates insert, or "O", which indicates remove. More specifically, "X" indicates that the tip T has been existing in the sharing bag SF since the last synchronous process, and "I" indicates that the tip T has been inserted or re-inserted into the sharing bag SF since the last synchronous process, and "O" indicates that the tip T has been removed or inserted once but later removed from the sharing bag SF since the last synchronous process. The movement parameter, for example, as shown in FIG. 10, is stored as a combination of an addition bit BI, which indicates that the tip T has been added to the sharing bag SF, and a deletion bit BO, which indicates that the tip T has been deleted from the sharing bag SF. Also, when there is no need to monitor the state of the tip T in the following processes, for example, as in the case where it is judged that the tip T exists outside of the sharing bag SF as a result of the synchronous process, the addition bit BI and the deletion bit BO are both set to the ON state. In the following, this state will be referred to as No Effect "K" regardless of the value of the update parameter. Thus, there are seven states of a tip T which can be identified from a dirty bit D: Still Maintain "Xp", Still Update "Xm", Insert Maintain "Ip", Insert Update "Im", Remove Maintain "Op", Remove Update "Om", and No Effect "K".

Incidentally, even when the sharing bags SF are the same in one party, if their respective corresponding sharing bags SF of the other party are different, the non-synchronous periods are usually different. Thus, in the present embodiment, the dirty bit list LD and the sink limit Lim are provided per each combination of the sharing bag SF of one party and the sharing bag SF of the other party.

Figures 11, 12:
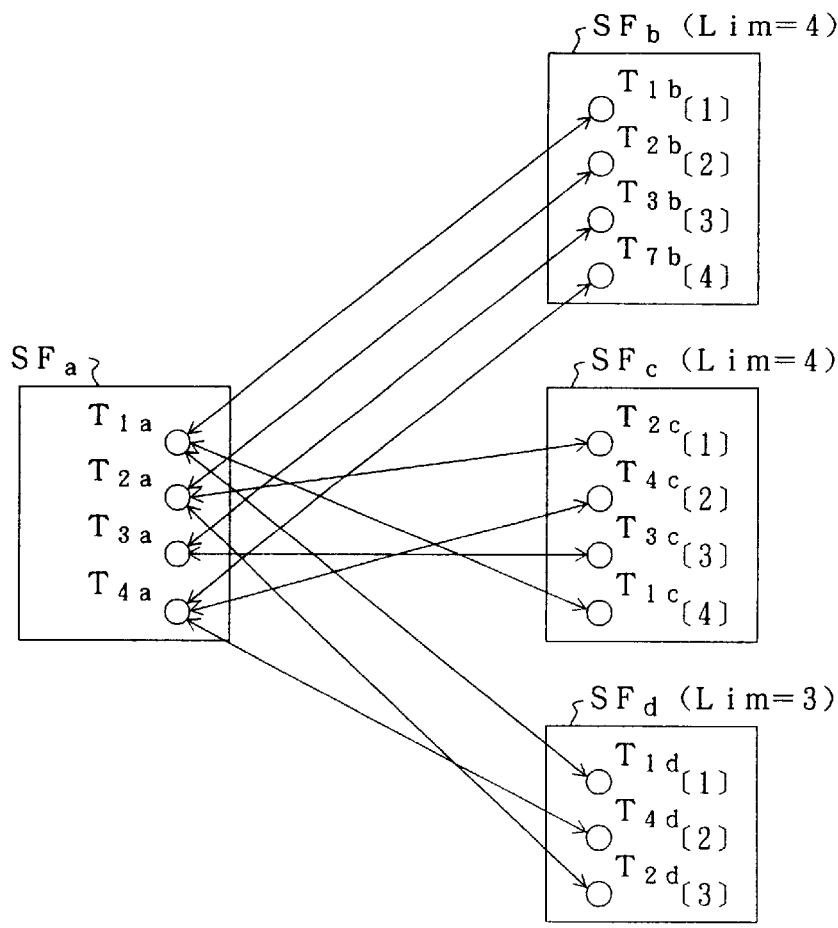
FIG. 11 is an explanatory drawing showing correspondence of tips when sharing is made between one sharing bag and a plurality of sharing bags.
FIG. 12 is an explanatory drawing showing dirty bit lists with the correspondence of tips.

For example, as shown in FIG. 11, when a sharing bag $SF_a$ corresponds to three different sharing bags $SF_b$, $SF_c$, and $SF_d$, as shown in FIG. 12, dirty bit lists $LD_{ab}$, $LD_{ac}$, and $LD_{ad}$, and sink limits $Lim_{ab}$, $Lim_{ac}$, and $Lim_{ad}$ respectively corresponding to each combination are provided. As shown in FIG. 11 and FIG. 12, as long as the orders of the dirty bit lists $LD_{ab}$, $LD_{ac}$, and $LD_{ad}$ are the same as the order of their corresponding dirty bit list LD, the order and value of the dirty bits D, or the sink limit Lim may be different among the dirty bit lists $LD_{ab}$, $LD_{ac}$, and $LD_{ad}$. For example, in the dirty bit list $LD_{ab}$, a dirty bit $D_{2ab}$ (having a value of Im) indicative of a tip $T_{2a}$ is stored in the second position, whereas in the dirty bit list $LD_{ac}$, a dirty bit $D_{2ac}$ (having a value of Xp) is stored in the first position. However, note that in a dirty bit list $LD_b$ of the sharing bag $SF_b$, a dirty bit $D_{2b}$ indicative of a tip $T_{2b}$ is stored in the second position, and a dirty bit $D_{2c}$ is stored in the first position in the dirty bit list $LD_c$.

The bag managing section 32 in accordance with the present embodiment also includes, in addition to the dirty bit lists LD, a sharing party list LS indicative of a sharing party of the sharing bag SF, per each sharing bag SF. By referring to the sharing party list LS, it is possible to search all sharing parties of the sharing bag SF with ease. Therefore, when a change such as addition, deletion, or contents update is made, for example, with respect to a tip T of the sharing bag SF, all the dirty bits D corresponding to the tip T can be updated with a shorter time.

Figure 13:
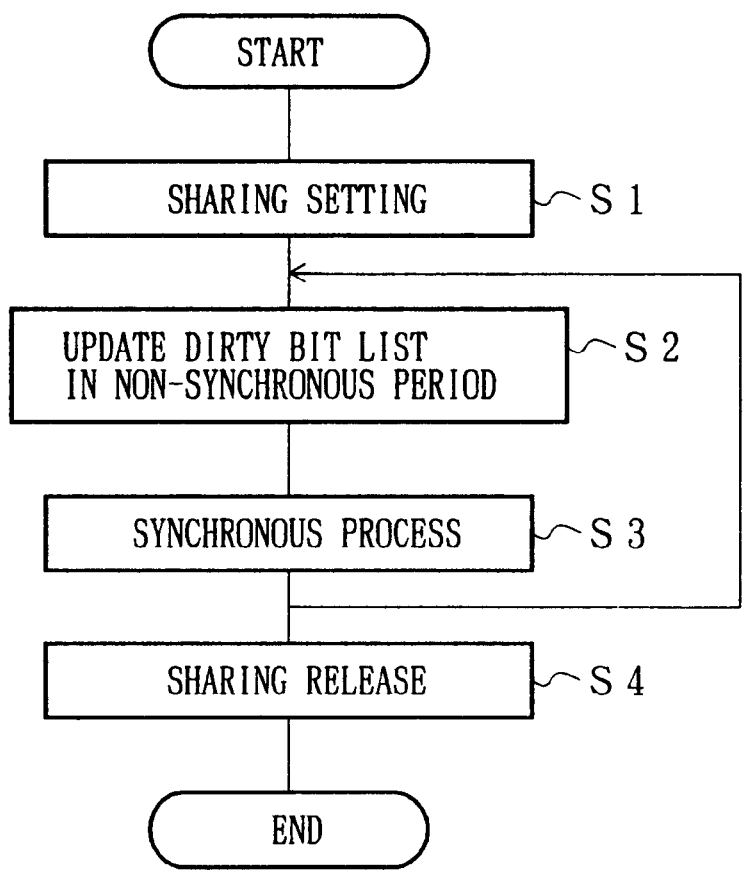
FIG. 13 is a flowchart schematically showing an operation of the database system.

The following describes an operation of the database system 1 having the described structure referring to FIG. 13 through FIG. 61. As schematically shown in FIG. 13, sharing is set prior to the actual synchronous process, and various processes required for the synchronous process, such as setting of sharing bags SF of each party, and generation of dirty bit lists LD and sink limits Lim, are carried out (S1). Note that, at this stage, as shown in FIG. 14, it is only registered in the information processing devices 2a and 2b that the sharing bags $SF_a$ and $SF_b$ are in the sharing region, and the contents of the sharing bags $SF_a$ and $SF_b$ do not coincide until the synchronous process is carried out.

Thereafter, regardless of whether the information processing devices 2a and 2b are ready to communicate, the dirty bit list LD of each information processing device is updated based on an operation on the database DB during the non-synchronous period (S2). When the information processing devices 2a and 2b are ready to communicate, the synchronous process is carried out, and as shown in FIG. 15, the number and the contents of the tips T of the sharing bags SF of the both parties are arranged referring to the dirty bit lists LD and the sink limits Lim, and the dirty bit lists LD and the sink limits Lim are also updated (S3). The use of sharing bags whose order is maintained by an intentional synchronous process as in S3 is very effective in the case where the communications line of the information processing devices 2a and 2b is connected and disconnected intermittently.

Note that, because the tip T can be contained in a plurality of bags F, a synchronous process regarding any sharing setting might change a tip T which belongs to a bag F playing no part in the synchronous process. Nonetheless, regardless of whether the synchronous process being carried out is associated with which of the sharing setting, the tip T is not inserted into or removed from a bag F other than the sharing bag SF.

The processes of S2 and S3 are repeated as required, and when the synchronous process is no longer required, the sharing setting is released in S4. Note that, in FIG. 13, S2 is carried out following S1. However, as long as the steps S2 and S3 are carried out alternately, the order of S2 and S3 may be reversed.

Here, basically, a release of sharing merely releases the correspondence between the sharing bags SF, and here it is not necessarily the case that the contents of the sharing bags SF coincide with each other. Thus, when making a coincidence of the contents of the sharing bags SF, a synchronous process is carried out before sharing is released, either automatically or by an instruction of the user.

Note that, although setting of sharing and the synchronous process are described separately in the above explanation, they may be simultaneously carried out. In such a case, the contents of the sharing bags SF coincide at the time when, for example, setting of sharing is finished. However, in the present embodiment, the sharing setting and the synchronous process are separated from each other to save time required for sharing setting. Thus, in the case where the both information processing devices 2 confirm setting of sharing to their respective users at the time of sharing setting and only one of the information processing devices 2 is operated by the user at the time of synchronous process, the total operation time by the both users can be reduced, thereby improving safety and reducing the operation time.

Figure 16:
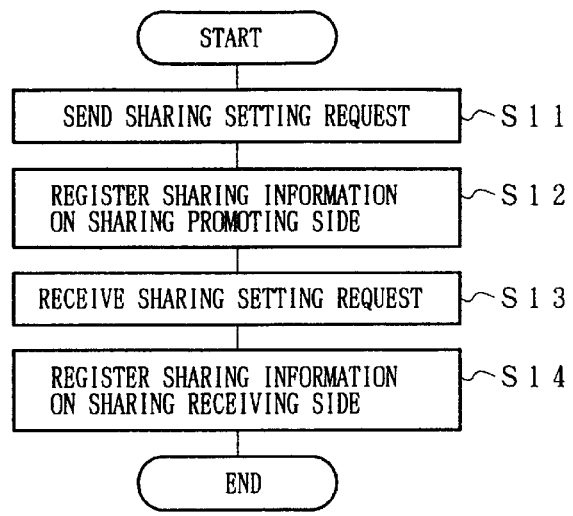
FIG. 16 is a flowchart explaining in detail an operation in sharing setting in the database system.

The following describes sharing setting of a bag fused model as one example of the process in S1. As shown in FIG. 14, sharing setting of a bag fused-type is setting of sharing between bags $F_a$ and $F_b$ which have been existing already in the information processing devices 2a and 2b, respectively, and when the information processing devices 2a and 2b are ready to communicate, as shown in FIG. 16, the sharing setting processing section 52 of the information processing device 2a in S11 sends a sharing setting request to the information processing device 2b. The request includes a machine ID indicative of the information processing device 2a, a bag ID indicative of the bag $F_a$ of the information processing device 2a, and a bag ID indicative of the bag $F_b$ of the information processing device 2b to which the sharing is directed. Note that, in the following, the side which sends the sharing setting request will be referred to as a sharing setting promoting side, and the side which receives the sharing setting request will be referred to as a sharing setting receiving side.

Then, in S12, the sharing setting processing section 52 on the sharing setting promoting side registers, as sharing information, information analogous to the sharing setting request. Also, the sharing setting processing section 52 creates a sharing party list LS corresponding to the bag $F_a$ so as to register the bag ID of the other party. As a result, the bag $F_a$ becomes a sharing bag $SF_a$. Also, a dirty bit list LD and a sink limit Lim, corresponding to a combination of the sharing bag $SF_a$ and the bag $F_b$ of the other party are created.

The information processing device 2b on the sharing setting receiving side, upon receiving the sharing setting request by the sharing setting processing section 52 in S13, registers sharing information based on the sharing setting request in S14. The sharing information includes a machine ID indicative of the information processing device 2b, a bag ID to be subjected to sharing in the information processing device 2a, a bag ID to be subjected to sharing in the information processing device 2b, and an option which is decided in the sharing setting. The sharing setting processing section 52 of the information processing device 2b, as with the sharing setting promoting side, registers the bag ID of the other party to a sharing party list LS corresponding to the bag $F_b$ so as to generate a sharing bag $SF_b$, and create a dirty bit list LD and a sink limit Lim, corresponding to a combination of the sharing bag $SF_b$ and the sharing bag $SF_a$ of the other party.

It is one of the characteristics of the database system 1 in accordance with the present embodiment that when the information processing device 2 can select various options, such as whether a priority determining rule or download process is needed, or copying is required when a collision occurs in the synchronous process in S3, or a model adopted in the sharing release in S4, these options are set in the sharing setting stage, and the sharing setting request includes information indicative of such options, allowing the options to be set only in the sharing setting stage.

Here, if the information processing device 2 can set an option at an arbitrary timing, there is a case where an option such as the priority determining rule is changed in accordance with an operation on one of the information processing devices 2, and undesirable setting is made for the user of the other information processing device 2. However, with the described arrangement, the option is changed only in the sharing setting stage when the information processing devices 2 are ready to communicate, thus avoiding such undesirable setting.

Note that, even though FIG. 16 does not show a step for verifying the sharing party, the sharing setting receiving side may decide whether to proceed with sharing setting in accordance with the contents of the sharing setting request, for example, such as an option for sharing setting. In such a case, the information processing device 2 on the sharing setting receiving side stores beforehand, for example, a sharing setting request which can be received, and decides whether to proceed with sharing setting based on the sharing setting request thus stored.

The initial values of the dirty bit list LD and the sink limit Lim vary according to the correspondence of the tips T contained in the sharing bags $SF_a$ and $SF_b$. For example, in sharing setting, in the case of judgement in which the tips T contained in the sharing bags $SF_a$ and $SF_b$ are distinguished from each other, the initial value of the sink limit Lim becomes 0, and the dirty bit D corresponding to each tip T is set to Insert Update "Im". Also, for example, when making a correspondence of tips T referring to the contents thereof, the sink limit Lim takes the value of the number of tips T which were successfully made corresponded, and the dirty bits D corresponding to the tips T are stored such that their orders are the same in the both dirty bit lists LD. Note that, when the contents of the tips of the both parties are the same, the values of the dirty bits D become Still Maintain "Xp", and when it is unknown whether the contents are the same, the values are set to Still Update "Xm".

Figure 17:
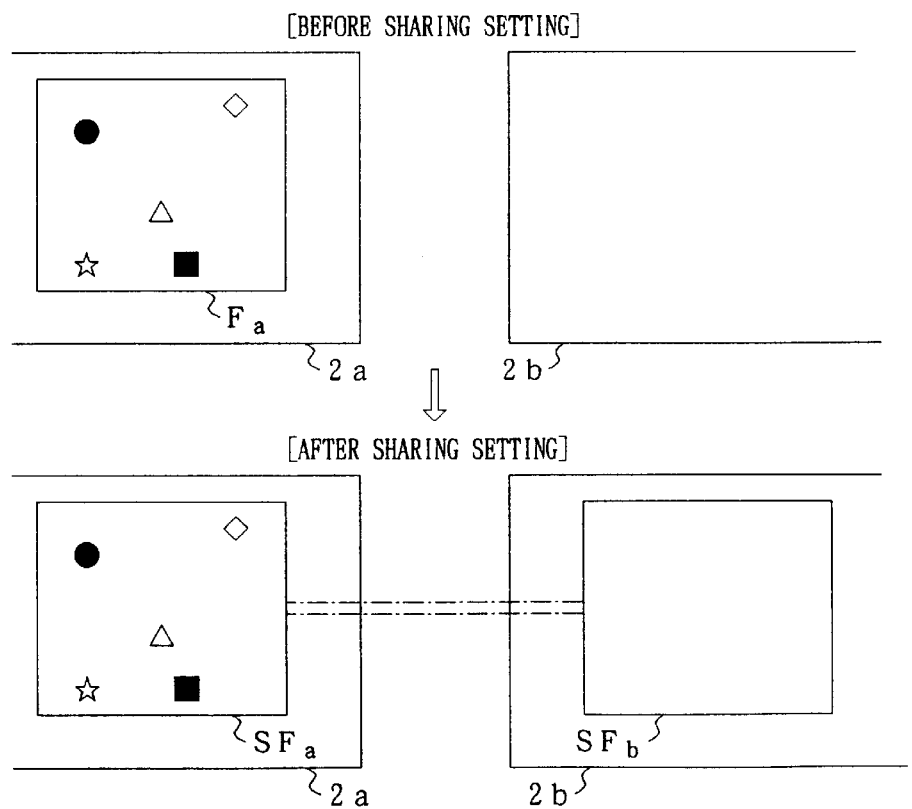
FIG. 17 is an explanatory drawing showing sharing setting of a bag drawing model as a modification example of the database system.

Also, the model of sharing setting is not just limited to the bag fused model so that, as shown by the bag drawing model in FIG. 17, one of the sharing bags may be newly created in the sharing setting, or as shown by the new bag creating model in FIG. 18, a new sharing bag SF may be newly created for the information processing devices 2a and 2b. In either case, the process substantially similar to that of FIG. 16 is carried out, and the sharing information, dirty bit list LD, sink limit Lim, and sharing information are registered in each of the information processing devices 2a and 2b. However, in the case where a new sharing bag SF is created on the sharing setting receiving side, the bag ID of the sharing bag SF is returned to the sharing setting promoting side when registering the sharing information, etc.

The following will describe in detail the process of S2 in FIG. 13, that is, the process during the non-synchronous period. In the non-synchronous period, the dirty bits D corresponding to the tips T are updated based on the operation on the tips T, and the dirty bit list LD and the sink limit Lim at the time of operation, as shown in FIG. 19.

Figure 20:
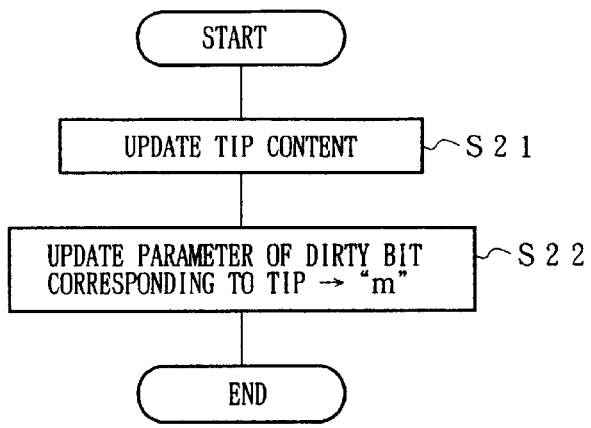
FIG. 20 is a flowchart showing a contents update process of a tip, explaining in detail an operation in the non-synchronous period in the database system.

Specifically, when the contents update of the tips T is instructed, in S21 of FIG. 20, the tip update processing section 41 (see FIG. 1) receives the instruction from the user operating section 22 and updates the contents of the tips T in accordance with the instruction. Then, in S22, the update parameter is set to "m" with respect to the dirty bits D corresponding to the tips T. Note that, the values of the movement parameter remain unchanged.

The tip T can belong to a plurality of sharing bags SF, and there is a case where the sharing bag SF is linked to a plurality of sharing bags SF. Therefore, in the information processing device as a whole, there may be a plurality of dirty bits D corresponding to the tip T. For this reason, all the dirty bits D corresponding to the tip T are searched and updated. Searching of corresponding dirty bits D may be carried out referring to all the dirty bit lists LD, or, in order to reduce the search time, by creating in advance and referring to a list of dirty bits D corresponding to the tip T.

In any case, in the present embodiment, the dirty bit D is created with respect to a tip T which has belonged even once to the sharing bag SF during the non-synchronous period, and the dirty bit D is updated by monitoring the operation on the tip T. Therefore, for example, even when the tip T has been moved and does not currently exist in the sharing bag SF, it is ensured that the dirty bit D is updated.

Figure 21:
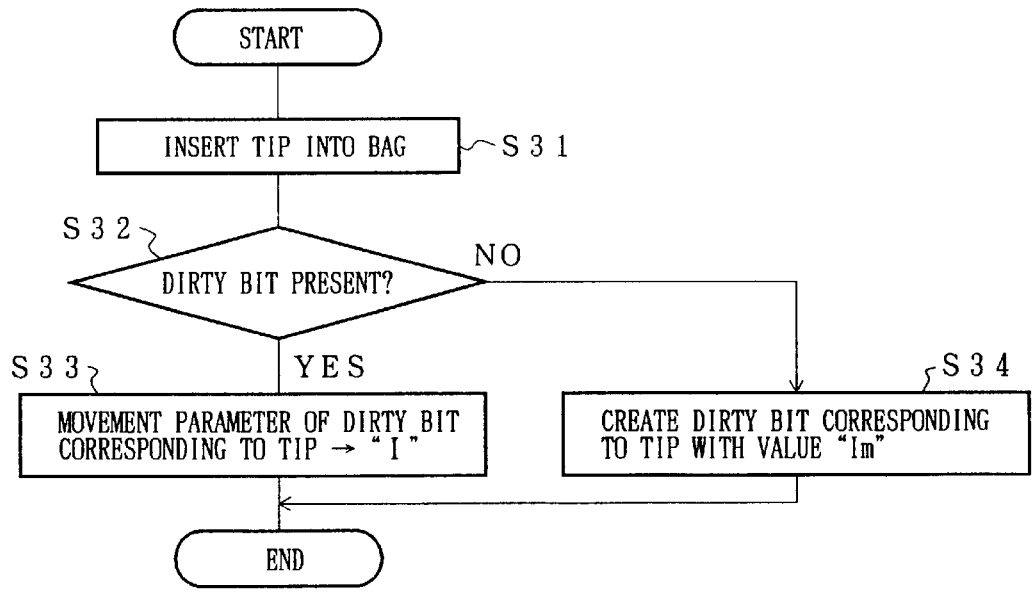
FIG. 21 is a flowchart showing an insert process of a tip, explaining in detail an operation in the non-synchronous period in the database system.

On the other hand, in the case where the tip T is inserted into the sharing bag SF by newly creating or by moving the tip T, as shown in FIG. 21, the tip addition processing section 42 (see FIG. 1) controls the bag managing section 32 in accordance with an instruction from the user operating section 22 so that the tip T belongs to the sharing bag SF (S31). Further, the tip addition processing section 42 in S32 judges whether the dirty bit list LD indicative of the sharing bag SF contains a dirty bit D corresponding to the tip T.

Here, when the dirty bit D is contained, it indicates that the contents update of the tip T has already been monitored, for example, as in the case where the tip T in the sharing bag SF has been moved in and out of it. Thus, the tip addition processing section 42 in S33 sets the movement parameter of the dirty bit D to "I". Meanwhile, when the dirty bit D is not contained, it means that, for example, the tip T has never been contained in the sharing bag SF or the tip T has been newly created, and it indicates that whether the contents of the tip T have been updated or not during the non-synchronous period cannot be confirmed. Thus, the tip addition processing section 42 in S34 adds a dirty bit D with the value of "Im" indicative of the tip T to the dirty bit list LD on the position after the sink limit Lim, for example, on the last position of the dirty bit list LD. Note that, in the case where there are plural dirty bit lists LD corresponding to the sharing bag SF, the processes from S32 to S34 are carried out with respect to all the dirty bit lists LD.

Figure 22:
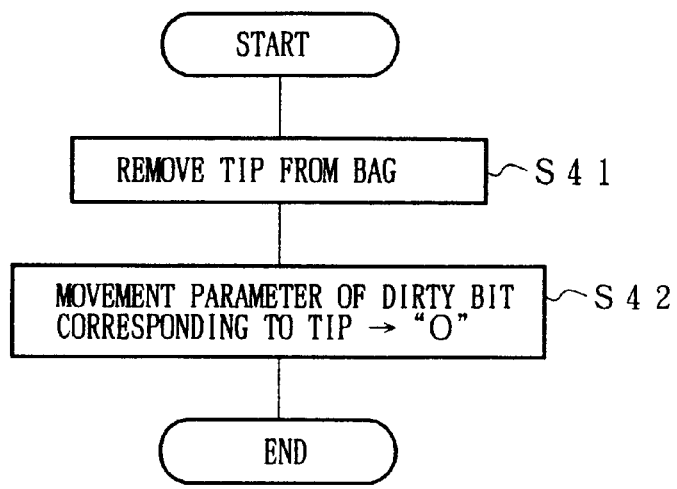
FIG. 22 is a flowchart showing a removal process of a tip, explaining in detail an operation in the non-synchronous period in the database system.

Further, in the case where the tip T is removed from the sharing bag SF, for example, by deleting or moving the tip T, as shown in FIG. 22, the tip deletion processing section 43 (see FIG. 1) controls the bag managing section 32 in accordance with an instruction from the user operating section 22 so that the tip T is removed from the sharing bag SF (S41). Here, in the present embodiment, the dirty bit D is maintained with respect to the tip T which has contained in the sharing bag SF even once during the non-synchronous period. Thus, the tip deletion processing section 43 in S42 updates the movement parameter of the dirty bit D corresponding to the tip T to "O" with respect to all the dirty bit lists LD indicative of the sharing bag SF. Note that, the update parameter remains unchanged.

Figure 23:
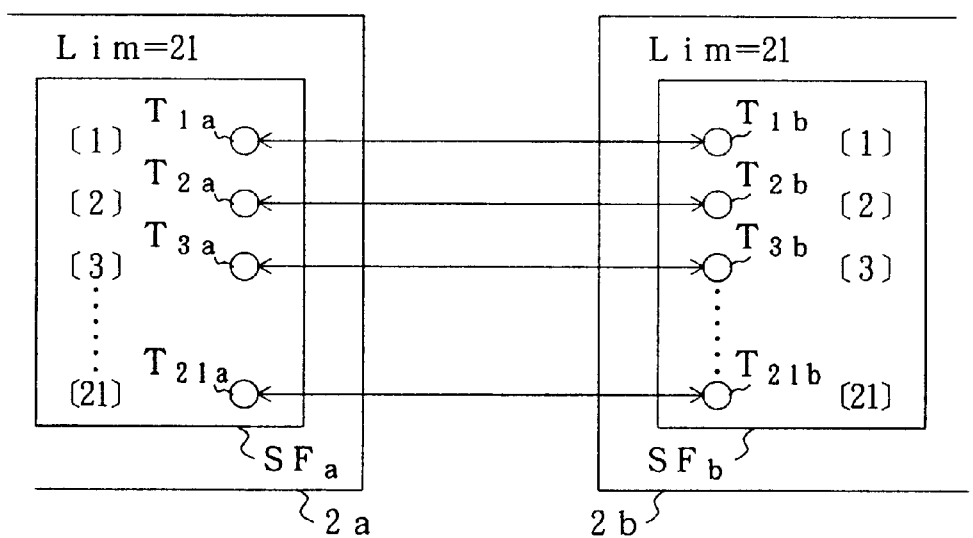
FIG. 23 is an explanatory drawing showing correspondence of tips immediately after finishing of the synchronous process in the database system.
Figure 24:
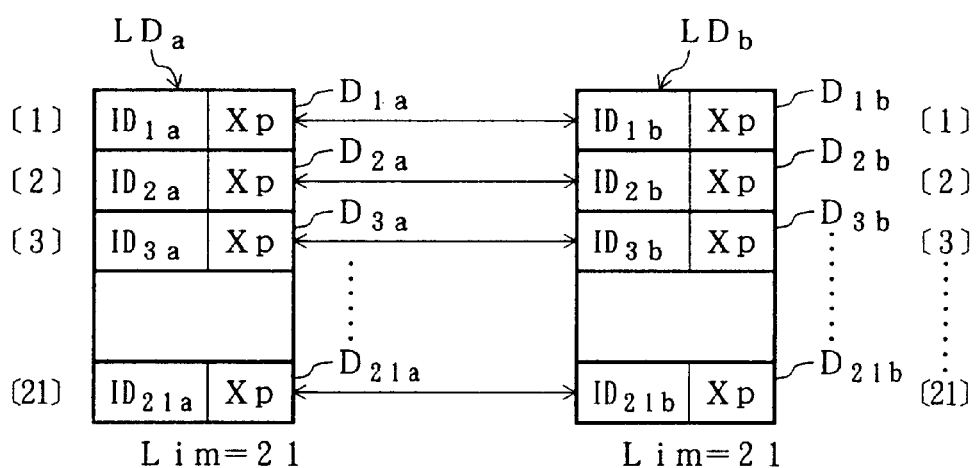
FIG. 24 is an explanatory drawing showing dirty bit lists immediately after the synchronous process in the database system.

For example, at the end of the synchronous process, as shown in FIG. 23, all the tips T in the sharing bags $SF_a$ and $SF_b$ are corresponding one to one with each other, and the contents of the corresponding tips T are set to be the same. Thus, as shown in FIG. 24, the sink limit Lim is the same as the length (number of dirty bits D) of the dirty bit list LD, and the corresponding dirty bits $D_a$ and $D_b$ are stored such that their orders are the same in their respective dirty bit lists LD. Also, the values of the dirty bits D are all set to "Xp".

Figure 25:
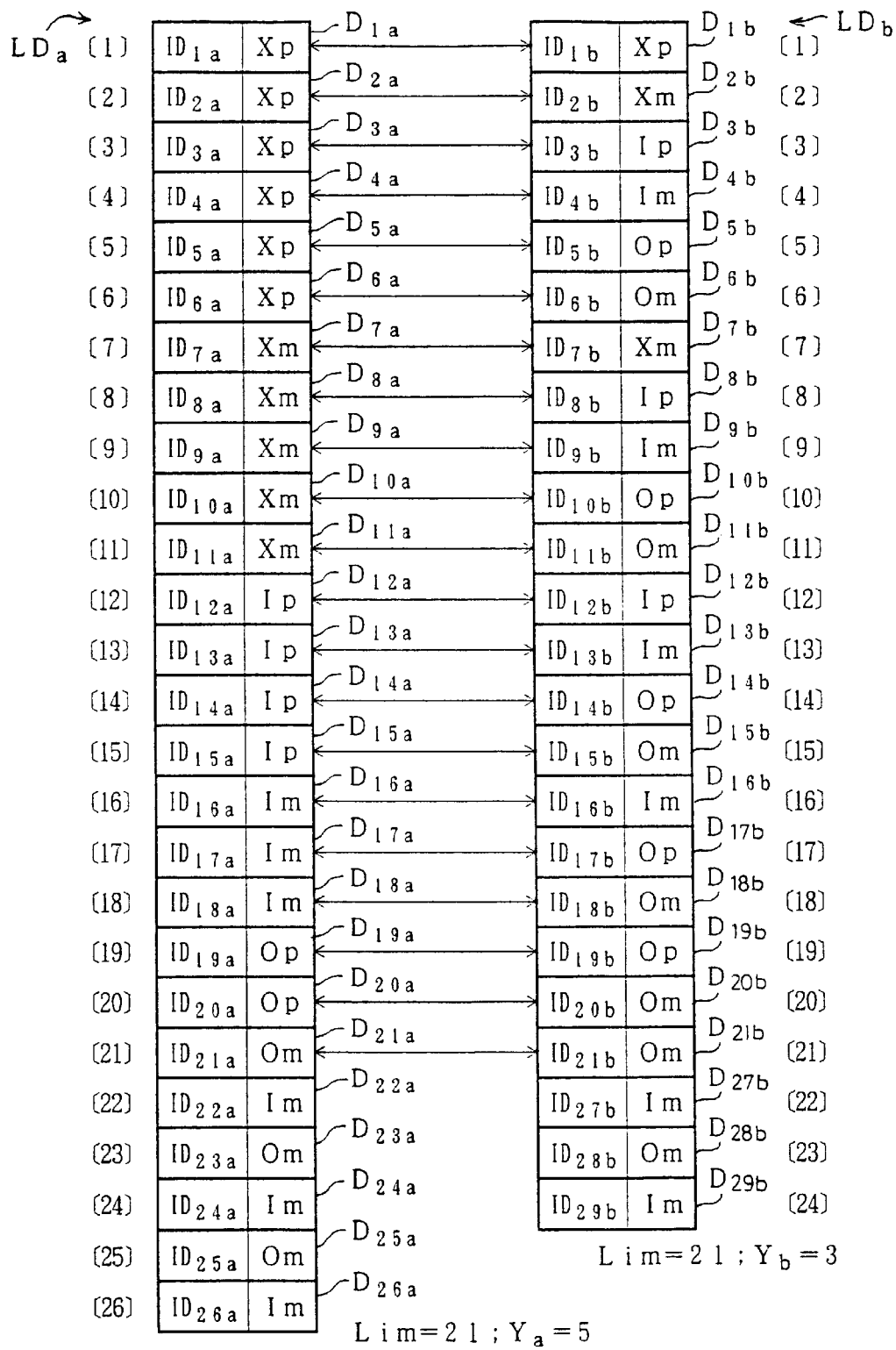
FIG. 25 is an explanatory drawing showing dirty bit lists immediately before a next synchronous process in the database system.

During the non-synchronous process, when respective databases DB of the information processing devices 2 are independently operated, the tip update processing section 41, the tip addition processing section 42, and the tip deletion processing section 43 of each information processing device 2 update the dirty bit list LD. As a result, the values of the dirty bits D always indicate the states of the corresponding tips T during the non-synchronous period. Therefore, when the databases DB are independently updated, at the time immediately preceding a subsequent synchronous process, for example, as shown in FIG. 25, the dirty bit lists LD do not coincide with each other.

Nevertheless, in the dirty bit lists LD, the dirty bit D on the position indicated by the sink limit Lim, and the dirty bits D above the sink limit Lim are not deleted even when the corresponding tips T are deleted so that the same order is maintained during the non-synchronous period. As a result, the same order of the dirty bits D indicative of the corresponding tips T, such as dirty bits $D_{3a}$ and $D_{3b}$, is maintained in the sharing bags $SF_a$ and $SF_b$.

The dirty bits D after the sink limit Lim indicate tips T which were newly added to the sharing bag SF during the non-synchronous period, and even when the dirty bits D, for example, such as dirty bits $D_{22}$ and $D_{27}$, are stored on the same position, their respective tips T do not correspond to each other. Such dirty bits D after the sink limit Lim indicate either "Im" or "Om", wherein "Om" indicates that the newly inserted tip T into the sharing bag SF does not currently belong to the sharing bag SF. Also, in the case where the number of tips T added is different, the lengths of the dirty bit lists LD are also different.

Figure 26:
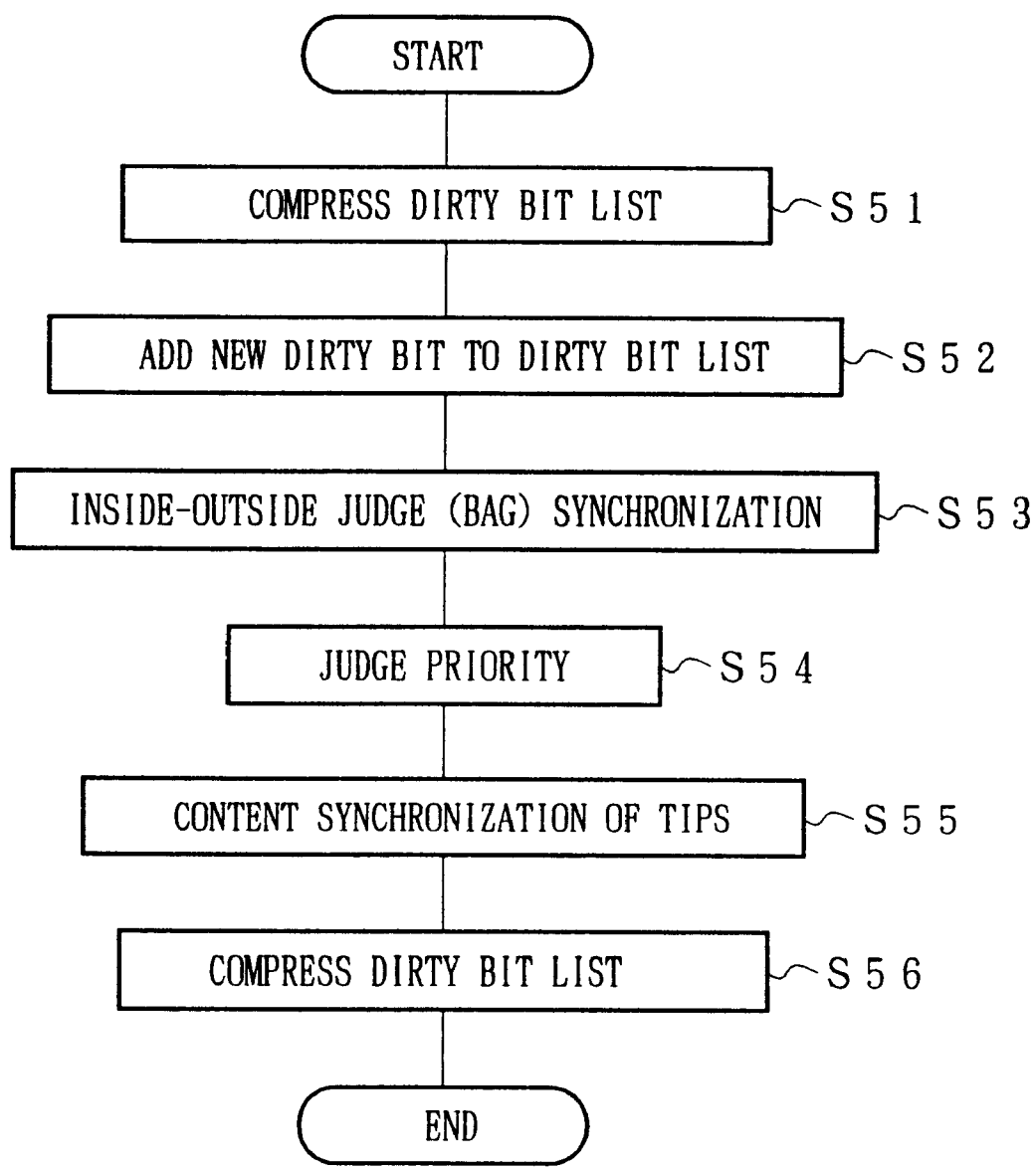
FIG. 26 is a flowchart explaining in detail an operation in a synchronous process in the database system.
Figure 27:
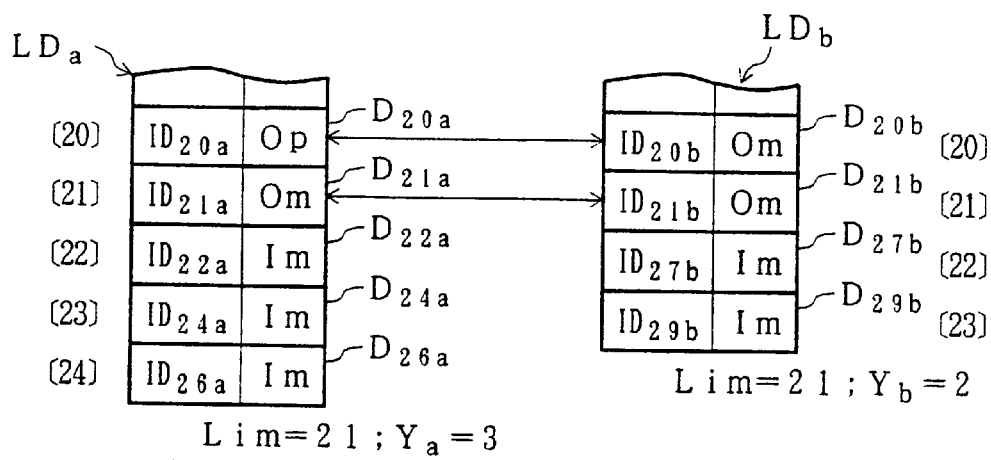
FIG. 27 is an explanatory drawing explaining a state of the synchronous process in the database system, showing dirty bit lists after compression.

When the synchronous process is instructed in this state by an instruction of the user or by a sensor for detecting that the information processing devices 2 are ready to communicate, the synchronous process of S3 in FIG. 13 is carried out. To explain in more detail, as shown in FIG. 26, in S51, the synchronize processing section 51 of each information processing device 2 deletes dirty bits D whose movement parameter is "O" from the dirty bits D after the sink limit Lim of the dirty bit list LD. As a result, as shown in FIG. 27, the dirty bits D after the sink limit Lim only take the value of "Im" in the both dirty bit lists LD.

The tips T corresponding to the dirty bits D with the movement parameter of "O" are not contained in the sharing bag SF in the preceding synchronous process and the current synchronous process. Therefore, it is not required to send the contents of these tips T to the other information processing device 2 regardless of the state of the sharing bag SF of the other party. As a result, by deleting these tips T, the number of dirty bits D transmitted between the information processing devices 2a and 2b can be reduced in the subsequent processes.

Figure 28:
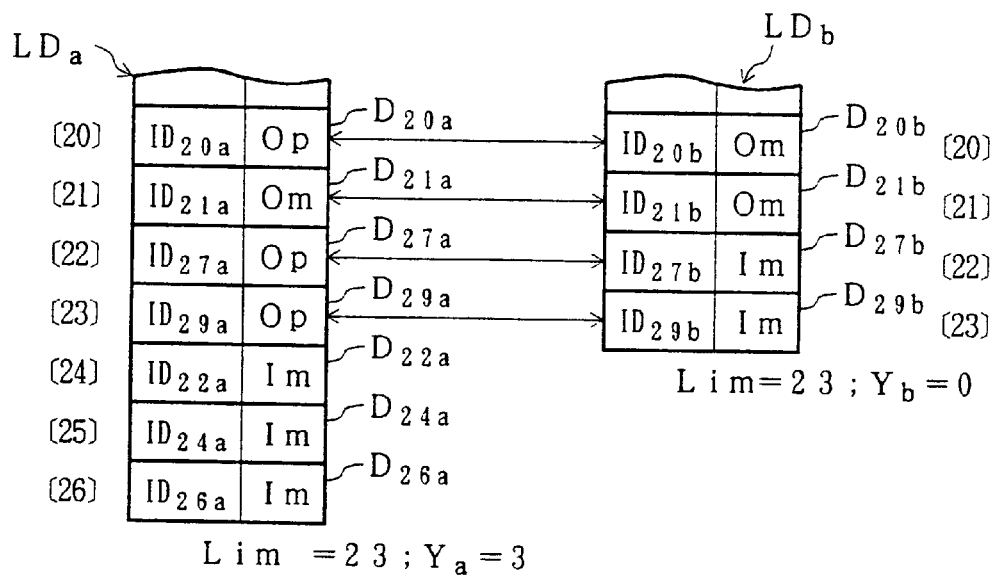
FIG. 28 is an explanatory drawing explaining another state of the synchronous process in the database system, showing a state in which dirty bits added to one information processing device are added to another information processing device.

When compression of the dirty bit list D is finished in S51, the synchronize processing section 51 of one party in S52 receives the dirty bits D after the sink limit Lim of the other party so as to generate dirty bits D corresponding to the dirty bits D thus received. Specifically, the information processing device 2b sends the number $Y_b$ of dirty bits D after the sink limit $Lim_b$ of the dirty bit list $LD_b$, and the dirty bits D with the value of "Op" are inserted immediately after the sink limit $Lim_a$ of the dirty bit list $LD_a$ of the information processing device 2a in the same number as $Y_b$ sent from the information processing device 2b. Further, the information processing devices 2a and 2b increases their respective sink limits Lim by the number $Y_b$. As a result, as shown in FIG. 28, the dirty bits D corresponding to the tips T added in the information processing device 2b are also created in the information processing device 2a. In the same manner, the dirty bits D corresponding to the tips T added in the information processing device 2a are added to the information processing device 2b, thereby adjusting the sink limit Lim.

Here, as shown in FIG. 28, in the state where the dirty bits D corresponding to the tips T of the information processing device 2b are added to the dirty bit list $LD_a$ of the information processing device 2a, the sink limit Lim has already been changed and is indicating the last position (here, sink limit Lim=23) of the dirty bit list $LD_b$ of the information processing device 2b. Therefore, when adding dirty bits D corresponding to the tips T of the information processing device 2a, by adding these dirty bits D immediately after the sink limit Lim of the dirty bit list $LD_b$, the dirty bits D corresponding to the tips T (such as $T_{22a}$, $T_{24a}$, and $T_{26a}$) which have been added to the information processing device 2a are ordered after the dirty bits D (such as $T_{27}b$ and $T_{29b}$), which have been added to the information processing device 2b, in both of the dirty bit lists $LD_a$ and $LD_b$. As a result, the orders of corresponding dirty bits D coincide with each other between the dirty bit lists $LD_a$ and $LD_b$.

Figure 29:
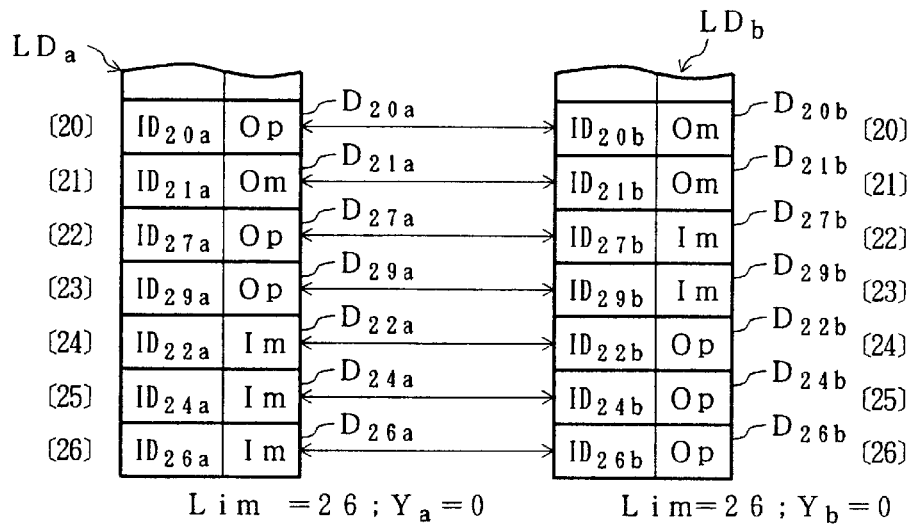
FIG. 29 is an explanatory drawing explaining yet another state of the synchronous process in the database system, showing a state in which dirty bits added to one information processing device are added to another information processing device.

As a result, as shown in FIG. 29, the lengths of the dirty bit lists $LD_a$ and $LD_b$ become the same, and the dirty bits D on the same position indicate the corresponding tips T. Also, the sink limits Lim and the lengths of the dirty bit lists LD become the same, and no dirty bit D exists after the sink limit Lim. Note that, at this stage, only the dirty bit lists LD and the sink limits Lim are updated and it is not required to transmit the contents of tips T.

Note that, the above explanation described the case where the number $Y_a$ ($Y_b$) is sent or received. However, as long as the dirty bits D of the corresponding tips T result in the same position, the information sent or received is not just limited to the number $Y_a$ ($Y_b$). Also, in the above explanation, the dirty bit D having the value of "Op" is added. However, any value whose priority is after "Im" exhibits the same effect.

Figure 30:
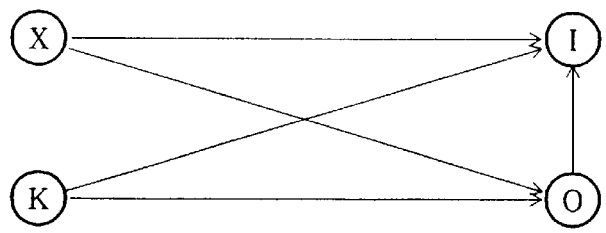
FIG. 30 is an explanatory drawing showing a priority order of the movement parameters of the dirty bit, explaining the synchronous process of the database system.

When the dirty bits D have all been made corresponded to each other in S52, the synchronize processing section 51 of each party in S53 decides whether the tip T corresponding to each dirty bit D should be given to the sharing bag SF, based on the dirty bits D transmitted between the information processing devices 2a and 2b. In the case where the movement parameters of the dirty bits $D_a$ and $D_b$ are different, it is judged whether the tip $T_b$ should be given to the sharing bag $SF_b$ using, for example, the priority rule as shown in FIG. 30. Note that, in FIG. 30, a priority is given towards the tip of the arrows.

Figure 31:
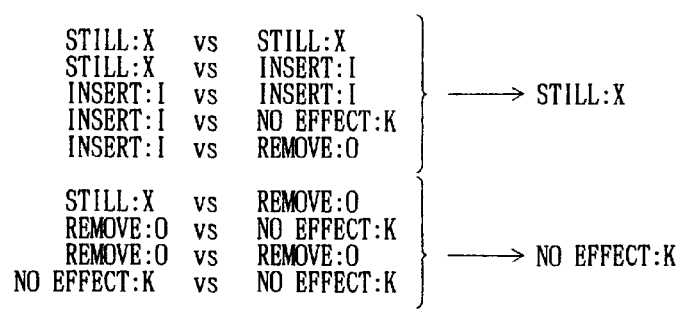
FIG. 31 is an explanatory drawing showing a change in dirty bits, explaining the synchronous process of the database system.

Specifically, the dirty bit D in the dirty bit list LD is successively sent from the information processing device 2a to the information processing device 2b. The information processing device 2b compares the dirty bit $D_a$ received and a dirty bit $D_b$ of the dirty bit list $LD_b$, whose positions are the same in the lists. The synchronize processing section 51 of the information processing device 2b judges, when the combination of movement parameters is either one of (X-X), (X-I), (I-I), (I-K), and (I-O) as shown in FIG. 31, that the tips T of the dirty bits D should be given to the sharing bag SF so that the tips T corresponding to the dirty bits D belong to their respective sharing bags SF. Also, the synchronize processing section 51 sets the movement parameters of the both parties to "X".

On the other hand, when the combination of the movement parameters is (X-O), (O-K), (O-O), or (K-K), the synchronize processing section 51 judges that the tips T is outside of the sharing bag SF so that the tips T of, for example, the both parties are removed from their respective sharing bags SF, and respective dirty bits D are set to No Effect "K". Note that, when the information processing devices 2a and 2b are operating normally, the combination of (X-K) does not result, so that this is judged as an error and an error process is carried out, in which the user is asked to send instructions, for example.

Figure 32:
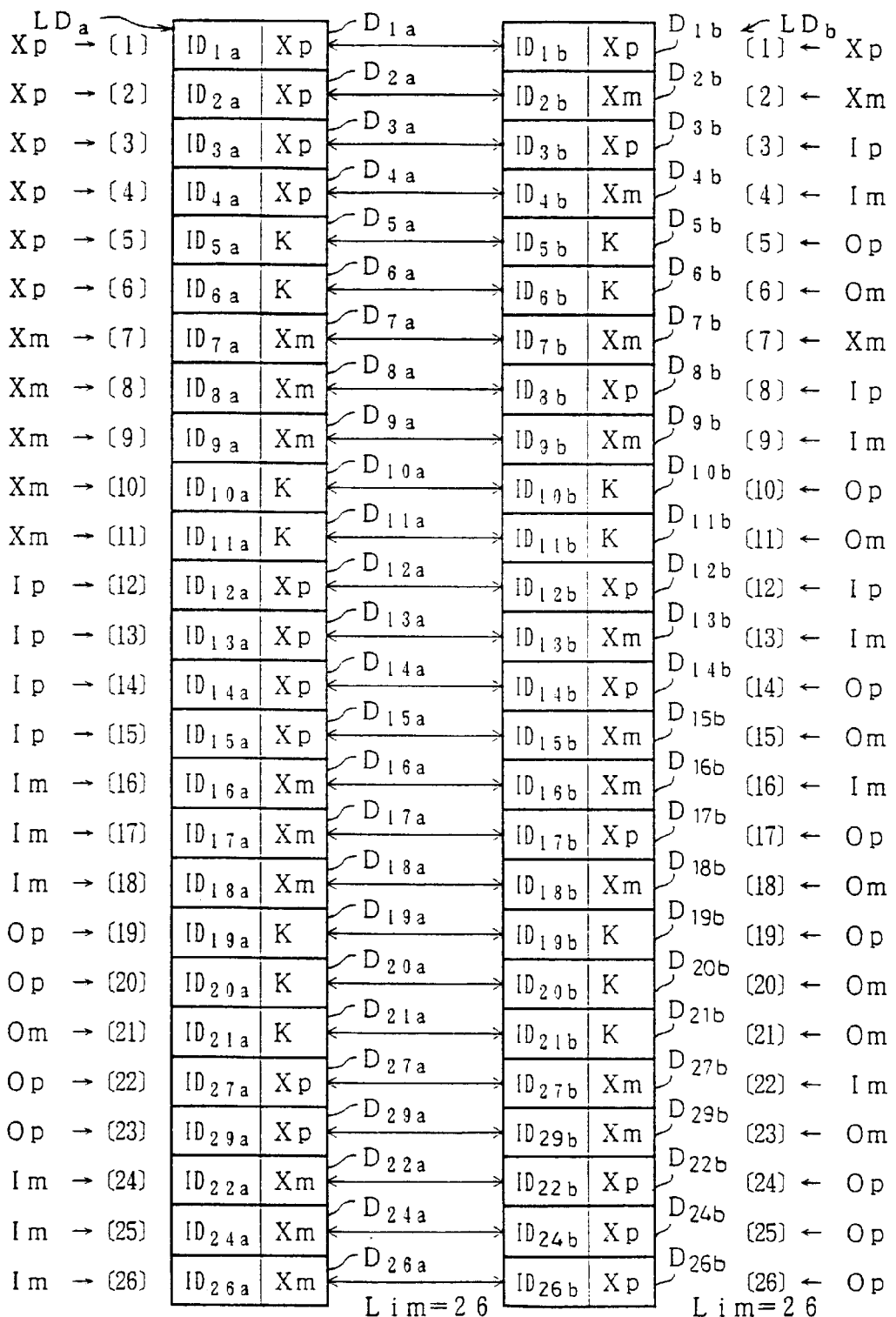
FIG. 32 is an explanatory drawing showing dirty bit lists at the time when an inside-outside judge synchronous process is finished, explaining the synchronous process of the database system.

Removing of the receiver's tips T or setting of dirty bits D may be carried out by the synchronize processing section 51 of the receiver by sending the dirty bits D before update, or by transmitting the result of judgement to the receiver. In either case, the receiver's dirty bits D and the tips T are specified by the dirty bits D or by the order of sending the results of judgement, and no special information for specifying the dirty bits D or the tips T is sent. Therefore, the amount of data transmitted in the inside-outside judgement is significantly small. As a result, as shown in FIG. 32, all the dirty bits D of the dirty bit lists LD are set to have the movement parameter of either "X" or "K".

Note that, the tips T whose movement parameter is not "X", namely tips T which were judged to be outside of the sharing bag SF or tips T judged to be errors are not subjected to the tip synchronous process in S54 and S55, and priority judgement of the update parameter or sending of tip T contents is not carried out.

Then, the synchronous processing section 51 in S54 compares the update parameters of the dirty bits D of the both parties with respect to the tips T (whose movement parameter is "X") which have been judged to be within the sharing bag SF in the bag synchronization in S53 so as to determine respective priorities of the corresponding tips. The priority of the tips T is determined, as shown in FIG. 33, by the update parameter, and Update "m" is given a higher priority than Maintain "p", thus deciding whether the contents of the tips T should be transmitted and the direction of transmission.

Figures 33, 34:
FIG. 33 is an explanatory drawing showing a priority order of the update parameters of the dirty bit, explaining the synchronous process of the database system.
FIG. 34 is an explanatory drawing showing a change in update parameter of the dirty bit, explaining the synchronous process of the database system.
Figure 35:
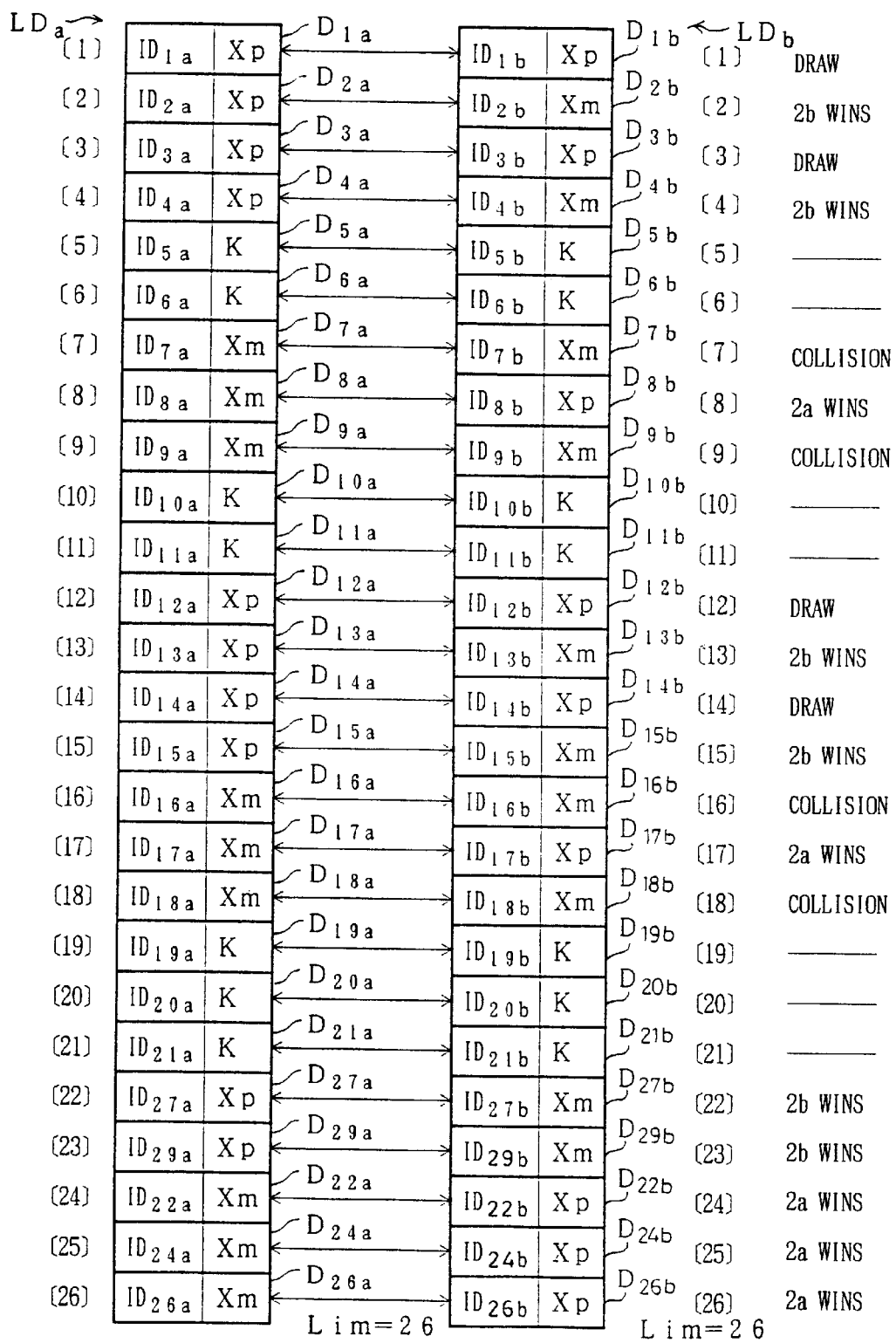
FIG. 35 is an explanatory drawing showing a priority side judgement by the dirty bits, explaining the synchronous process of the database system.

Specifically, as shown in FIG. 34, the synchronize processing section 51 compares the dirty bits $D_a$ and $D_b$, and when the combination of update parameters is (p-p), judges that it is not required to sent the contents of the tips T. Also, when the combination is (p-m), it is judged that the update parameter "m" has the priority so as to judge that the contents of the tips T should be sent from the information processing device 2 of the priority side to the information processing device 2 of the non-priority side. Thus, when the dirty bit lists LD have the values as shown in FIG. 32, a priority side is judged as shown in FIG. 35. Note that, in S54, when the combination is (m-m), that is, when the tips T have been updated on the both sides, a collision of tips T is judged. In such a case, as will be mentioned later, a priority side is determined by a predetermined priority rule, for example, by referring to information other than the dirty bits D, such as the contents of tips T (update time or predetermined keyfield), the side which has instructed the synchronous process, the side which has promoted sharing setting, or the side which has been set beforehand, or by asking the user. Note that, in the case where the tips T collide, the tips T are regarded as being different from each other, and the tips T of the other party may be added to the sharing bag SF of one party.

Figure 36:
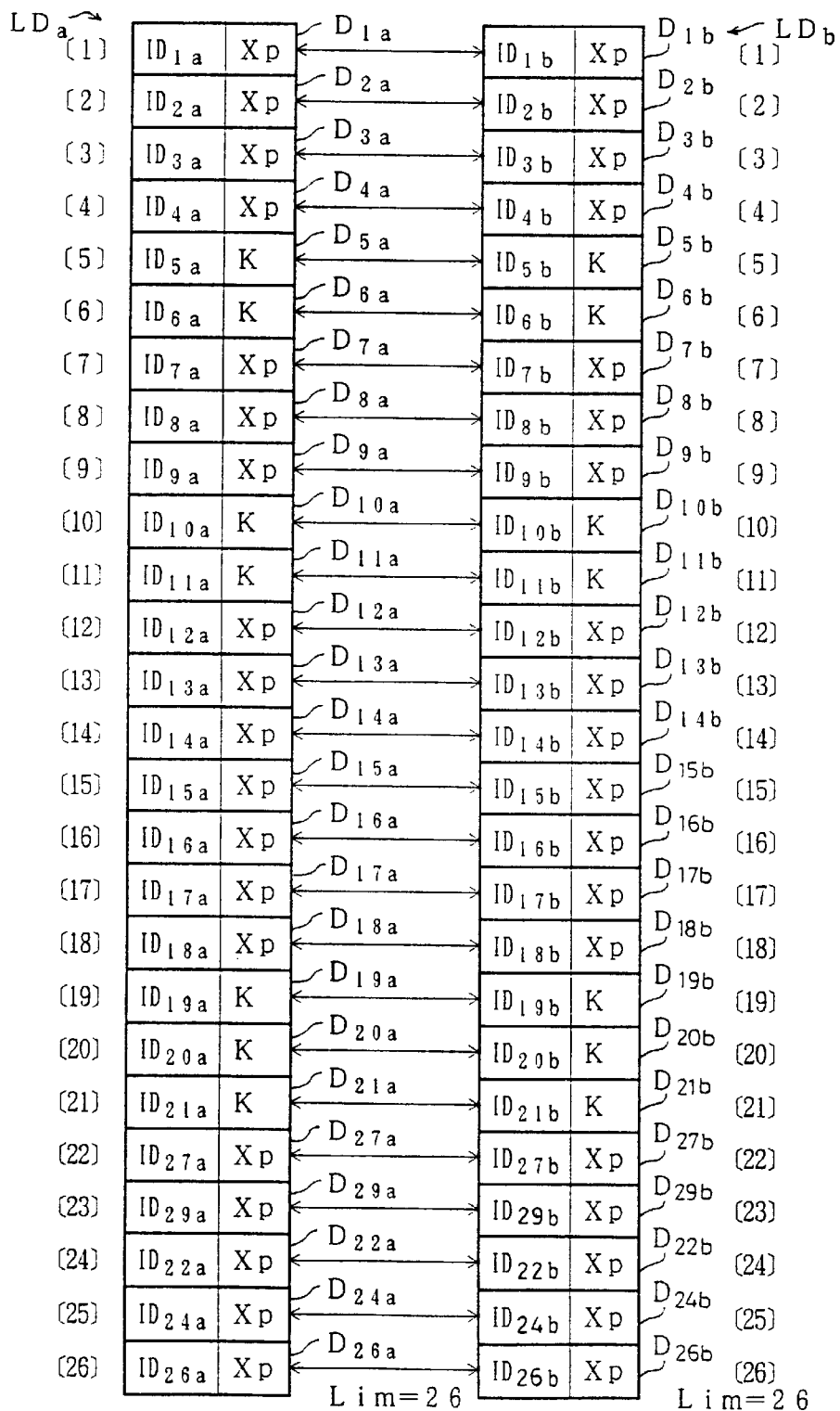
FIG. 36 is an explanatory drawing showing dirty bit lists after a data contents synchronous process, explaining the synchronous process of the database system.

When the priority of the tips T is judged and it is decided that the contents of the tips T are required to be sent in S54, each synchronize processing section 51 in S55 sends the contents of the tips T on the priority side to the non-priority side so that the contents of the tip T on the non-priority side are replaced with the contents of the tip T on the priority side. Thus, the contents of the tips on the both sides coincide and the update parameters of respective dirty bits D are set to "p". As a result, as shown in FIG. 36, all the dirty bits D in the dirty bit lists LD are set to either "Xp" or "K".

Figure 37:
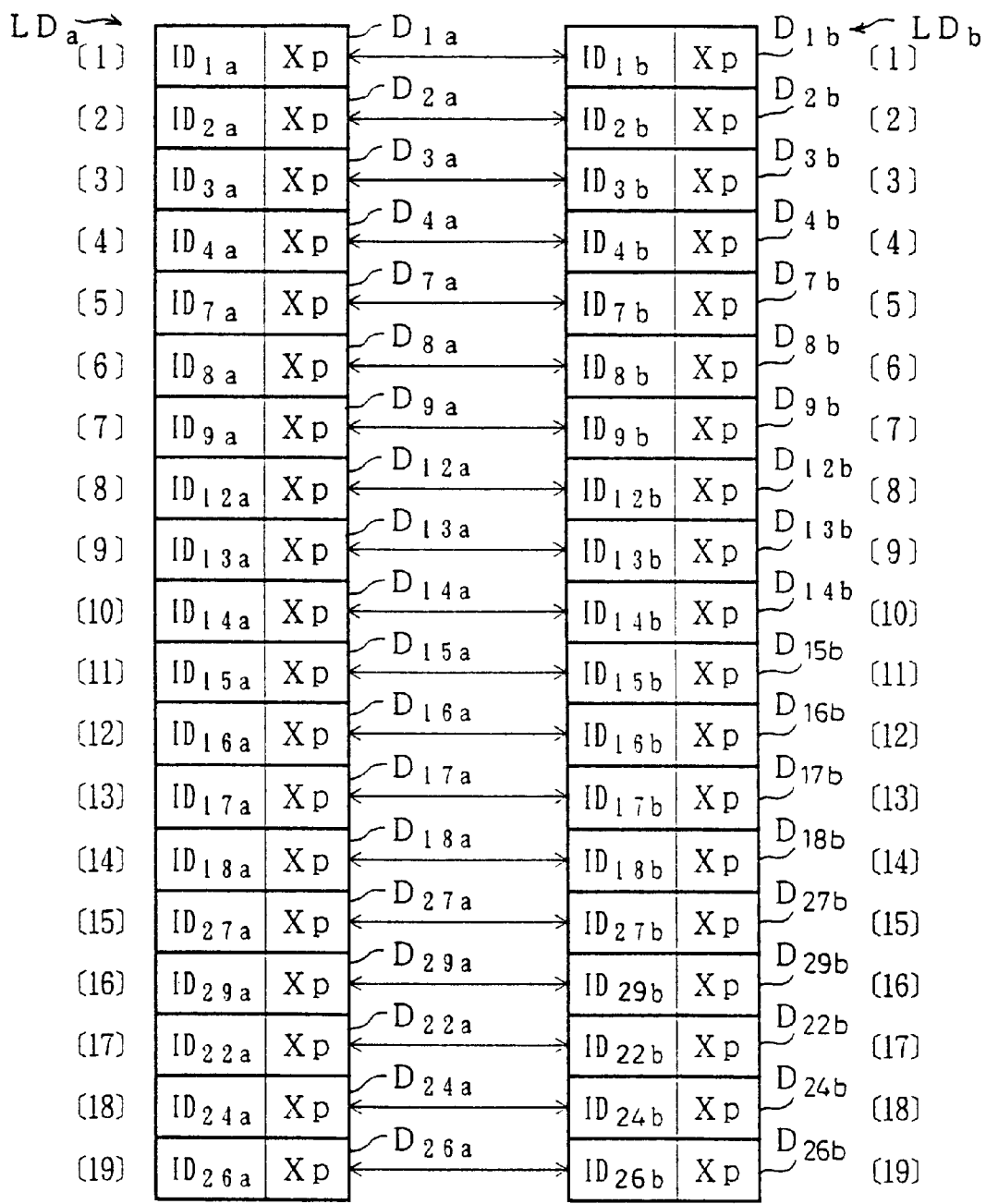
FIG. 37 is an explanatory drawing showing dirty bit lists which were further compressed after the data contents synchronous process, explaining the synchronous process of the database system.

Then, when the tip synchronization is finished in S54 and S55, compression of the dirty bit lists LD is carried out in S56 on the both sides, and the dirty bits D having the value of "K" are deleted from their respective dirty bit lists LD. For example, in FIG. 36, seven dirty bits D on the 5th, 6th, 10th, 11th, 19th, 20th, and 21st positions are deleted from their respective dirty bit lists LD. As a result, as shown in FIG. 37, all the dirty bits D become "Xp" and the sink limit Lim is updated in accordance with the number of dirty bits D. Note that, in the example of FIG. 37, even though the order of dirty bits D having the value of "Xp" is not changed, provided that the order of corresponding dirty bits is the same between the dirty bit lists LD on the both sides, the order may be changed.

By the synchronous process of S51 through S56, the number of tips T and the contents of corresponding tips T become the same between the sharing bags SF on the both sides. As a result, even when the database 1 is independently operated in one of the information processing devices 2, by carrying out the synchronous process at the time when the information processing devices 2 are ready to communicate, it is possible to make the contents of the sharing bags SF to be coincident with each other. Therefore, even when the database 1 is composed between the information processing devices 2 whose communications time is intermittent, the integrity of data is maintained.

Further, in the above synchronous process, before sending the contents of the tips T in S55, the dirty bits D are compared with each other between the information processing devices 2a and 2b, and the need to send the contents and the transmission direction are determined per tip T. Thus, with regard to the tips T so judged that there is no need to send the contents thereof, the transmission of contents can be omitted. Here, in the present embodiment, update of contents is monitored with respect to the tips T having the dirty bits D. Therefore, the transmission of contents can be omitted with respect to not only the tips T which have been neither moved nor updated but also the tips T which have existed in the sharing bag SF in the previous synchronous process and are existing in the sharing bag SF in the current synchronous process and which have not been updated during the non-synchronous period.

Also, in the present embodiment, because the correspondence of the tips T is stored as the order of dirty bits D, the correspondence can be stored without storing IDs indicative of the tips T of the other party. Also, because the corresponding tips T can be specified without sending the IDs, it is possible to reduce the amount of data transmitted between the information processing devices 2a and 2b when sending and receiving the dirty bits D, and the amount of memory required for storing the dirty bits D.

Note that, in the present embodiment, the dirty bits D are created with respect to the tips T which have been contained even once in the sharing bag SF during the non-synchronous period. However, not limiting to this, as long as the dirty bits D are created with respect to the tips T which are contained in the sharing bag SF at the time the preceding synchronous process has finished, it is possible, as with the present embodiment, to omit sending of the contents of the tips T which were only moved in the described manner. However, in the case where the dirty bits D are created with respect also to the tips T which are currently contained in the sharing bag SF, it is possible to increase the searching speed of the tips T which were newly inserted during the non-synchronous period, and to create a list of tips T contained in the sharing bag SF from the tree structure of FIG. 6 by extracting only the tips T whose dirty bits D have the movement parameters of either "X" or "I". As a result, the lists of the tips T can be deleted, thereby reducing the amount of memory.

Note that, individual processes, for example, such as addition of tips T, may be carried out by the synchronize processing section 51 of either information processing device 2. For example, all processes may be carried out by the synchronize processing section 51 of one party, or of the both parties.

The following will describe the operation when a collision of tips T is detected in more detail. Namely, in the present embodiment, when a collision is detected, one of the following three models is adopted as parties which solve the collision. Note that, any model can be selected but the information processing device 2 in accordance with the present embodiment adopts a model from a plurality of employable models, which was selected as an option in the sharing setting of S1 in FIG. 31.

Figure 38:
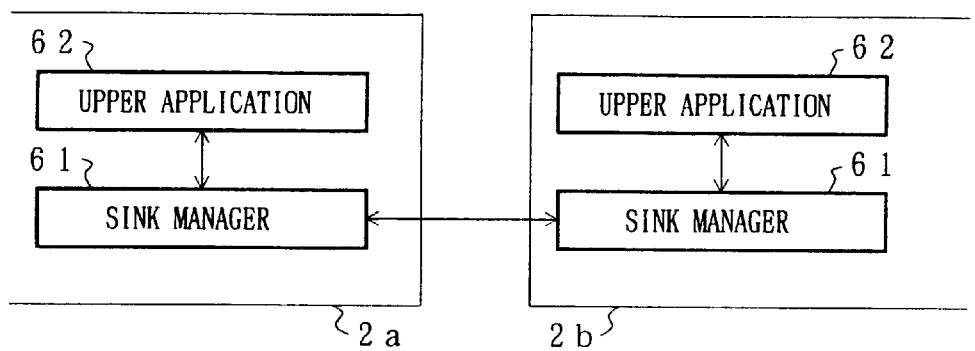
FIG. 38 is an explanatory drawing showing a talk model, explaining parties solving a tip collision in the database system.
Figure 39:
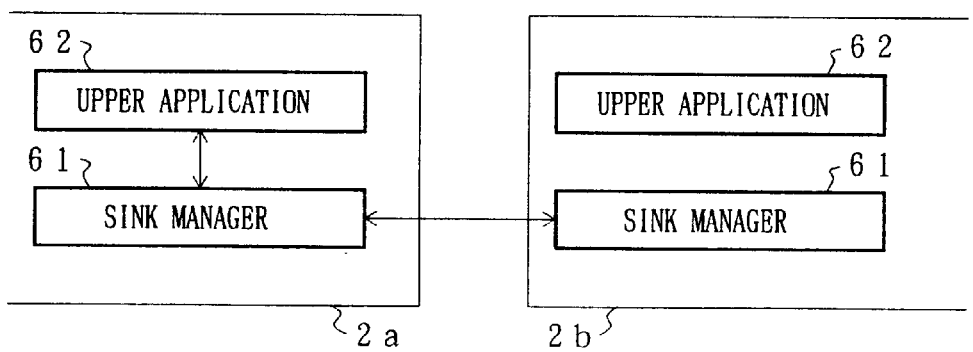
FIG. 39 is an explanatory drawing showing a selection solution model, explaining parties solving a tip collision in the database system.
Figure 40:
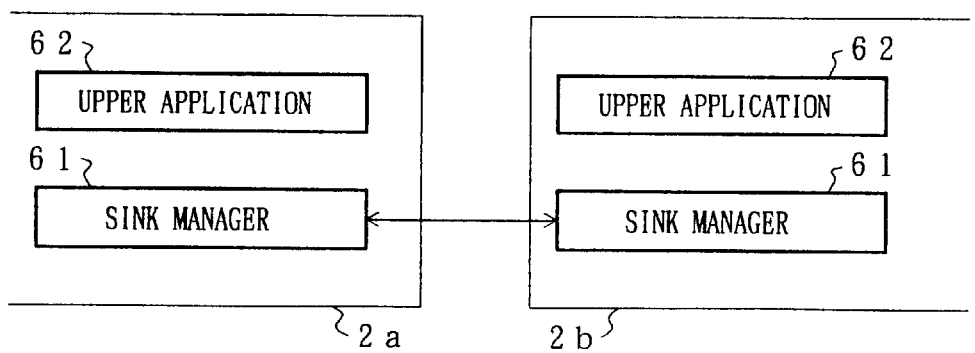
FIG. 40 is an explanatory drawing showing an automatic solution model, explaining parties solving a tip collision in the database system.

In a first model (talk model), as shown in FIG. 38, respective sink managers 61 of the information processing devices 2a and 2b inquire their respective upper applications 62 about a priority side so that the priority side is independently decided by the information processing devices 2a and 2b. In a second model (selection solution model), as shown in FIG. 39, only the sink manager 61 of the information processing device 2a or 2b makes an inquiry to the upper application 62 to decide the priority side. In a third model (automatic solution model), as shown in FIG. 40, no inquiries are made to the upper applications 62 and the priority side is decided based on a predetermined priority rule by the both sink managers 61. Note that, the sink manager 61 is part of the synchronize processing section 51 as shown in FIG. 1. The upper application 62 is an application for referring to the data of a database, such as an application for analyzing the data of a database, or an application for inquiring the user of the information processing device 2 about the priority side, and the upper application 62 can respond to the inquiry from the sink manager 61 by giving back the priority side.

Note that, in the selection solution model, the method of selecting one information processing device 2 may be a one side selection model of the automatic solution model, which will be described later, such as the presence or absence of the upper application 62, and, for example, the promoting side of sharing setting. However, as with the model representing the method for deciding the priority side, when the information processing devices 2 to be selected are different, there is a case where an undesired device is selected, and for this reason the method for selecting the information processing device 2 is set at the time of sharing setting.

The talk model can be further divided, on the basis of the timing for solving the collision, into a negotiation solution model which solves a collision during the synchronous process in which the collision was detected, and an application solution model which disconnects the communications between the detection of the collision and the solution of the collision. Similarly, the selection solution model can be divided into a client immediate model and a client delay model. Note that, as shown in FIG. 41, the negotiation solution model and the client immediate model are categorized into an immediate solution model in which the solution timing is in the synchronous process at the time of detection, and the application solution model and the client delay model are categorized into a delay solution model in which the solution timing is in the synchronous process after the detection of the collision.

Figure 42:
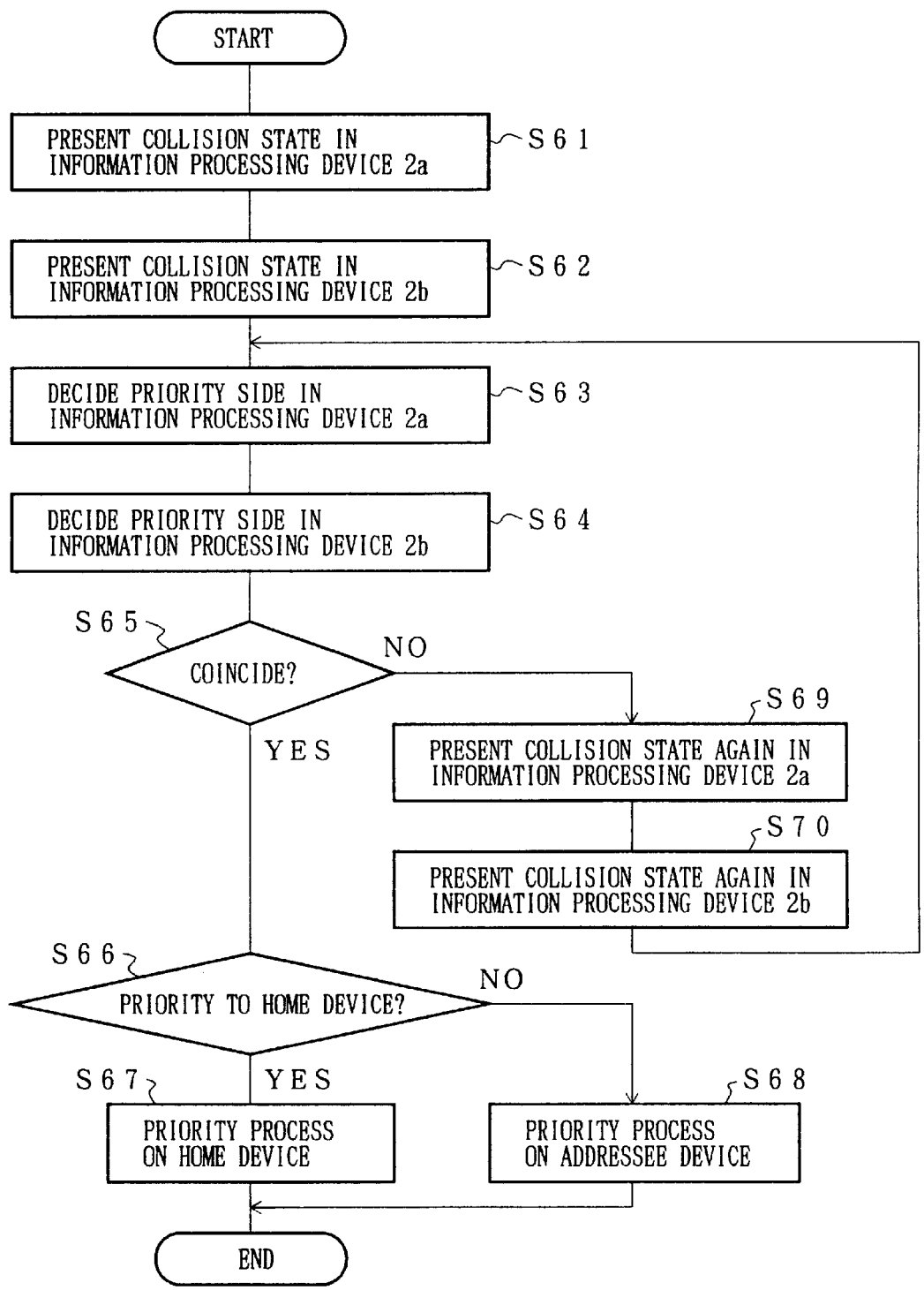
FIG. 42 is a flowchart showing a negotiation solution model, explaining an operation when solving a tip collision in the database system.

Here, when the negotiation solution model of the immediate solution model is selected, for example, as shown in FIG. 42, in S61, the sink manager 61 of the information processing device 2a presents the information required for deciding the priority side from the contents of its tips T and the information required for deciding the priority side from the contents of the other party's tips T to the upper application 62. In the same manner, in S62, in the information processing device 2b, information indicative of its tips T and the other party's tips T is presented to the upper application 62. In S63 and S64, the respective upper applications 62 of the information processing devices 2a and 2b independently decide the priority side.

Note that, in the following, when discussing equivalent information processing devices 2 in relative terms, for convenience of explanation, an information processing device 2 of one party with respect to an information processing device 2 (and its components) of the other party is arbitrarily referred to as a home device, and the information processing device 2 to be brought into communications with the home device is referred to as an addressee device (home device and addressee device are equivalent).

When the priority sides are decided on the both parties, the sink manager 61 of each party in S65 judges whether the priority sides of the both parties coincide with each other. When there is a coincidence (YES in S65), in S66, it is judged whether the priority side is on a home device. If so, in S67, the sink manager 61 of the home device sends the contents of the tips T to the information processing device 2 of the other party (addressee device) so as to replace the contents of the tips T of the addressee device with the tips T thus sent. If the priority side is not on the home device, in S68, the home device receives the contents of the tips T of the addressee device so that the contents of the tips T of the home device are replaced with the contents thus received. As a result, the contents of the colliding pairs of tips T become the same.

When there is no coincidence of priority sides in S65, the sink manager 61 of the information processing device 2a is S69 presents the priority side as decided by the information processing device 2b to the upper application 62, together with the contents presented in S61. In the same manner, the sink manager 61 of the information processing device 2b in S70 presents the priority side as decided by the information processing device 2a to the upper application 62, together with the contents presented in S62. Thereafter, the processes after S63 are repeated and the priority side is reconsidered in the respective upper applications 62 of the both parties.

Figure 43:
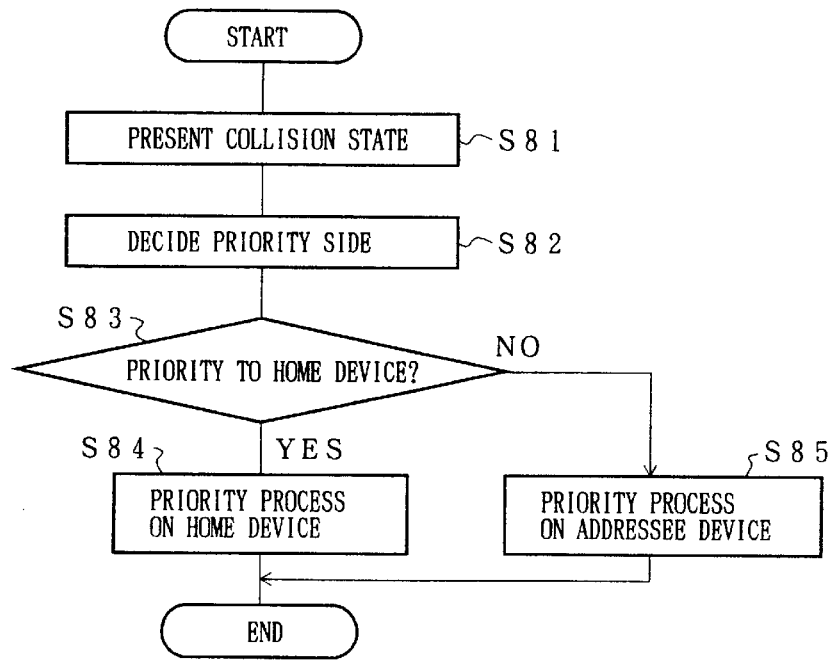
FIG. 43 is a flowchart showing a client immediate model, explaining an operation when solving a tip collision in the database system.

When the client immediate model is adopted, for example, as shown in FIG. 43, in one of the information processing devices 2 (home device), as in S61 of FIG. 42, the information indicative of the tips T and the tips T of the other party (addressee device) is presented to the upper application 62 (S81). In S82, the upper application 62 decides the priority side based on this information. When the priority side is on the home device (YES in S83), in S84, the contents of the other party's tips T are replaced with the contents of the tips T of the home device. When the priority is given to the addressee device (NO in S83), the contents of the tips T of the home device are replaced with the contents of the tips T of the addressee device in S85. As a result, the contents of the colliding pairs of tips T become the same.

Figure 44:
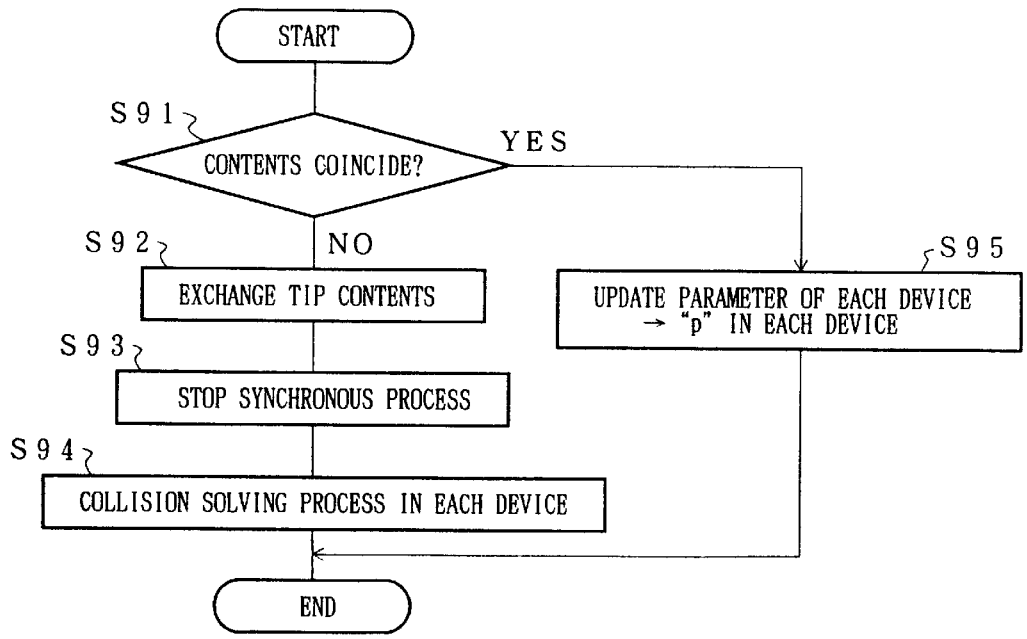
FIG. 44 is a flowchart showing an application solution model, explaining an operation when solving a tip collision in the database system.

When the application solution model of the delay solution model is selected, for example, as shown in FIG. 44, it is judged in S91 whether the contents of the tips T on the both parties coincide with each other. If there is a coincidence, it means that the collision of tips T was detected in the previous synchronous process, and the solutions independently proposed by the both parties coincide. In such a case, in S95, each sink manager 61 of the information processing devices 2a and 2b sets the update parameter of the dirty bits D corresponding to the tips T to Maintain "p", and the process is finished.

On the other hand, when the contents of the tips T do not coincide (NO in S91), after exchanging the contents of the tips T with each other in S92, the sink manager 61 of each party temporarily stops the synchronous process with respect to these tips T in S93, for example, by disconnecting the communications or by judging a collision of other tips T. Also, while the communications are disconnected, the respective sink managers 61 of the information processing devices 2a and 2b carry out, independently from each other, the collision solving process in accordance with an instruction of their respective upper applications 62, and the process is finished.

Figure 45:
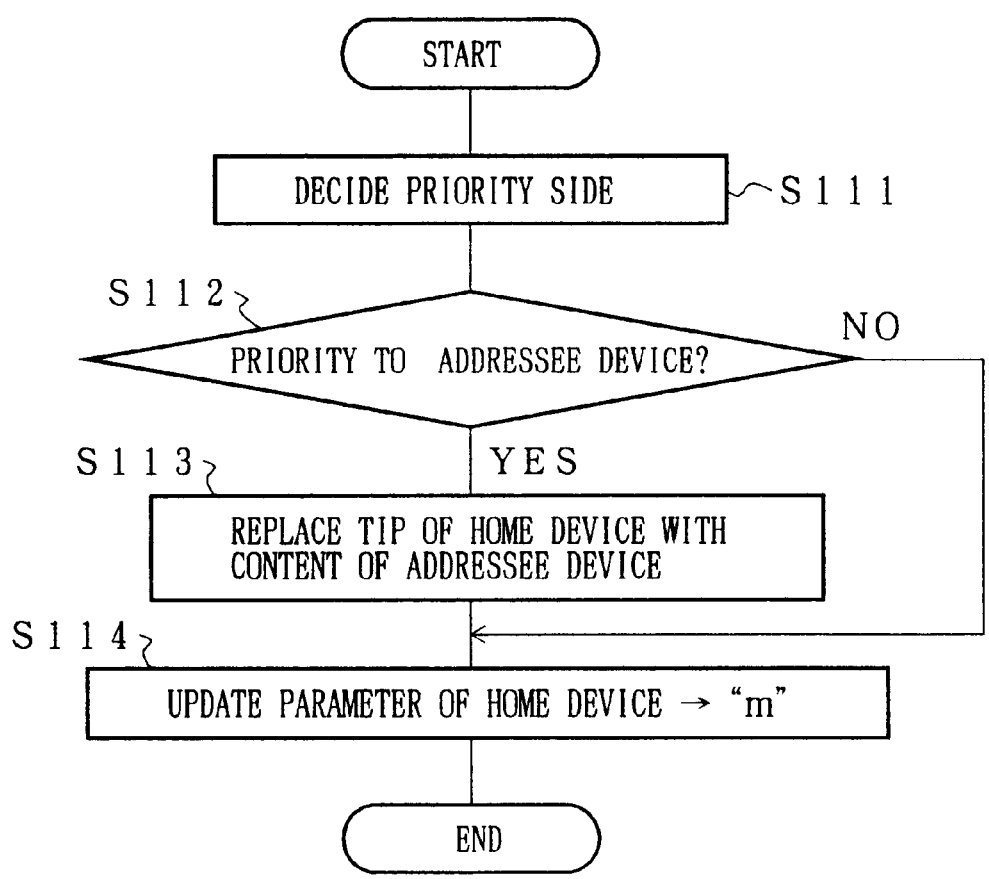
FIG. 45 is a flowchart explaining FIG. 44 in more detail.

The following describes the process of S94 in more detail referring to FIG. 45. Namely, the sink manager 61 of one party (home device) in S111 presents the contents of the tips T received in S91 from the other party (addressee device) to the upper application 62, together with the contents of its tips T so as to receive an instruction from the upper application 62 as to which party should be given a priority.

When it is judged by the upper application 62 of the home device that the contents of the tips T of the addressee device should be given a priority (YES in S112), the sink manager 61 of the home device in S113 replaces the contents of the tips T with the contents of the tips T of the addressee device, and in S114, sets the update parameter of the dirty bits D corresponding to these tips T to Update "m" and the process is finished. On the other hand, when it is judged that the contents of the tips T of the home device should be given a priority (NO in S112), the sink manager 61 in S114 sets the update parameter of the dirty bits D corresponding to the tips T to Update "m" without carrying out the process of S113.

Here, when the processes of S111 to S114 are carried out by the information processing devices 2a and 2b, because the update parameter of the dirty bits D is set to Update "m" in S114 regardless of which side is given a priority, a collision is judged in the next synchronous process. However, when there is a coincidence of priority sides between the both parties, the tips T of the both parties coincide with each other, and the judgement of S91 in FIG. 44 becomes YES.

For example, when the information processing device 2a judges that the priority side is on the device of the other party, and the information processing device 2b judges that the priority side is on the information processing device 2b itself, the judgement of S112 is YES in the information processing device 2a, and the contents of the tips T of the information processing device 2a are replaced with the contents of the tips T of the information processing device 2b. Meanwhile, the judgement of S112 is NO in the information processing device 2b, and the contents of the tips T of the information processing device 2b are not changed.

In this manner, when there is a coincidence of the priority sides between the both parties, the contents of the tips T coincide at the time of the next synchronous process, and the judgement of S91 becomes YES. As a result, the process of S95 is carried out in the both information processing devices 2a and 2b, and the update parameter of the dirty bits D corresponding to the tips T becomes Maintain "p" on the both parties and the collision is solved completely.

Note that, in the case where there is no coincidence of priority sides between the both parties, the contents of the tips T do not coincide in the next synchronous process. Thus, the processes after S92 are repeated again in the next synchronous process, and the respective upper applications 62 of the both parties are requested again to solve the collision.

Figure 46:
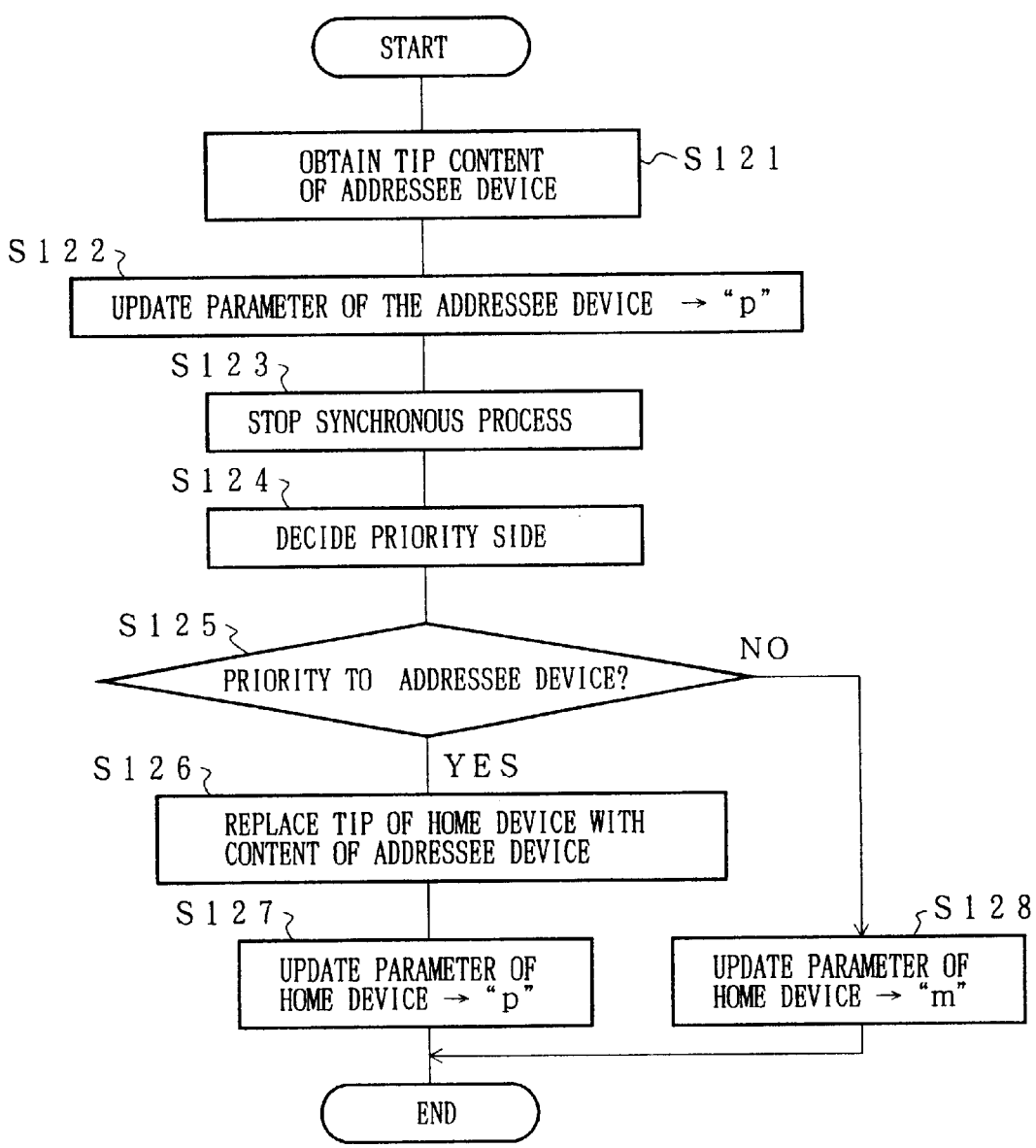
FIG. 46 is a flowchart showing a client delay model, explaining an operation when solving a tip collision in the database system.

In the case of the client delay model, in the information processing device 2 (home device), in which a request is made to the upper application 62, the process as shown in FIG. 46 is carried out. Namely, in S121, the sink manager 61 transfers and receives the contents of the tips T of the addressee device. Further, in S122, the update parameter of the dirty bits D of the addressee device corresponding to the tips T are changed to Maintain "p".

Further, in S123 and S124, as in S93 and S111 in FIG. 45, the priority sides are decided after interruption of the synchronous process. In the case where the addressee device is judged to have the priority side (YES in S125), the sink manager 61 of the home device in S126 replaces the contents of the tips T with the contents of the tips T of the addressee device received in S121. Further, in the home device, the update parameter of the dirty bits D corresponding to the tips T is set to Maintain "p" in S127 and the process is finished.

On the other hand, in the case where the home device is judged to have the priority side (NO in S125), the sink manager 61 of the home device sets the update parameter of the dirty bits D corresponding to the tips T to Update "m" (S128). Here, in S122, the update parameter of the dirty bits D corresponding to the tips T is set to Maintain "p" in the addressee device. Thus, when the home device is judged to have the priority side (when update parameter is Update "m"), the contents of the tips T of the addressee device are replaced with the contents of the tips T of the home device.

In the case where the delay solution model is adopted, after the collision of tips T is detected in a certain synchronous process, the contents of the tips T become coincident between the parties in the subsequent synchronous processes, and for this reason it is not required to decide the priority sides in the synchronous process. As a result, even when a response time of the request for the priority side to the sink manager 61 is long, for example, as in the case where the upper application 62 is receiving the user's instruction, it is possible to limit the total communications time within a certain time period, thus reducing the communications cost and power consumption. Note that, the above explanation described the case where the all contents of the tips T on the both sides are presented. However, as long as the priority side is decided, the same effect can be obtained even when the information presented is the occurrence of a collision or a part of the contents of the tips T.

Figure 47:
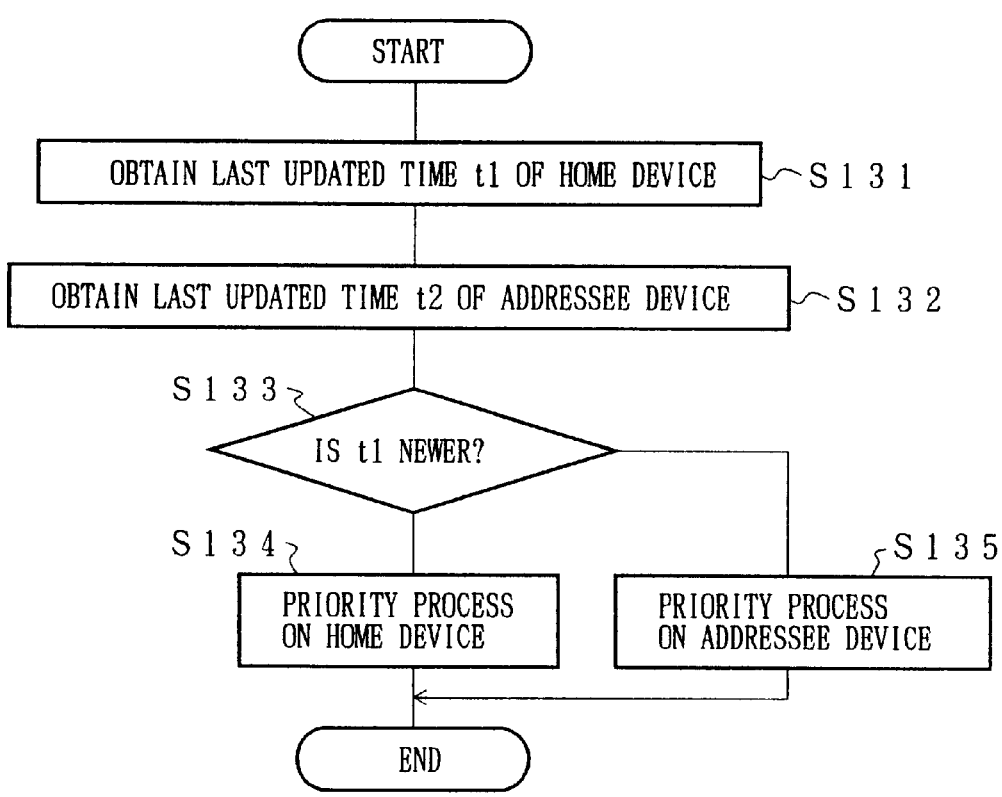
FIG. 47 is a flowchart showing the automatic solution model based on the last updated time, explaining an operation when solving a tip collision in the database system.

The automatic solution model can be roughly divided into a consecutive deciding model in which the priority side is decided per each pair of the colliding tips T, and the one side selection model in which one of the information processing devices 2 is set in advance to have the priority side at the start of the synchronous process. An example of the former includes the method in which the priority side is judged based on partial contents of the tips T, for example, such as the last updated time. In such a case, for example, as shown in FIG. 47, in S131, the sink manager 61 of each party as shown in FIG. 40 obtains within its information processing device 2 the last updated time t1 of the tips T to be processed. Also, in S132, the last updated time t2 of the other party's tips T corresponding to the tips T of the last updated time t1 is obtained. Further, in S133, it is judged in each device whether the last updated time t1 is newer than the last updated time t2 of the other party. In the case where the last updated time t1 is newer than the last updated time t2, the contents of the other party's tips T are replaced with the contents of the tips T of the last updated time t1 in S134. On the other hand, in the case where the last updated time t2 of the other party is newer, the contents of the tips T of the last updated time t1 are replaced with the contents of the other party's tips T in S135. As a result, the tips T which were updated most recently are given a priority. For example, in the example as shown in FIG. 48, the last updated time of the tip $T_{8a}$ of the information processing device 2a is newer than the last updated time of the tip$_{8b}$ of the information processing device 2b. Thus, the contents of the tip$_{8b}$ are replaced with the content of the tip$_{8a}$. Note that, the criteria for deciding the priority side are not just limited to the last updated time, and the same effect can be obtained as long as the criteria used are part of the contents of the tips T.

Figure 49:
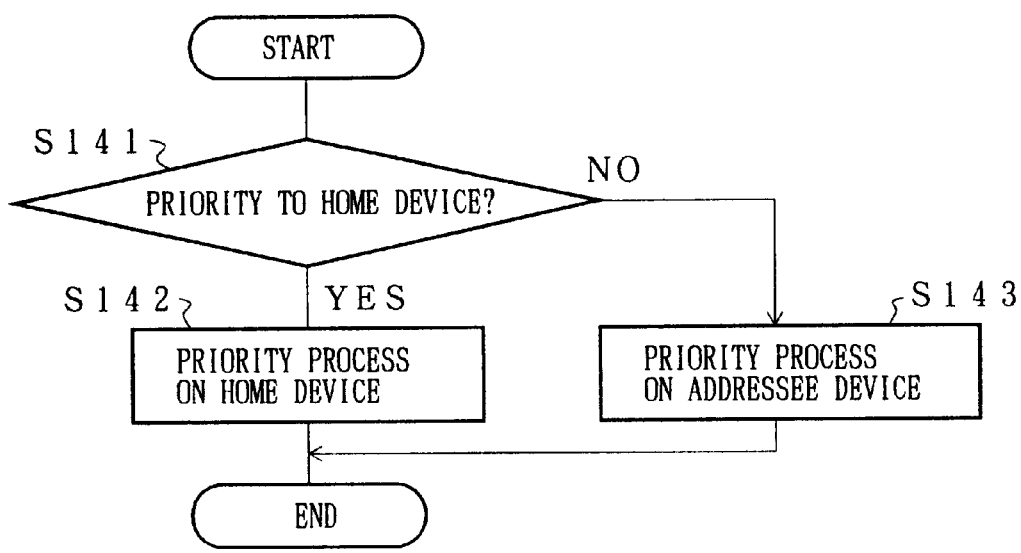
FIG. 49 is a flowchart showing a one side selection model of the automatic solution model, explaining an operation when solving a tip collision in the database system.

In the one side selection model of the automatic solution model, for example, as shown in FIG. 49, it is judged in each device in S141 whether the priority side which was set before the start of the synchronous process is on the home device. When the priority is given to the home device, in S142, the contents of the tips T of the addressee device are replaced with the contents of the tips T of the home device, and when the priority is given to the addressee device, in S143, the contents of the tips T of the home device are replaced with the contents of the tips T of the addressee device, thereby giving a priority to the tips T of a predetermined party.

In the present embodiment, the priority side referred to in S141 is determined by any one of the following three models. In a first model, the priority side is set in advance in the synchronous setting of S1 of FIG. 13, and the priority side thus set is stored as priority side information, and the priority is decided based on this priority side information. Note that, the priority side can be set by any method, and, for example, it may be set in accordance with an instruction of the user or of the upper application 62.

In a second model, the priority side is decided based on the side which promoted the sharing setting in the first model, and the second model can be further divided into a sharing setting promoting side priority model and a sharing setting receiving side priority model. The sharing setting promoting side priority model is suitably adopted in the case where, for example, the database system 1 composed of the information processing devices 2 always wants to give a priority to the client side of the client/server type, and the sharing setting promoting side is always given a priority regardless of the promoting side of the synchronous process or the contents of the tips T. On the other hand, the sharing setting receiving side priority model is suitably adopted in the case where, for example, the database system 1 always wants to give a priority to the server side, and the sharing setting receiving side is always given a priority. In either case, promoting of the sharing setting and specifying of the priority side can be instructed by the same operation, thus simplifying the operation compared with the case where these processes are instructed by different operations.

In a third model, the priority side is determined based on the promoting side of the synchronous process in S3 of FIG. 13, and the third model can be further divided into a synchronous process promoting side priority model and a synchronous process receiving side priority model. These models are used, for example, between equivalent information processing devices 2, wherein the former is used when the home device is to be given a priority and the latter is used when the addressee device is to be given a priority. In either case, promoting of synchronous process and specifying of the priority side can be instructed by the same operation, thus simplifying the operation compared with the case where these processes are instructed by different operations. Further, in each synchronous process, the priority side can be changed depending on which information processing device 2 promotes the synchronous process.

Incidentally, in the above explanation, as shown in FIG. 30 and FIG. 33, of the pairs of tips T corresponding to each other, the tips T which have been subjected to change, such as addition/deletion/update are given the priority, and this change is reflected in the information processing device 2 of the other party. However, not limiting to this, for example, it is also possible to always give a priority to the side (priority side) which has been decided already before the start of the synchronous process with respect to all the pairs of tips T, such as the promoting side of the synchronous process or sharing setting, or a predetermined side, and for example, as shown in FIG. 50, it is possible t update the contents of the sharing bag $SF_b$ in the information processing device 2b to be a non-priority side, in accordance with the contents of the sharing bag $SF_a$ Of the information processing device 2a (priority side). In such a case, the synchronous process is a download (upload). Note that, when the information processing device 2 can select whether to carry out download, the selection is instructed preferably as an option of the sharing setting in S1 of FIG. 13, as with the model for deciding the priority side.

Figure 51:
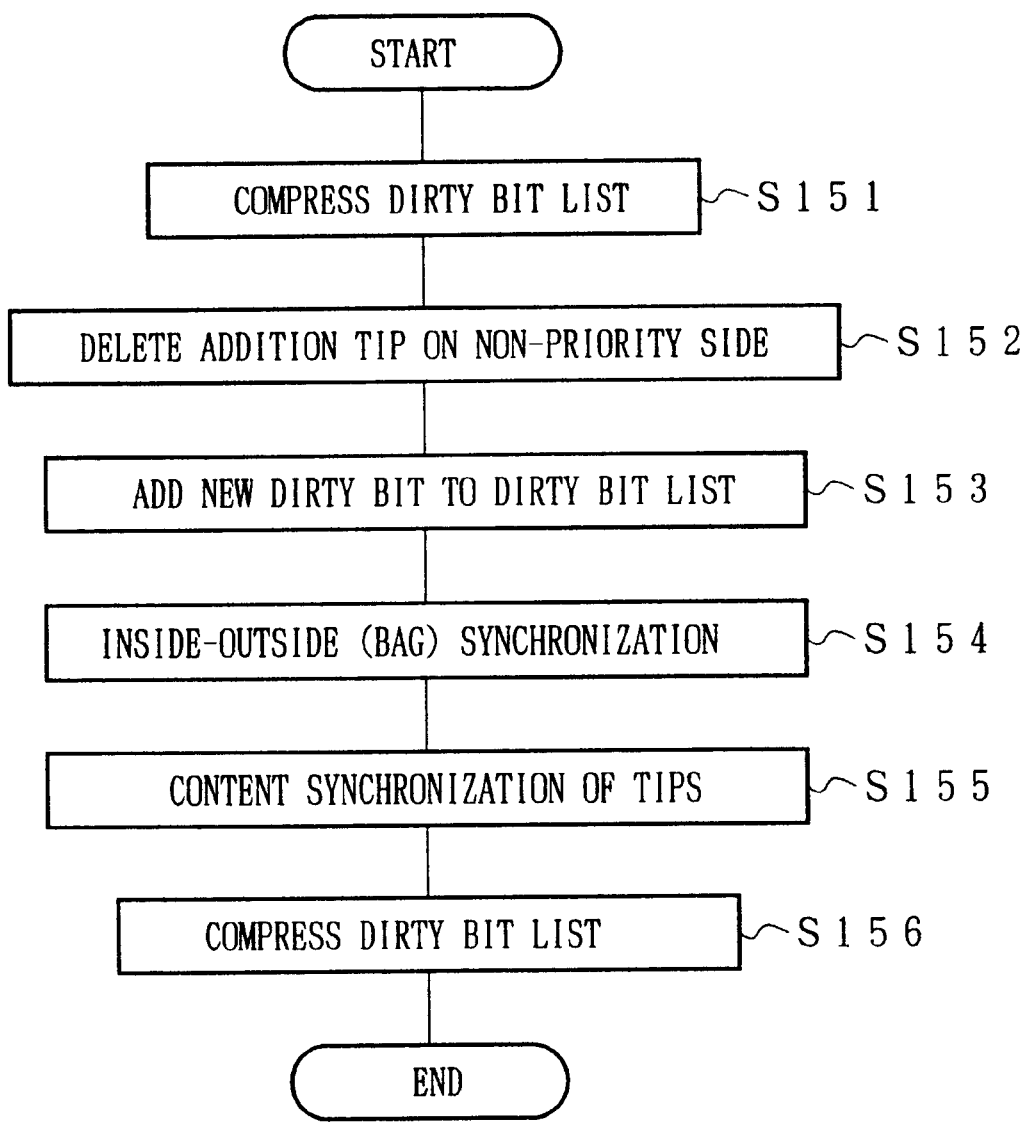
FIG. 51 is a flowchart showing a download operation in the database system.

Specifically, as shown in FIG. 51, the dirty bit lists LD on the priority side are compressed in S151 as in S51 of FIG. 26. Further, in S152, the tips T which were added during the non-synchronous period are deleted from the sharing bag SF on the non-priority side. In S153, the dirty bits D corresponding to the tips T added on the priority side are added to the dirty bit lists LD of the non-priority side as in S52.

In S154, the synchronize processing section 51 as shown in FIG. 1 carries out an inside-outside judgement based on the dirty bits D on the priority side, and the movement parameters of the dirty bits D are set to "X" or "K" in the dirty bit lists LD of the both parties, and the tips T are moved in accordance with the inside-outside judgement. Namely, when the movement parameters of the dirty bits D on the priority side are either "X" or "I", inside of the sharing bag SF is indicated. Thus, the tips T are left in the sharing bag SF, and the movement parameters of the dirty bits D of the both parties, corresponding to the tips T are set to "X". When the movement parameters of the dirty bits D on the priority side are "K" or "O", outside of the sharing bag SF is indicated, and the tips T are moved outside of the sharing bag SF, and the movement parameters of the dirty bits D of the both parties, corresponding to the tips T are set to "K".

Further, in S155, the contents of the tips T on the non-priority side are replaced with the contents of the tips T on the priority side based on the update parameters of the dirty bits D of the both parties. Specifically, when the update parameter on the priority side is Update "m", the contents of the tips T are sent to the non-priority side. Also, even in the case where the update parameter on the priority side is Maintain "p", when the update parameter on the non-priority side is Update "m", the contents of the tips T on the non-priority side are replaced with the contents of the tips T on the priority side in the described manner. Note that, when the update parameters of the both parties are Maintain "p", the contents of the tips T are not transferred.

When the contents synchronization of the tips T is finished in S155, the dirty bit lists LD of the both parties are compressed in S156, as in S56 of FIG. 26. As a result, the contents of the sharing bags SF on the non-priority side are become in accordance with the contents of the sharing bags SF on the priority side, thus carrying out upload and download.

Also, as one of the options which can be set in the sharing setting processing section 52, as shown in FIG. 52, it is possible to adopt a model in which collided tips T are regarded as different tips T, and the tips T of one party are added to the sharing bag SF of the other party. Whether to adopt this model, as with the case of download, is specified as an option in the sharing setting.

Figure 53:
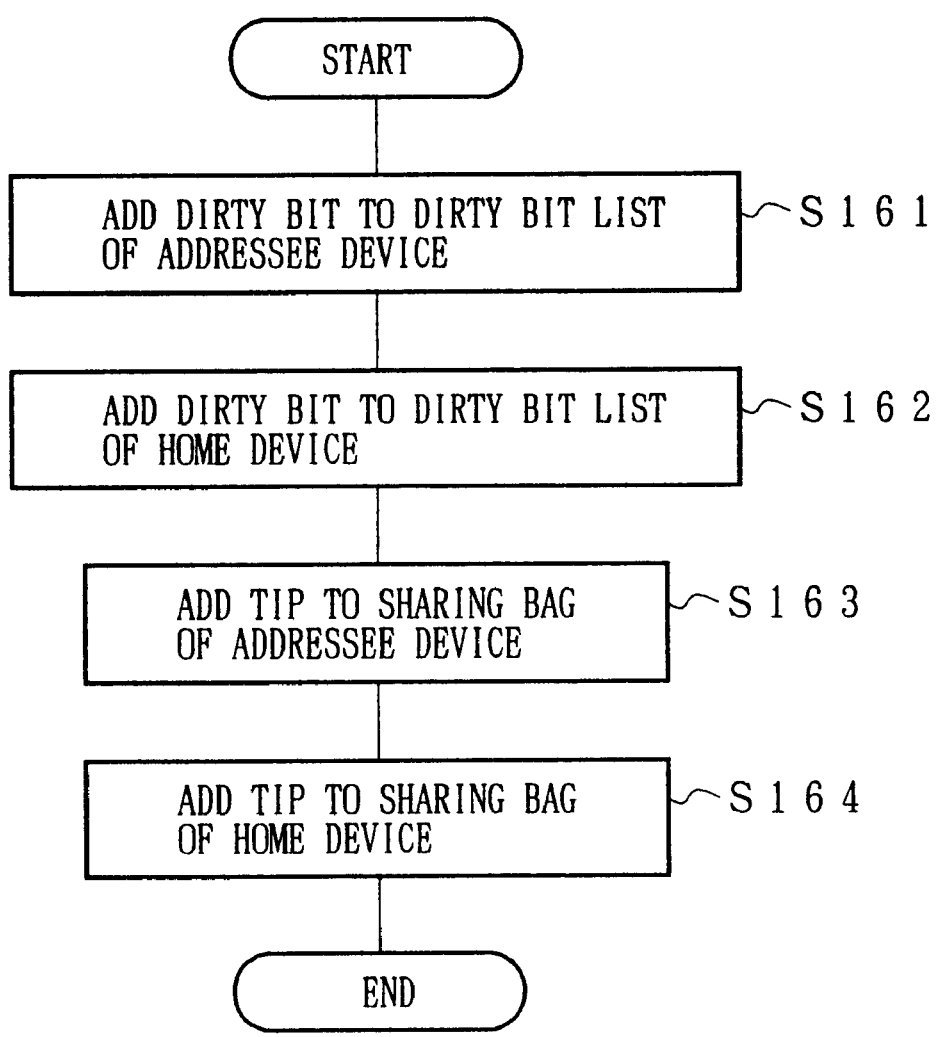
FIG. 53 is a flowchart showing an operation when the correspondence is changed by copying in the database system.

Specifically, as shown by S161 in FIG. 53, in the case where tips $T_{4a}$ and $T_{4b}$ collide, in a dirty bit list $LD_b$ of the addressee device is created a dirty bit $D_{4ab}$, for example "Op", having a lower priority than and on the same position as a dirty bit $D_{4a}$ in the dirty bit list $LD_a$ of the home device. In the same manner, in S162, in the dirty bit list $LD_a$ of the home device is created a new dirty bit $D_{4ba}$ on the same position as that of a dirty bit $D_{4b}$ of the addressee device. Also, in S163, the contents of the tip $T_{4a}$ are transferred to the information processing device 2b based on the newly created dirty bits D, and a new tip $T_{4ab}$ corresponding to the tip $T_{4a}$ is added to the sharing bag $SF_b$. Also, in S164, a new tip $T_{4ba}$ corresponding to the tip $T_{4b}$ is added to the sharing bag $SF_a$. As a result, it is possible to save all the contents of the updated tips T when the tips T collide.

Note that, FIG. 52 and FIG. 53 explained the case where copying is carried out only when there is a collision of tips T. However, as shown in FIG. 54, it is also possible as another option to adopt a model in which copying is carried out when at least one of the corresponding tips T is updated. In this case, while no change is made to a pair of tips T which have not been changed, the tips T are copied when at least one of tips T of the pair is changed. Therefore, copies of tips T are also made with respect to a pair of tips $T_{2a}$ and $T_{2b}$ and a pair of tips $T_{3a}$ and $T_{3b}$, in which only one of the tips T was changed in each pair, thus saving all the contents of the tips T changed.

Figure 55:
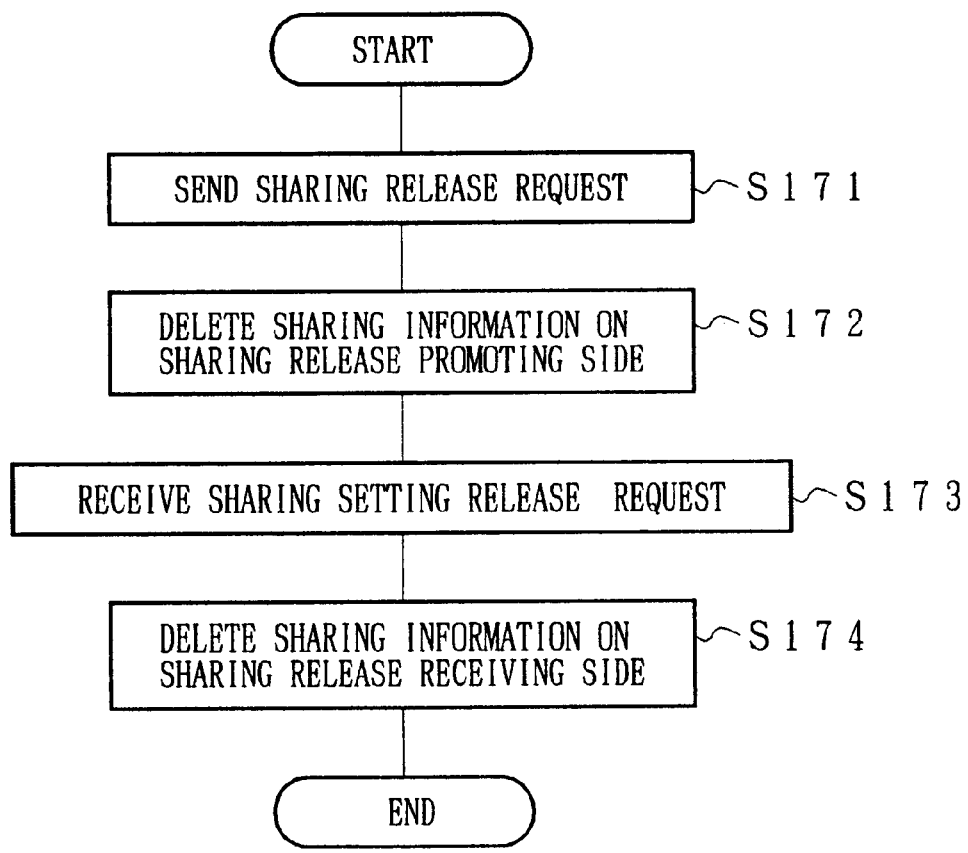
FIG. 55 is a flowchart explaining in detail an operation of sharing release in the database system.

The process in the non-synchronous period as shown in S2 of FIG. 13 and the described synchronous process of S3 are alternately repeated, and in the subsequent processes, when the synchronous process is no longer required, the sharing setting is cancelled in S4. As an example of the sharing release, a model (tip copying model) in which bags F and tips T remain in the both information processing devices 2a and 2b is explained. As shown in FIG. 55, a sharing release processing section 53 of the information processing device 2a in S171 sends a sharing release request to a sharing release processing section 53 of the information processing device 2b. The sharing release request of the home device includes information indicative of the sharing bags SF, for example, such as a combination of the bag IDs and the IDs of the other party, and information indicative of the sharing bags SF of the other party, corresponding to the sharing bags SF of the home device.

Further, the sharing release processing section 53 on the sharing release promoting side in S172 deletes sharing information provided in the sharing setting, for example, such as dirty bit lists LD and the sink limit Lim in accordance with the combination of bag IDs, and the bag IDs of the other party registered in the sharing party list LS. In the information processing device 2b to be the sharing release receiving side, the sharing release processing section 53 deletes the sharing information stored therein based on the sharing release request received (S173, S174). Note that, in FIG. 55, the approval of the sharing party is not shown. However, as with sharing setting, whether to release the sharing may be decided by the sharing release receiving side in accordance with the contents of the sharing release request.

Figure 56:
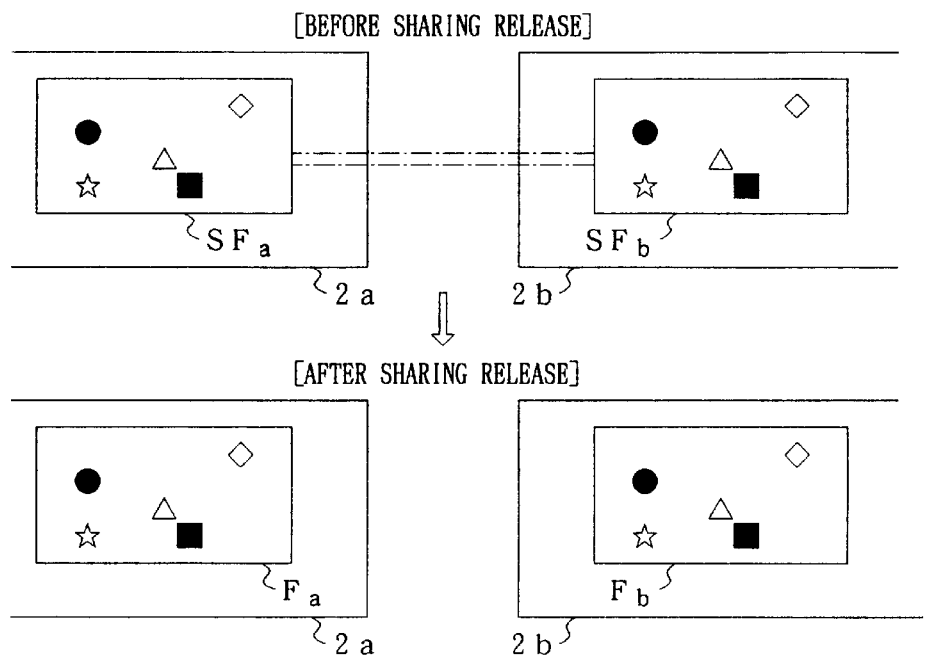
FIG. 56 is an explanatory drawing showing a sharing release of a tip copying model in the database system.

As a result, as shown in FIG. 56, the sharing bags $SF_a$ and $SF_b$, which had been shared between the information processing devices 2a and 2b become non-sharing bags $F_a$ and $F_b$, respectively. In the sharing release of the tip copying model, when sharing release is instructed, only the sharing setting between the sharing bags $SF_a$ and $SF_b$ is released and the tips T contained in them remain in the bags $F_a$ and $F_b$, respectively.

Figure 57:
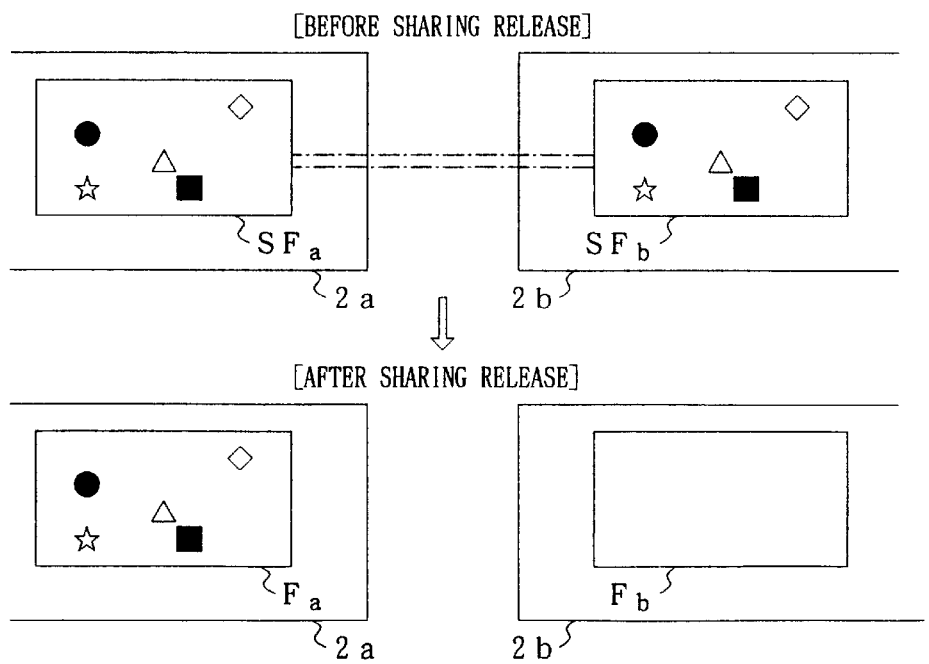
FIG. 57 is an explanatory drawing illustrating, as a modification example of the database system, a sharing release of a tip unbalanced model.
Figure 58:
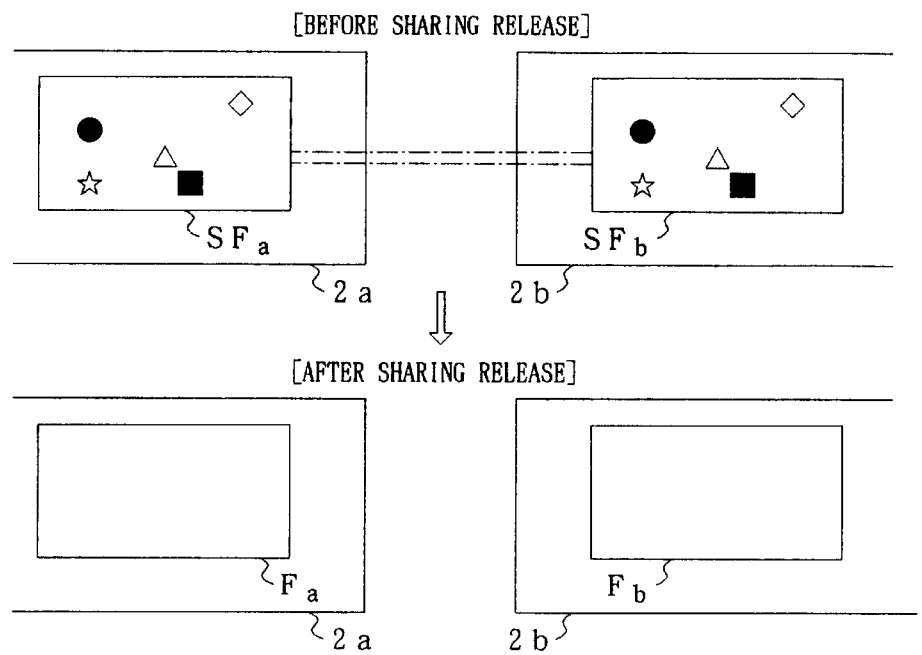
FIG. 58 is an explanatory drawing showing, as another modification example of the database system, a sharing release of a tip erased model.
Figure 59:
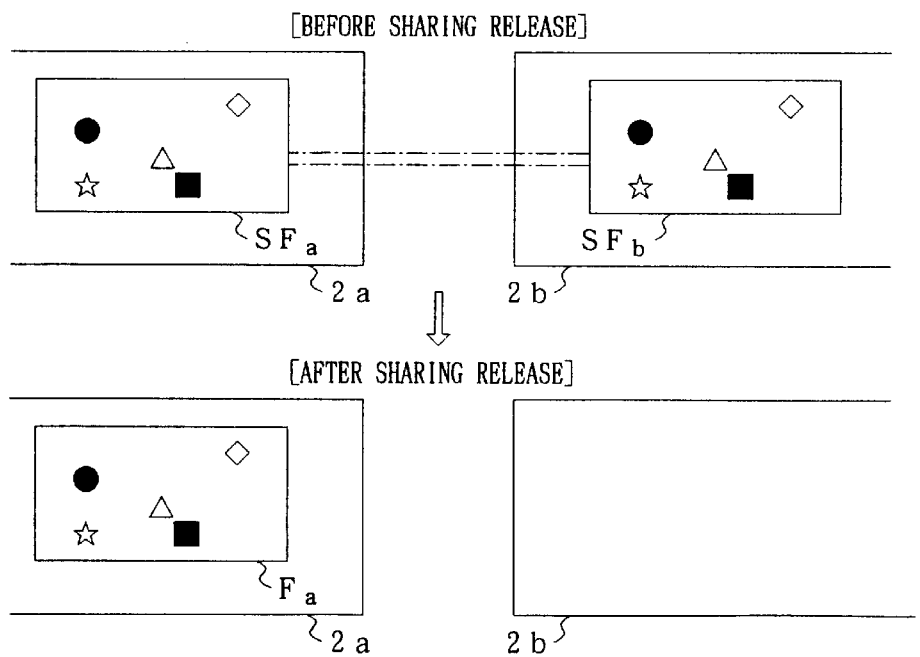
FIG. 59 is an explanatory drawing showing, as another modification example of the database system, a sharing release of the tip unbalanced model in the case where an empty bag is deleted.
Figure 60:
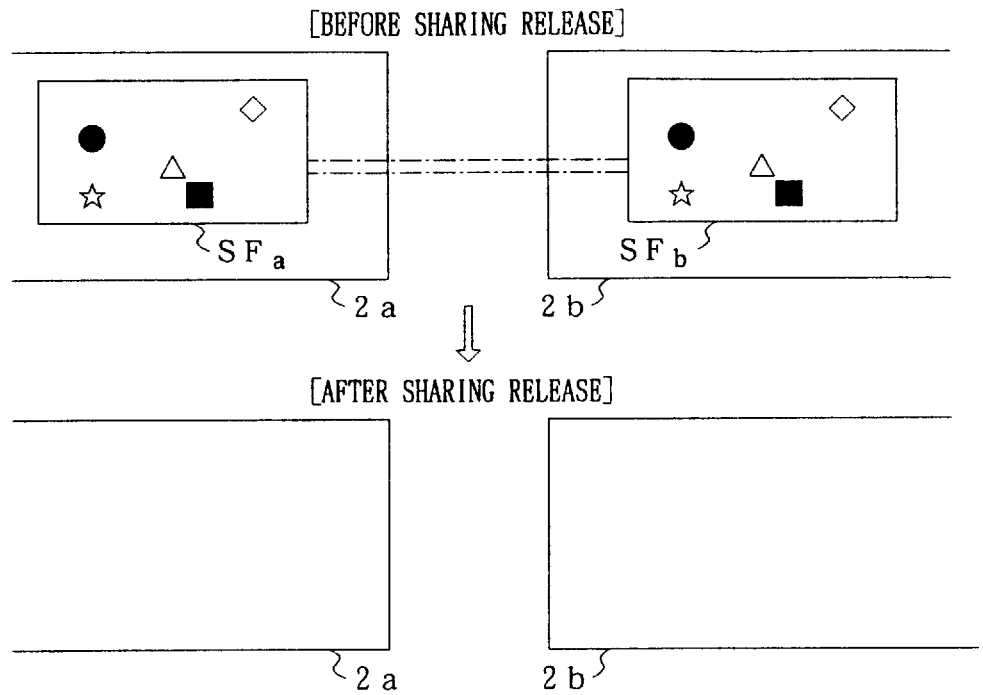
FIG. 60 is an explanatory drawing showing, as still another modification example of the database system, a sharing release of the tip erased model in the case where an empty bag is deleted.

Note that, the model of sharing release is not just limited to the tip copying model and a variety of other models can be adopted. For example, when sharing setting is released, as shown in FIG. 57, it is possible to adopt a model (tip unbalanced model) in which tips T are maintained in the bag F of one party whereas tips T are deleted in the bag F of the other party, or as shown in FIG. 58, a model (tip erased model) in which tips T are deleted from the bags F of the both parties. In the tip copying model and the tip unbalanced model, sharing may be released after the synchronous process when sharing release is instructed. In such a case, the integrity of the tips T can be maintained at the time of the sharing release without particularly instructing the synchronous process. Also, in the case where tips T are removed, as in the tip unbalanced model and the tip erased model, as shown in FIG. 59 and FIG. 60, an empty bag F, from which the tips T have been removed, may be deleted. In any case, when the information processing device 2 can select a plurality of sharing release models, as with the model selection for deciding priority side, it is preferable that the model of the sharing release is set as an option in the sharing setting of S1 of FIG. 13.

Incidentally, in the above explanation, in S51, that is, in the synchronous process of S3 of FIG. 13, the dirty bits D after the sink limit Lim are compressed. Yet, because this process only refers to the dirty bits D stored in the information processing device 2, it can be carried out during the non-synchronous period of S2. Note that, in this case, the first order deleting means as defined in claims corresponds to the database processing section 24.

Figure 61:
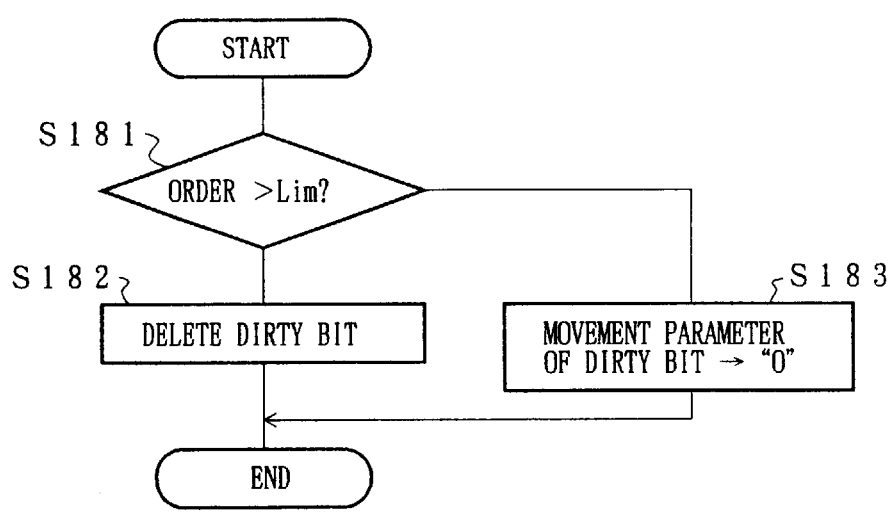
FIG. 61 is a flowchart showing, as yet another modification example of the database system, an operation when the dirty bit list is compressed in the non-synchronous period.

In such a case, when removal of the tips T is instructed, the tip deletion processing section 43 (see FIG. 1) carries out the process as shown in FIG. 61, instead of the process of FIG. 21. Namely, in S181, it is judged whether the dirty bits D corresponding to the tips T are after the sink limit Lim, and if the dirty bits D are after the sink limit Lim, they are deleted from the dirty bit list LD. If the dirty bits D are not after the sink limit Lim, the movement parameter of the dirty bits D is changed to "O" in S183, As a result, the process of S51 is not required in the synchronous process, thus reducing the time required.

In the case where the dirty bits D are compressed during the non-synchronous period, the dirty bits D associated with tips T which exist in the sharing bag SF only momentarily, for example, such as the tips T which are inserted by misoperation, can be immediately deleted from the dirty bit list LD. As a result, an increase in length of the dirty bit list LD can be suppressed, thus reducing the size of the memory required.

FIG. 61 described the case where the dirty bit list LD is compressed when the tips T are removed. However, compression may be carried out at an arbitrary time in the non-synchronous period. In such a case, the dirty bits D which are placed after the sink limit Lim, for example, by the instruction of the upper application, and whose movement parameter is "O" are deleted from the dirty bit list LD. As a result, the dirty bits D of plural tips T can be deleted from the dirty bit list LD by a single process.

Incidentally, in the above explanation, as shown in FIG. 19, in the case where the tips T no longer exist in the sharing bag SF, as in the case where the tips T are moved out of the sharing bag SF, each information processing device 2 set the movement parameter to Remove "O" with respect to the dirty bits D corresponding to the tips T. Thus, when the dirty bits D are allocated to the tips T, it is required to hold the contents of the tips T until the next synchronous process is carried out and this may result in an increase in memory size required for each information processing device 2.

Specifically, for example, with respect to the tips T which have been made corresponded in the previous synchronous process, such as the dirty bits $14_a$ and $14_b$ of FIG. 25, there is a case where the dirty bits D corresponding to the tips T indicate Insert Maintain "Ip" in the information processing device 2a, whereas Remove Maintain "Op" is indicated in the information processing device 2b. This condition occurs when the operation of bringing the tips T back into the sharing bag SF after they were once removed therefrom is carried out, for example, in the information processing device 2a, and when the operation of removing the tips T out of the sharing bag SF is carried out in the information processing device 2b.

In this state, in the inside-outside judgement (bag) synchronization in S53 of FIG. 26, as shown in FIG. 32, the dirty bits $D_{14a}$ and $D_{14b}$ become Still Maintain "Xp", and the contents of the tips $T_{14a}$ and $T_{14b}$ are regarded as the same. As a result, the priority judgement is not carried out in S54 following S53 (see FIG. 35), and the contents of the tips T are not transmitted between the information processing devices 2a and 2b even in the contents synchronization of the tips T in S55 (see FIG. 36).

Therefore, as shown in FIG. 19, when managing the dirty bits D, in the event when the contents of the tips T disappear in one of the information processing devices 2 before the synchronous process, the contents of the tips T cannot be recovered in the synchronous process of FIG. 26, and the integrity of the databases DB cannot be maintained between the information processing devices 2. In other words, in the managing method as shown in FIG. 19, even when the tips T are deleted by the decision of the user in each device, the information processing device 2 is required to hold the contents of the tips T until the next synchronous process is carried out if dirty bits D corresponding to the tips T exist. As a result, a larger memory capacity is required for the information processing device 2 whose non-synchronous period is expected to be long.

Here, in many cases, the memory size which can be installed in a portable information processing device 2 is limited, and further it is not certain as to when communications are enabled and the synchronous process is carried out. Therefore, in such a information processing device 2, as described in the modification example below, it is preferable to adopt the managing method as shown in FIG. 64, instead of the managing method of the dirty bits D as shown in FIG. 19. Note that, in such a case, the database managing section 23 corresponds to corresponded data information storing means as defined in claims, and the tip deletion processing section 43 corresponds to correspondence cancelling means, data deleting means, and deletion selecting means.

Specifically, the information processing device in accordance with the present modification example is capable of processing a tip deleting operation involving deletion of entity, a tip removing operation involving deletion of entity, and an entity deletion operation of the tips T outside the sharing bag SF. In these operations, as shown in FIG. 64, the dirty bits D corresponding to the tips T to be subjected to the operation is set to No Effect "K" regardless their previous values. Also, when deleting the entity of the tips T outside of the sharing bag SF, the values of the dirty bits D are also set to No Effect "K". Note that, as with the case of FIG. 19, the values of the dirty bits D can be represented by, for example, the bit BO and bit BI as shown in FIG. 10.

Figure 65:
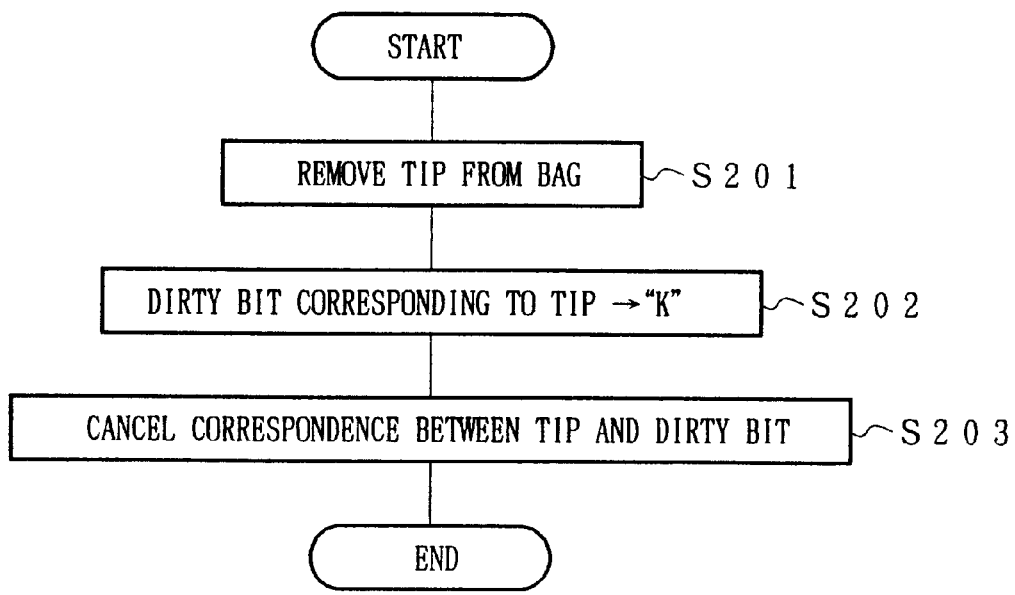
FIG. 65 is a flowchart explaining in detail an operation in the non-synchronous period in the database system, showing a process in which a tip is removed from the sharing bag and a correspondence between an entity of the tip and the dirty bit is cancelled.

When adopting this managing method, in the case where the tips T are removed with the deletion of the entity, as in the case where an instruction was received from the user via the user operating section 22, the tip deletion processing section 43 of FIG. 1 controls the bag managing section 32 as in S41 of FIG. 22 so as to remove the tips T to be subjected to operation from the sharing bag SF (S201 in FIG. 65). Further, the tip deletion processing section in S202 sets the values of the movement parameter of the dirty bits D corresponding to the tips T to No Effect "K" with respect to all the dirty bit lists LD indicating the sharing bag SF. Also, in S203, the tip managing section 31 cancels the correspondence between the entity of the tips T (for example, file or data in the memory) and the dirty bits D in accordance with the instruction of the tip deletion processing section 43.

Note that, as one method of cancelling the correspondence, for example, in the case where the number of dirty bits D corresponding to the tips T is added to the entity of each tip T, the correspondence may be cancelled by reducing the number. Alternatively, it is also possible to store, per dirty bit D corresponding to the tip T removed from the sharing bag SF, the values which indicate whether the entity of the tips T is still remaining. Further, it is even possible to cancel the correspondence only by setting the dirty bits D to No Effect "K", which is allowed when it is judged whether the dirty bits D corresponding to the entity of the tips T exist by searching all the dirty bit lists LD. In any case, as long as it is judged in the entity deletion process of the tips T (to be described later) whether the dirty bits D corresponding to the tips T exist, the same effect can be obtained. Note that, when the entity deletion process of the tips T is to be carried out following this process, the entity deletion process of the tips T itself can be regarded as the cancellation of the correspondence.

Figure 66:
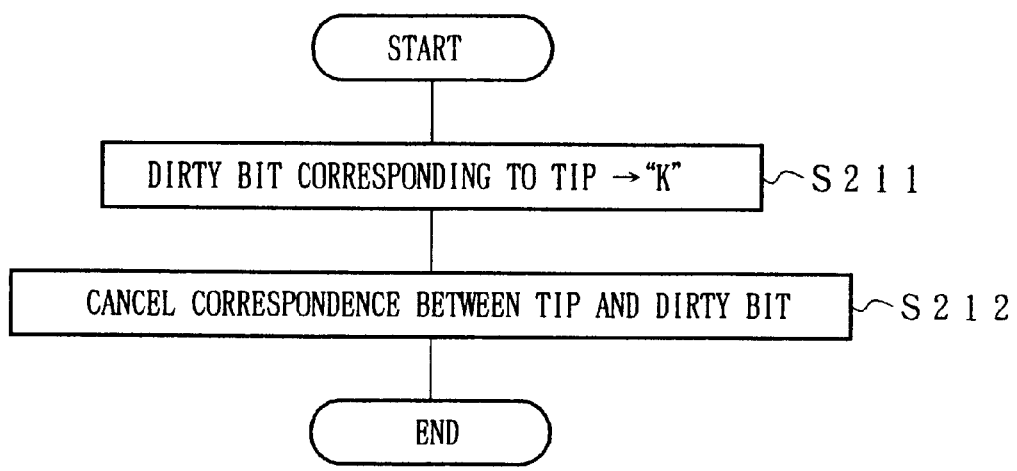
FIG. 66 is a flowchart explaining in detail an operation in the non-synchronous period in the database system, showing a process in which a correspondence between an entity of a tip outside of the sharing bag and the dirty bit is cancelled.

On the other hand, when deleting the entity with respect to the tips T outside of the sharing bag SF, as shown by S211 and S212 of FIG. 66, the information processing device 2 carries out the same process as that of S202 and S203 of FIG. 65 so as to cancel the correspondence between the tips T and the dirty bits D.

Regardless of which method is adopted for the process involving deletion of the entity, when the entity of the tips T is not referred to by any other places (another sharing bag or another application), the tip deletion processing section 43 controls the tip managing section 31 so as to delete the entity of the tips T, thereby increasing the free space of the database managing section 23 in the information processing device 2. As a result, it is possible to reduce the memory size required for the database managing section 23 even when the non-synchronous period is long and a large number of tips T are deleted.

Here, it is preferable that, even when deletion of the entity was instructed by the user, the tip deletion processing section 43 holds the entity of the tips T and the correspondence as long as possible, for example, by moving the tips T to a specific bag F, and cancels the correspondence between the dirty bits D and the entity of the tips T at the time when there is a shortage of a free memory space by comparing the free memory space and a predetermined value. This allows the entity of the tips T and the correspondence to be held unless there is a shortage of a free memory space. As a result, it is possible to reduce the amount of data transferred in the synchronous process, and to secure a memory necessary for the operation of the information processing device 2, such as addition and update of the tips T.

Also, when cancelling the correspondence, in the next synchronous process, the tip deletion processing section 43 may estimate and compare the possibility that the contents of the tips T will be transferred from the information processing device of the other party so as to cancel the correspondence in an order from the tip T having a low possibility of being transferred. Such a possibility may be estimated from, for example, the past history of the previous synchronous processes, or based on the user's operation on the information processing device 2 being used, for example, by estimating that the possibility of transfer is higher when the tips T are removed, rather than deleted. Note that, when cancelling the correspondence, it is preferable to cancel the correspondence from the tips T which can be deleted, by judging whether the entity of the tips T can be deleted, that is, whether the tips T are being referred to from other places. As a result, the amount of data transferred in the synchronous process can be reduced more efficiently for the tips T having a higher possibility of being transferred while maintaining a memory necessary for the operation of the information processing device 2.

In any case, the movement parameter of the dirty bits D whose correspondence has been cancelled is set to No Effect "K", and as will be mentioned later, the dirty bits D are transmitted from the other information processing device 2 as required in the synchronous process. Thus, even when the entity of the tips T is deleted at an arbitrary time during the non-synchronous period in each information processing device 2, the integrity of the database DB of the database system 1 is maintained at the time when the synchronous process is carried out.

Specifically, as with the managing method of FIG. 19, in the present modification example, the dirty bit lists LD are also updated in accordance with an operation on the tips T during the non-synchronous period. However, in the present modification example, there is a case where the dirty bits D are changed to No Effect "K". Thus, in the information processing devices 2a and 2b at the time when the synchronous process is started, the dirty bit lists $LD_a$ and $LD_b$ contain the dirty bits D of No Effect "K".

When these dirty bit lists $LD_a$ and $LD_b$ are subjected to the compression process of S51 in FIG. 26, of the dirty bits D corresponding to the tips T which have been newly added to the sharing bags SF during the non-synchronous period, the dirty bits D corresponding to the tips T which are not currently contained in the sharing bags SF are deleted from their respective dirty bit lists LD.

Figure 67:
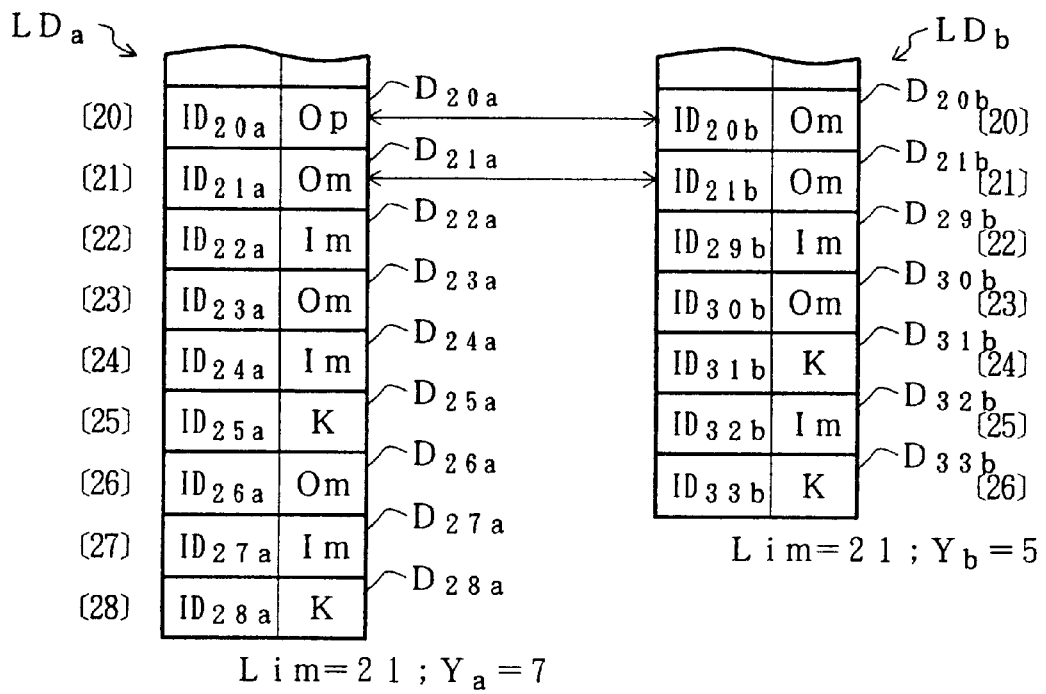
FIG. 67 is an explanatory drawing showing dirty bit lists immediately before a next synchronous process in the database system.
Figure 68:
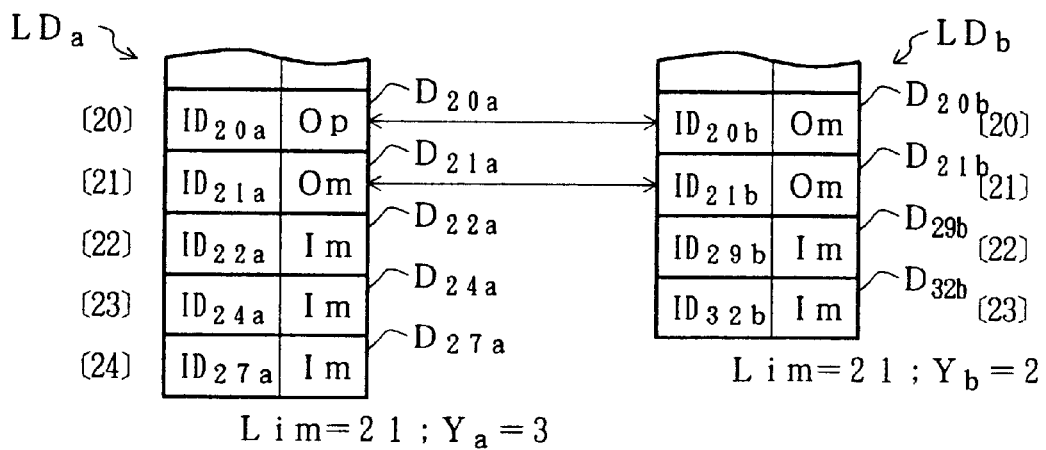
FIG. 68 is an explanatory drawing explaining a state of the synchronous process in the database system, showing dirty bit lists after compression.

Specifically, as shown in FIG. 67, using sink limit $Lim_a \cdot Lim_b = 21$, $Y_a = 7$, and $Y_b = 5$, the dirty bits ($D_{23a}$, $D_{25a}$, ...) of Remove Update "Om" and No Effect "K" are deleted from the dirty bits ($D_{22a}$ through $D_{28a}$ and $D_{29b}$ through $D_{33b}$) after the sink limits $Lim_a$ and $Lim_b$, respectively. As a result, as shown in FIG. 68, only the dirty bits D of Insert Update "Im" remain after the sink limit $Lim_a$ ($Lim_b$) of the dirty bit list $LD_a$ ($LD_b$).

Figure 69:
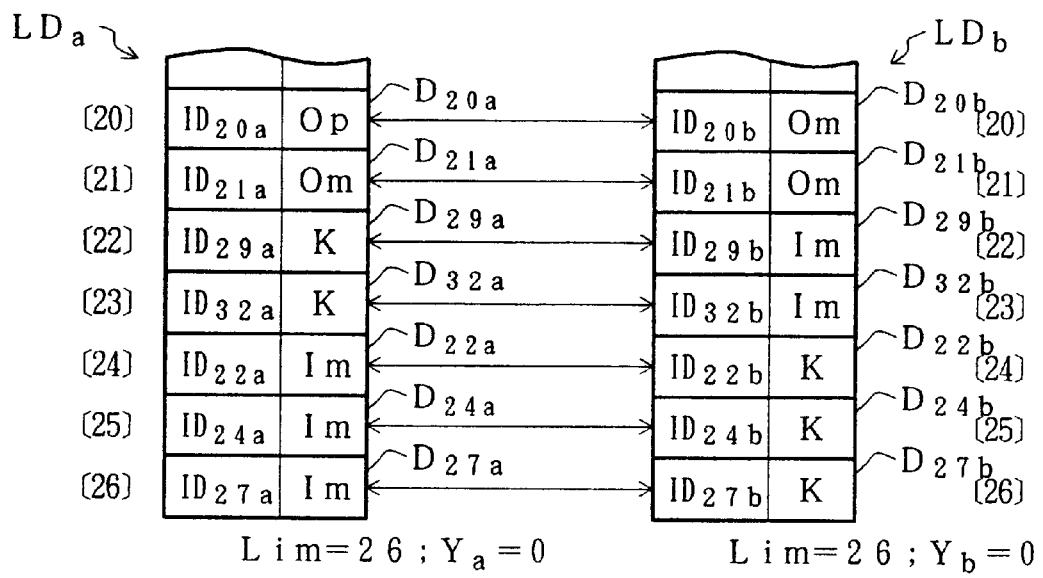
FIG. 69 is an explanatory drawing explaining a state of the synchronous process in the database system, showing dirty bit lists at the time when all the dirty bits are made corresponded to each other.

Further, in S52, as in FIG. 27 through FIG. 29, to the dirty bit list $LD_a$ ($LD_b$) is added a dirty bit $D_b$ ($D_a$) which has been added to the information processing device 2b (2a), and the sink limit $Lim_a$ ($Lim_b$) is adjusted (see FIG. 69). As a result, the dirty bits $D_a$ and $D_b$ indicative of corresponding tips T are arranged in the same order in their respective dirty bit lists $LD_a$ and $LD_b$, and the dirty bits $D_a$ and $D_b$ are made corresponded to each other. Here, in S52, the dirty bits $D_a$ and $D_b$ are made corresponded to each other between the information processing devices 2, yet the contents of the tips T are not transmitted. Thus, the value of the newly added dirty bit D is set to No Effect "K".

Then, in S53, the dirty bits D are exchanged between the information processing devices 2a and 2b, and the inside-outside judgement (bag) synchronization of the tips T is carried out. However, in the present modification example, the dirty bits D are changed to No Effect "K" as long as the entity of the tips T is deleted even with respect to the dirty bits D before the sink limit LD. Therefore, No Effect "K" is also included in the dirty bit lists $LD_a$ and $LD_b$ in which the dirty bits $D_a$ and $D_b$ have been made corresponded to each other between the information processing devices 2. Thus, the synchronize processing section 51 carries out the inside-outside judgement of tips T by the following rules, instead of the rule as shown in FIG. 31.

Specifically, when the combination of the movement parameters of the dirty bits D is (X-X), (X-I), (I-I), (I-K), or (I-O), the tips T corresponding to the dirty bits D are judged to be within the sharing bag SF, and the movement parameter is set to Still "X" in the dirty bits D of the both parties. On the other hand, when the combination is (X-O), (O-K), (O-O), or (K-K), the tips T are judged to be outside of the sharing bag SF, and the movement parameters of the both parties are set to No Effect "K".

Further, in the case where one of the dirty bits D is No Effect "K", as in the combination (I-K), and the tips T are within the sharing bag SF, the update parameter of each dirty bit D is also changed, and the dirty bits D of No Effect "K" are set to Still Maintain "Xp", and the other dirty bits D are set to Still Update "Xm". As a result, even when the contents of the other dirty bits D are not updated (dirty bits D are Insert Maintain "Ip"), it is ensured that the information processing device 2 of one party in which no entity of the tips T exists is supplemented with the contents of the tips T of the information processing device 2 of the other party in the contents synchronization of S54 (mentioned later).

Figure 70:
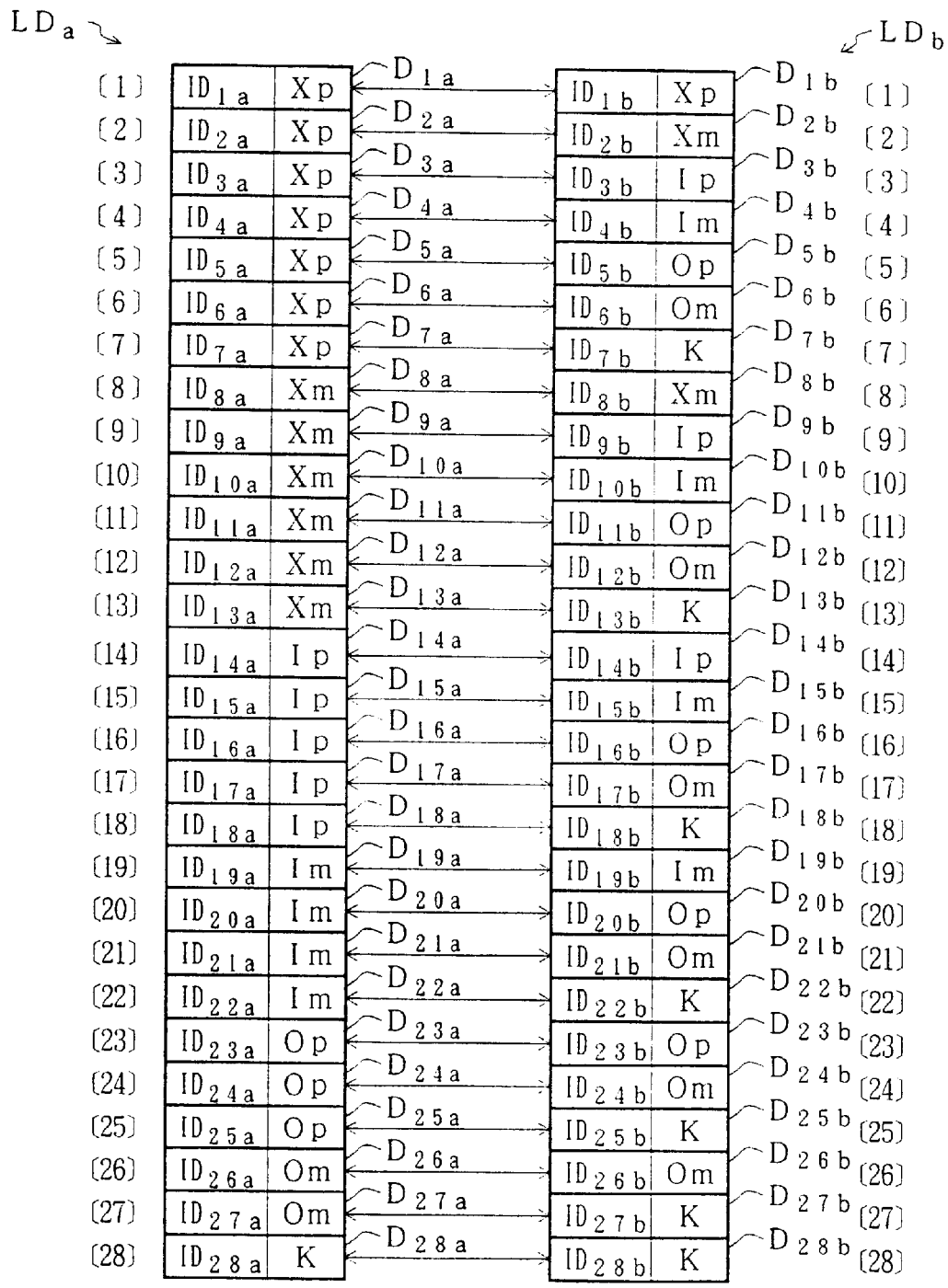
FIG. 70 is an explanatory drawing explaining an operation of the synchronous process of the database system, showing dirty bit lists at the time when an inside-outside judge synchronous process is started.
Figure 71:
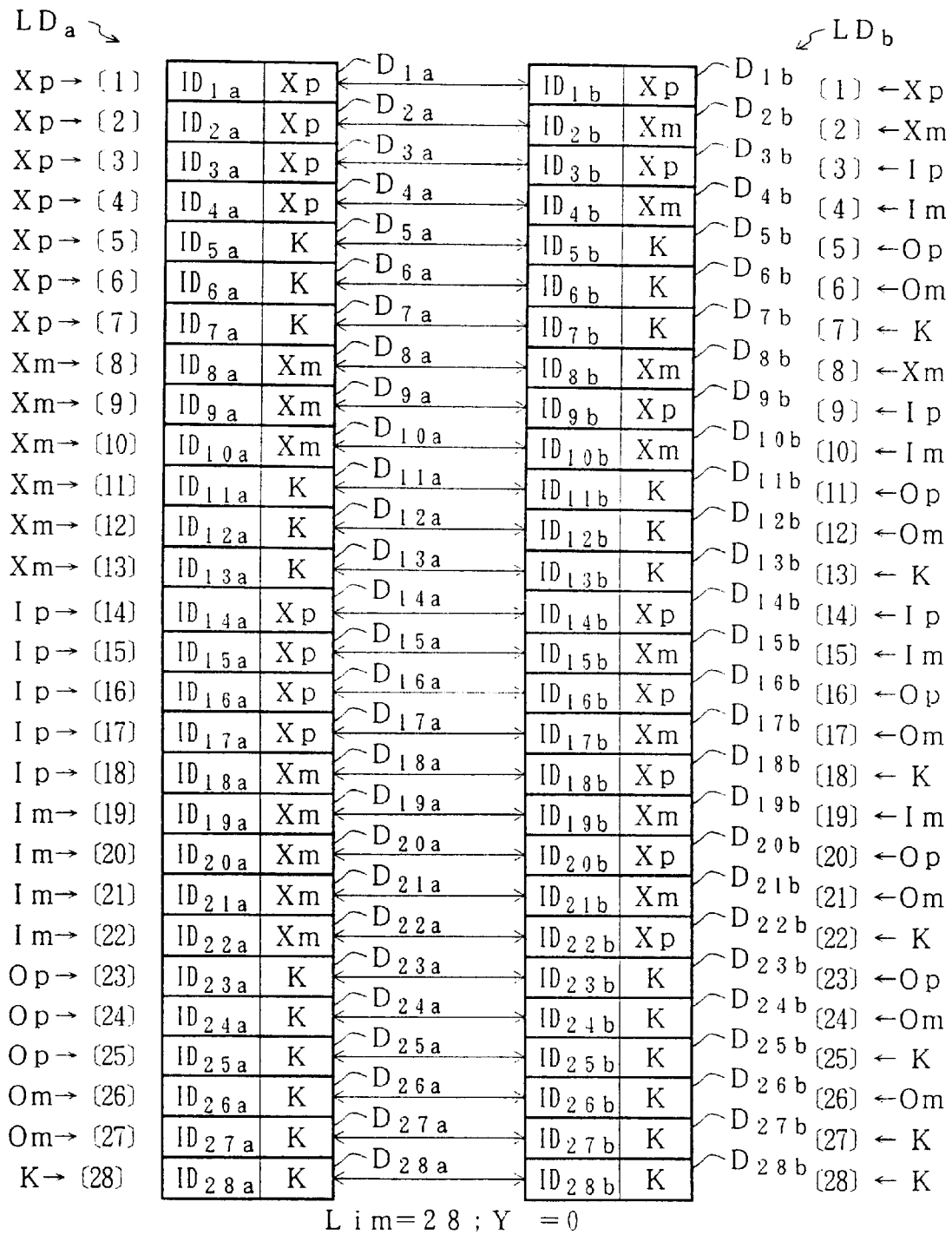
FIG. 71 is an explanatory drawing explaining an operation of the synchronous process of the database system, showing dirty bit lists at the time when the inside-outside judge synchronous process is finished.

As a result, assuming that all the combinations of the dirty bits $D_a$ and $D_b$ are all considered, for example, with the sink limit Lim=28, the dirty bit lists $LD_a$ and $LD_b$ are changed to the state as shown in FIG. 71 from that of FIG. 70.

Here, the judgement of the combinations of the dirty bits $D_a$ and $D_b$ is carried out per combination, and the results of judgement are stored as a change in movement parameters and update parameters. Thus, as with the managing method of FIG. 19, even when the inside-outside judgement (bag) synchronous process of S53 is interrupted, for example, by disconnection of the communications, the synchronous process can be resumed without a problem.

Thereafter, as with the managing method of FIG. 19, the priority judgement is carried out in S54, and the dirty bit lists $LD_a$ and $LD_b$ are compressed in S56, and the synchronous process is finished.

Further, at the time the synchronous process is finished, the tip deletion processing section 43 judges whether the entity of the tips T which have been placed outside of the sharing bag SF as a result of the synchronous process are referred to from the other places of the device, and when no reference is made, controls the tip control section 31 so as to delete the entity of the tips T. Here, these tips T are data whose integrity is not required to be maintained between the databases DB, and the contents thereof are not transferred in the subsequent synchronous processes. Thus, by deleting the entity of these tips T, the free memory space of the information processing device 2 can be increased without increasing the transfer volume of data in the synchronous process.

Note that, in the above descriptions, the explanations are based on the case of deleting the entity of the tips T which are not made corresponded to each other between the databases DB. However, not limiting to this, in the case where the contents of the tips T are to be reused, for example, as in the case where the contents of the tips T outside of the sharing bag SF are frequently referred to, the entity of the tips T is not necessarily deleted at the time when the synchronous process is finished. Also, it is preferable that the tip deletion processing section 43 can select whether to delete the entity in the information processing device 2 so that the setting is made as desired by the user. In such a case, the selection may be made per sharing setting, or with respect to all the sharing setting.

Also, the present modification example described the case where the value "K" indicative of No Effect is always used as the value of the dirty bits D in the non-synchronous period. However, whether to use No Effect "K" may be made selectable in accordance with the user's request. In such a case, it is preferable that the time whether to use No Effect "K" is limited in the period in which the information processing devices 2 are in communications, for example, at the time of sharing setting, as with the case where the model for the sharing release is set. This prevents various troubles caused by different settings between the information processing devices 2 in the synchronous process.

Further, the above explanation was provided based on the example of FIG. 26. However, in the present modification example, as in FIG. 61, the dirty bit list LD of each party may be compressed during the non-synchronous period. In such a case, the dirty bits D corresponding to the tips T are deleted from the dirty bit list LD regardless of whether the entity is deleted.

Incidentally, in the above explanation, when the combination of the movement parameters of the dirty bits D is (Insert "I"-Remove "O"), that is, ([14]·[15]·[17]·[18] in FIG. 32, or [16]·[17]·[20]·[21] in FIG. 71), each information processing device 2 in the inside-outside judgement (bag) synchronization in S53 of FIG. 26 judges that the tips T corresponding to the dirty bits D are inside the sharing bag SF, and sets only the movement parameters of the respective parties to Still "X" without changing the their update parameters. On the other hand, in the priority judgement of S54, because the priority sides are decided based on the update parameters, when the combination of the dirty bits D is (Im-Op), "Im" is given the priority. In the same manner, when the combination is (Ip-Om), "Om" is given the priority, and when (Im-Om), a collision is judged.

Here, in the case of (Ip-Om) and (Im-Om), there is a case where the operation result on the Remove "O" side is reflected in the priority judgement regardless of the fact that the operation result on the Insert "I" side is reflected in the inside-outside judgement (bag) synchronization. Meanwhile, depending on the use and the user, there is a case where it is more preferable that the judgement of the inside-outside judgement (bag) synchronization and the judgement of the priority sides are made coincided with each other even when the update of the tips T on the Remove "O" side is not reflected in the result of the synchronous process.

Figure 72:
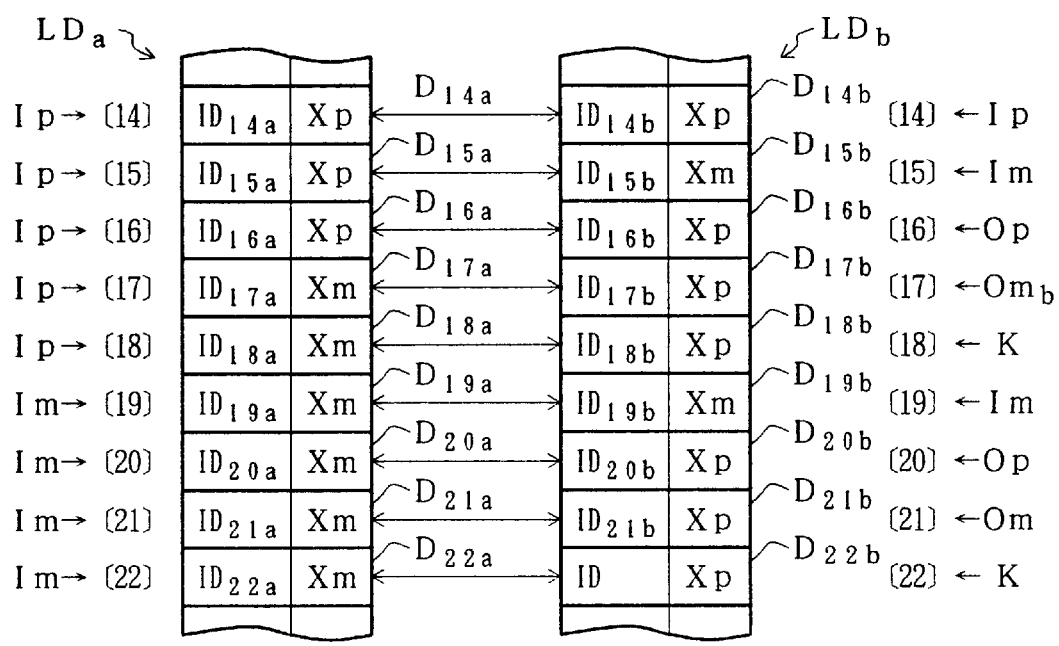
FIG. 72 is an explanatory drawing showing, as still another modification example of the present invention, a change in dirty bits in the inside-outside judge synchronous process.

The following will describe, as another modification example, the case where the contents of the tips T on the Insert "I" side is given the priority when the combination of the movement parameters is (I-O), referring to FIG. 72. Note that, in this case, the synchronize processing section 51 corresponds to inside region priority means and priority selecting means as defined in claims.

In the information processing device 2 in accordance with the present modification example, when the combination of the dirty bits D is (Ip-Om) and (Im-Op), the synchronize processing section 51 in the inside-outside judgement (bag) synchronization in S53 of FIG. 26 changes the update parameter on the Insert "I" side to Update "m" and sets the update parameter on the Remove "O" side to Maintain "p" ([17]-[21] in FIG. 72), in addition to setting the movement parameters to Still "X". As a result, in the priority judgement in S54 and the contents synchronization in S55, it is ensured that the tips T on the Insert "I" side are given a priority, and the contents of the tips T on the Remove "O" side are changed in accordance with the contents on the Insert "I" side. As a result, the inside-outside judgement (bag) synchronization and the priority judgement are made coincided with each other.

Note that, although the above explanation is based on the case where the Remove "O" side is given a priority, whether to give a priority to the Remove "O" side may be made selectable in accordance with the user's request. In such a case, as with the case of setting of a model for the sharing release, it is preferable that whether to give a priority to the Remove "O" side is set when th e information processing devices 2 are in communications, for example, at the time of the sharing setting. This may be carried out per sharing setting, or with respect to all the sharing setting. As a result, it is ensured that a consent is made between the information processing devices 2 as to whether the priority should be given to the Remove "O" side. This prevents various troubles caused by different settings between the information processing devices 2.

[Second Embodiment]

The First Embodiment described the case where each of the information processing devices 2 constituting the database system 1 can create a bag F to be a subset of the database DB, and the information processing devices 2 are equivalent. In contrast, in the present embodiment, as shown in FIG. 62, explanations will be given through the case where a database system 11 includes an information processing device (database managing device) 12 which cannot set a subset.

The database system 11 is suitably adopted when the system, for example, such as the database system of a client server type, is constituted by information processing devices 2 which are not equivalent. The information processing device 2 is realized, for example, as a desk-top computer which operates as a server, and the information processing device 12 is realized, for example, as a device, such as a portable information terminal, whose storage capacity for the database DB is smaller than that of the information processing device 2.

Figures 62, 63:
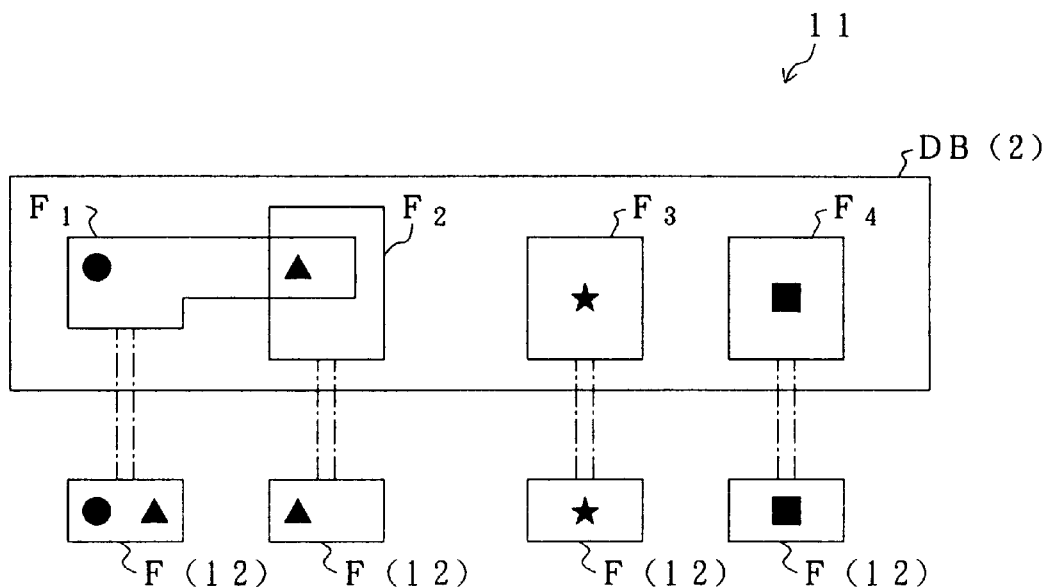
FIG. 62 is an explanatory drawing showing a relationship between tip, bag, and database, which are shared between the information processing devices in the database system in accordance with another embodiment of the present invention.
FIG. 63 is an explanatory drawing showing a method of storing a tip in an information processing device which processes an entire database as a bag in the database system.

The information processing device 12 has almost the same structure as the information processing device 2 of FIG. 1, except that a database managing section 23, as shown in FIG. 63, stores a single database DB as a single bag F, and as shown in FIG. 62, the bag F constituting the entire database DB of the information processing device 12 is shared with the bag F of the information processing device 2.

In the database system 11 having the above structure, as with the database system 1, in the synchronous process, the dirty bits D are compared between the information processing devices 2 and 12, and the need to transfer contents and the transfer direction are decided prior to the transfer of the tip T contents. Here, as with the First Embodiment, the information processing device 2 can identify the tips T which have only been moved, based on the dirty bits D. As a result, it is ensured that the transfer of the contents of the tips T are prevented, and the amount of the data transferred in the synchronous process can be reduced.

Further, in the present embodiment, as with the First Embodiment, the correspondence of the tips T is stored as the order of the dirty bits D in the respective dirty bit lists LD of the both parties. Therefore, the state of the tips T can be grasped with a smaller memory space, and the amount of the data transmitted in the synchronous process can be reduced.

The database system 11 having the above structure has its use in, for example, the case where the information processing device 12 to be a portable information terminal is distributed to each service person and all the address information required for service persons is managed by the information processing device 2 as a server which is provided in a company. Here, the combinations of address information required for the service persons are different from one another, and in many cases, the service persons have common address information. Therefore, in the information processing device 2, by storing all the address information in the database DB, and by managing the combinations of the address information per service person in the forms of bags F, the information processing device 2 is able to manage each address information without disturbing the integrity, which is not the case, for example, when the address information per service person is stored in another database DB. Also, because the information processing device 12 only needs to store only one of the bags F of the information processing device 2, the memory capacity can be reduced compared with the case where the entire address information is stored.

Note that, in the First and Second Embodiments, the explanations are based on the case where the tip T individually indicates an address. Yet, the data indicated by the tips T can be freely set depending on the use of the database. Also, the above explanation is based on the case where the tips T have the same attribute A, and the tips T having the same sharing party are gathered in the sharing bag SF. However, not limiting to this, it is possible for example to provide a sharing bag SF per combination of the sharing party and the application. For example, in the case where applications of address book, phone book, and mail address database exist, the tips T used in the address book have attributes which indicate name, phone number, mail address, address, and work place. Also, the tips T used in the phone book have attributes which indicate name and phone number, and the tips T used in the mail address database have attributes which indicate name and mail address. Further, the tips T are gathered in a bag F indicative the application used. For example, the tips T used in the phone book also belong to a bag F indicative of the address book. In such a case, when renewing the entire address book, sharing setting is made with respect to the bag F indicative of the address book, and when changing only the bag F of the phone book, sharing setting is made with respect to the bag F and the synchronous process is carried out. In this manner, by allocating the bag F per application used, the synchronous process can be carried out per use.

In the First and Second Embodiment, the correspondence is stored as the order of the dirty bits D. However, not limiting to this, corresponding tips T may be specified by the information which indicates the tips T of the other party, for example, such as the tip ID. However, in this case, in the synchronous process, it is required to send not only the dirty bits D but also the tip IDs of the other party, and this might result in an increase in the amount of transmitted data.

Further, the amount of data of the tip IDs of one party is increased as the size of the database DB is increased. As a result, in particular, when the information processing devices are not equivalent, such as the information processing device 2 and the information processing device 12 in the Second Embodiment, the memory space required for storing the correspondence is increased in the information processing device 12 which requires a large reduction in the memory space, more so than the case of specifying the correspondence as the order of the dirty bits D.

In contrast, in the First and Second Embodiments, the correspondence of tips T is stored as the order of information associated with the tips T. Thus, the correspondence can be stored regardless of the size of the database DB of the other party and how the tips T are stored in that party. As a result, it is possible to reduce the memory space required for storing the correspondence and the amount of data transferred in the synchronous process, compared with the case of specifying the correspondence with the information indicative of the tips T of the other party.

Also, in the First and Second Embodiments, the order of dirty bits D is stored as the dirty bit list LD. However, not limiting to this, it is possible for example to provide a list which indicates the order separately from the dirty bit list LD, or store the dirty bits D and the information indicative of the order per each tip T. However, the dirty bits D and the order are provided per combination of the sharing bag SF of one party and the sharing bag SF of the other party even when they correspond to the same tip T, and often the number of sharing parties cannot be predicted at the time when the database DB is created. For this reason, it is more preferable to provide the dirty bits D and the order separately from the contents of the tips T. When they are to be separately stored, information indicative of corresponding tips T is additionally required, and this increases the memory space required. Thus, by storing the correspondence in the order the dirty bits D are stored, the required memory space can be further reduced.

Further, in the First and Second Embodiments, the dirty bits D are provided per combination of the sharing bag SF of one party and the sharing bag SF of the other party. However, as long as the duration of the non-synchronous period is the same, the dirty bit list LD (dirty bits D) can be shared between a plurality of sharing bags SF.

Note that, in the First and Second Embodiments, the explanations were given through the case where, for example, each information processing device 2 (12) is provided with the synchronous processing section 51. However, the components, such as the synchronous processing section 51 and the sharing setting processing section 52 which come into operation only when the information processing devices 2 (12) are in communications need to be provided only in one of the information processing devices. Also, for example, the synchronous processing section 51 may be separated into a part which detects the collision of tips T and a part which decides the priority side, and these parts may be separately provided in the information processing devices 2 (12). As long as these parts are combined at the time when the communications are made, the same effect can be obtained.

As described, the database managing device (2) in accordance with the present invention having at least one database is for constituting a database system (1, 11) which includes a plurality of database managing devices (2) and synchronous process means (synchronize processing section 51) for making a coincidence of corresponding data (tip T) between databases (DB) respectively stored in the plurality of database managing devices (2) which are ready to communicate. The database managing device (2) has the following means.

Namely, there are provided: state information storing means (database managing section 23) for storing state information indicative of a change in data which occurs in a non-synchronous period between a previous synchronous process and a next synchronous process, the state information storing means storing the state information per data corresponding to data of a database of another party; collision detecting means (synchronize processing section 51) for detecting in a synchronous process whether data changed in a pair of the corresponding data are plural based on state information of each data of the pair; and priority side deciding means (synchronize processing section 51) for deciding, when data changed are plural, which of the data should be given a priority before transmitting all contents of the plural data changed so that data contents on a non-priority side are replaced with data contents on a priority side by the synchronous process means. Note that, the change in data is a process which may affect other databases, and it indicates, for example, at least one of the following: contents update of data, addition or deletion of data, and a change in position of data in the database.

In the above arrangement, at least the data of the database to be made corresponded to the data of a database of another party are each given state information, and such data are updated in accordance with an operation on the data in the non-synchronous period.

When the synchronous process is instructed, the collision detecting means judges whether a collision of data has occurred with respect to a pair of data made corresponded to each other, based on the state information and the state information of another party before transmitting the contents of each data of the pair so as to make a coincidence of the contents of the data pair made corresponded to each other. Note that, even though whether a collision of data is detected with respect to which type of change depends on the change indicated by the state information, a collision of data can be detected with respect to at least the type of change which is indicated by the state information.

Here, the state information indicates a change in data in the non-synchronous period, and the amount of data of the state information is smaller than the contents of the data. Therefore, a collision of data can be detected with a smaller amount of data as compared with the case where the data contents are transmitted.

When a collision of data is detected, the priority side deciding means decides the priority side of the data pair before transmitting the entire contents of the data, based on the database managing device which has been decided before the synchronous process, or, for example, the result of an inquiry to the user or the upper application, or partial contents of the data. Further, the synchronous process means replaces the data contents on a non-priority side with the data contents on a priority side.

With this arrangement, when there is a collision of data, priority data is decided before transmitting the entire contents of the data, and the entire contents of the data are transmitted in one direction from the database managing device on the priority side to the database managing device on the non-priority side, thereby reducing the amount of data transmitted or processed between the database managing devices as compared with the case where the contents of the data are replaced by deciding the priority side after transmitting the entire contents of the data. Further, because the priority side is decided at the time of a collision of data, the number of data contained in the database does not increase even when the data are updated in a plurality of database managing devices. As a result, it is possible to reduce the memory size required for storing the database and the amount of data transmitted and processed in the synchronous process.

It is preferable that the priority side deciding means, in addition to the above arrangement, decides the priority side by comparing respective partial contents of the plural data changed.

With this arrangement, the priority side deciding means decides the priority side based on partial contents of data, for example, such as the last updated time, thus reducing the amount of data transmitted and processed in the synchronous process as compared with the case where the entire contents of the data are transmitted.

Meanwhile, as another example of the arrangement of the priority side deciding means, the priority side deciding means may make an inquiry, when data changed are plural, as to which data should be given a priority.

With this arrangement, when there is a collision of data, the priority side deciding means makes an inquiry to the upper application or the user, etc., as to which data should be given a priority by presenting information indicative of a state of the collision or occurrence of the collision, for example, such as data contents or respective state information of the data, and the priority side deciding means decides the priority side based on the result of the inquiry. Here, it is often the case that the information presented in the inquiry is smaller than the entire contents of the data, and the data contents and respective state information of the data in particular are not required to be newly transmitted from another database managing device, thus reducing the amount of data transmitted and processed in the synchronous process. Also, the instruction of the user or the upper application is reflected in the decision making of the priority side, thus deciding the priority side more accurately.

As yet another example of the arrangement of the priority side deciding means, the database managing device may include priority side information storing means (database managing device 23) for storing, when the data changed are plural, priority side information indicative of which of the data should be given a priority, and the priority side deciding means may decide the priority side based on the priority side information. Note that, the priority side information may be set, provided that it is stored before the decision of the priority side is made, by the instruction of the user or the upper application, or, for example, based on the promoting side of the synchronous process or sharing setting.

With this arrangement, the priority side deciding means decides the priority side based on the priority side information. Thus, compared with the case where the priority side is decided after sending the entire contents of the data, the amount of data transmitted and processed in the synchronous process can be reduced.

Incidentally, when the priority side deciding means is provided in a plurality of database managing devices, there is a case where the priority sides decided by these synchronous process means do not coincide. In such a case, when the synchronous process means carries out the synchronous process based on the priority side decided by a certain database managing device, the contents of data decided to have priority sides in the other database managing devices are erased undesirably.

Thus, it is preferable, in addition to the described arrangements, that there is provided detecting means for detecting a non-coincidence between the priority side decided by the priority side deciding means and a priority side specified by another party.

With this arrangement, the detecting means detects a non-coincidence of priority sides, and the data contents are prevented from being erased undesirably. Thus, it is possible to take an appropriate measure, such as allowing each database managing device to decide the priority side again, and saving the entire data which were decided to have priority sides.

In the case where the priority side is to be decided by the priority side deciding means making an inquiry, it is preferable, in addition to the described arrangements, that, when data changed are plural, the priority side deciding means decides the priority side by making an inquiry as to which of the data should be given a priority so as to instruct the priority side to the synchronous process means based on the priority side decided and a priority side specified by the another party, and disconnects communications with the another party between the inquiry and the instruction of the priority side.

With this arrangement, the communications are disconnected between the inquiry and the instruction of the priority side. Thus, even when the response time of the inquiry made by the database managing device is long, for example, as in the case where the user is not present, or the priority side is judged by complex arithmetics, it is possible to maintain the total communications time required for the synchronous process constant. As a result, the cost and the power consumption required for the communications can be reduced.

The database managing device may also have an arrangement including, regardless of the arrangement of the priority side deciding means, sub set setting means (bag managing section 32) for setting a sub set (bag F) in the database, and the state information storing means may store the state information with respect to data which had been contained, at a time of the previous synchronous process, in the sub set which was shared with the database of another party.

With this arrangement, the sharing region can be set independently from the size of the database, and it is therefore not required to carry out the synchronous process with respect to data which do not require sharing without newly creating a database solely for sharing use. Thus, the amount of data transmitted and processed can be reduced without increasing the amount of memory required for storing the database.

It is also possible to have an arrangement wherein the synchronous process means carries out a synchronous process with respect to data contained in a sharing region of each of the databases, the database managing device may include sharing setting means (sharing setting processing section 52) for making a correspondence of sharing regions between the at least one database and the database of the another party. Note that, the sharing region may be a sub set of the database, or the entire database. Also, the sharing region may be set as a region which exists before sharing setting, such as the entire database or a sub set which already exists, or may be created as a new region by creating a sub set.

With this arrangement, one only needs to make a correspondence between the sharing regions to specify sharing of data contained therein, thus allowing sharing of data with fewer operations compared with the case where a correspondence is made per data.

It is also possible to have an arrangement wherein the synchronous process means carries out a synchronous process with respect to data contained in a sharing region of each of the databases, and the database managing device may include sharing releasing means (sharing release processing section 53) for cancelling a correspondence between sharing regions which are made corresponded to each other. Note that, the sharing releasing means may only cancel the correspondence so as to keep data in a sub set to be a sharing region or in the sharing region, or may delete data in the sub set or sharing region.

With this arrangement, the correspondence between the sharing regions is cancelled at the time when the subsequent synchronous processes are not required. Thus, it is not required to update the state information by monitoring the change, thus reducing the memory size required for storing the state information and the volume of arithmetics for updating the state information.

Also, the database managing device (2) in accordance with the present invention having at least one database, as described, is for constituting a database system (1, 11) which includes a plurality of database managing devices and synchronous process means (synchronize processing section 51) for making a coincidence of corresponding data (tip T) between databases (DB) respectively stored in the plurality of database managing devices which are ready to communicate. The database managing device (2) has the following means.

Namely, there are provided: sub set setting means (bag managing section 32) for setting a sub set in the at least one database, the sub set being set as a sharing region with a database of another party; state information storing means (database managing section 23) for storing state information with respect to data which had been contained in the sub set at least at a time when a previous synchronous process was finished, the state information including (a) update information indicative of whether the data had been updated in a non-synchronous period between the previous synchronous process and a next synchronous process and (b) movement information indicative of whether the data had been moved in and out of the sub set in the non-synchronous period; and state information update means (database processing section 24) for monitoring data whose corresponding state information is stored in the state information storing means so as to update respective state information of the data in the non-synchronous period.

Note that, the state information indicates the state of each data in the non-synchronous process, and for this reason, when the timing of the synchronous process with the data of another party is different, the state information of data are stored as being different from one another even when the data are the same in the database. Here, usually, each database managing device is capable of deciding the timing of the synchronous process with the database managing device of another party regardless of the other database managing devices. Therefore, in many cases, the state information of each data is provided per party in communications. However, when the timing of the synchronous process is always the same, the state information of each data can be shared even when there are plural parties in communications.

With this arrangement, the state information storing means stores the state information of data which exist in the sub set at the time of the previous synchronous process. In the non-synchronous period, the state information is maintained even when the data do not exist in the sub set anymore, for example, by being moved or deleted. Further, as long as the state information is stored in the state information storing means, the state information update means updates the state information by monitoring data corresponding to the state information.

Thus, by referring to the state information at the time of the next synchronous process, it is possible to identify with certainty the data which exist in the sub set both in the previous synchronous process and the next synchronous process, and whose contents are not updated (changed) between the synchronous processes, even with respect to data which have been moved in and out of the sub set. Here, from the stand point of the database managing device of another party, such data are the same as the data which were neither moved nor updated in the sharing region and it is not required to update the data of the another party with such data. As a result, by identifying such data, it is possible to reduce the amount of data sent to the database managing device of another party and the amount of data processed at the time of the synchronous process.

Further, by referring to the state information, it is ensured in the database that the data which have only been moved in and out of the sub set are identified. Thus, unlike the case where moving of data is not identified, there arises no shortcoming that the data are misidentified as another data and the number of data contained in the database is increased. As a result, it is possible to prevent an undesirable increase in amount of data in the database, thereby reducing the memory size required for storing the database and the amount of data transmitted and processed in the next synchronous process.

Also, the state information only needs to store data which were contained in the sub set at least at the time when the previous synchronous process was finished. Also, the state information is composed of update information and movement information, and can be represented by a significantly small amount of data, for example, such as the data of 2 to 3 bits, which is considerably smaller than the contents of the data. Thus, it is possible to maintain a sufficiently small level of the memory space for storing the state information and of the arithmetic volume for processing the state information.

Note that, in the database system, as long as at least one database managing device stores the state information, the amount of data sent to another party from the database managing device can be reduced, thus obtaining the described effects.

In addition to the described arrangements, it is also possible to have an arrangement including the synchronous process means, and the synchronous process means preferably includes correspond means (synchronize processing section 51) for making a correspondence of data between the sharing region and a sharing region of the another party; and judging means (synchronize processing section 51) for judging, with respect to each pair of data made corresponded to each other, whether it is required to transmit contents of the data based on the state information stored in the state information storing means and information received from a database managing device of the another party.

With this arrangement, in the synchronous process, the judging means judges whether it is required to transmit data contents based on the state information stored at least in the state information storing means and the information received from the database managing device of another party. Thus, the judging means can judge whether to transmit the contents of data before transmitting the contents, based on information whose data amount is smaller than the contents of the data itself, such as information indicative of the presence or absence of update, or state information. As a result, in the synchronous process, it is possible to reduce the amount of data transmitted between the database managing devices, and the amount of data processed in each database managing device.

Further, in addition to the described arrangements, it is preferable that the judging means includes inside-outside judge synchronize means for setting the state information inside and outside of the sub set with respect to the each pair of data made corresponded to each other, the inside-outside judge synchronize means setting the state information inside the sub set when state information indicating that the data had been moved into and have been currently existing in the sub set is stored in at least one of the plurality of database managing devices, and when the state information of the database managing device indicates that the data are inside the sub set and the database managing device of the another party notifies that the data making up the each pair of data are inside the sharing region of the another party, and the inside-outside judge synchronize means setting the state information outside the sub set when otherwise.

With this arrangement, in the synchronous process, the inside-outside judge synchronize means judges whether the corresponding data pair exists in the sharing region based on the state information stored at least in the state information storing means of the described database managing device and the state information of another party, or the presence or absence of update so as to set the state information corresponding to the data pair, such as the state information or the state information of another party if it exists, inside or outside of the sub set. Thus, the synchronous process means can judge whether the data exist in the sharing region by information whose data amount is small, such as the state information or the presence or absence of update. As a result, in the synchronous process, it is possible to reduce the amount of data transmitted between the database managing devices, and the amount of data processed in each database managing device.

The result of the judgement whether the data are inside or outside of the sub set is stored as state information per each data pair. The amount of data transmitted during the judgement is considerably smaller than the contents of the data itself, and the judgement for each data pair is finished in a very short period of time. Thus, even when the synchronous process is interrupted before the judgement of all data pairs is finished, for example, as in the case where the communications are disconnected, the results of the judgement made so far are maintained. Further, because the result of the judgement do not change even when the judgement is carried out again based on the state information after the judgement, the inside-outside judge synchronize means can restart the synchronous process without a problem regardless of whether the synchronous process was interrupted. As described, because each judgement is highly independent from one another, it is ensured that the integrity between the databases is maintained even in the database system in which the synchronous process may be interrupted, as in the database system which carries out the synchronous process by communications.

Meanwhile, regardless of the presence or absence of the inside-outside judge synchronous means, it is preferable that the judging means includes priority side judging means (synchronize processing section 51) for judging which of each pair of corresponding data should be given a priority with respect to data which exist inside the sharing region and the sharing region of the another party at least after the synchronous process, the priority side judging means carrying out the judgement when state information respectively corresponding to the each pair of corresponding data indicate update, and when the database managing device of the another party notifies update of data making up the each pair of corresponding data; and data contents synchronize means (synchronize processing section 51) for replacing, when data to be given a priority is decided by the priority side judging means, contents of data on a non-priority side with contents of the data given a priority.

With this arrangement, in the synchronous process, the priority side judging means judges the priority side by deciding whether it is required to judge the priority side with respect to the data pair based on the state information stored at least in the state information storing means of the described database managing device and the state information of another party, or the presence or absence of update so as to judge the priority side, thus deciding whether it is required to carry out the priority side judgement with a considerably small amount of data. Further, when the priority side is decided, the data contents synchronize means replaces the contents of data on the non-priority side with the contents of data on the priority side. Thus, even when the corresponding data are updated in their respective database managing devices (collision of data), when the priority side is judged, an increase in data contained in the database can be suppressed. Also, because the judgement is carried out per each data pair, the amount of data transmitted can be significantly reduced as compared with the case where all the data of the database are transmitted. Further, to replace data, it is only required to send the data from one database managing device, and two-way communications are not required. As a result, the amount of data transmitted or processed in the synchronous process can be reduced.

Here, because the contents of data have comparatively a large amount of data compared with the state information, when the synchronous process is interrupted during the transmission, there is a case where the data contents on the non-priority side are erased. However, even in this case, the data contents on the priority side and the information, such as the state information, which the priority side judging means refers to are maintained. Thus, by sending again the data contents on the priority side after the synchronous process is restarted, the synchronous process can be carried out without a problem. As a result, it is ensured that the integrity between the databases is maintained even in the database system in which the synchronous process may be interrupted.

Note that, in judging the priority side by the priority side judging means, when referring to data other than the state information, such as the data contents, there often is a case where the amount of data transmitted and the time required for the judgement is increased. In such a case, the priority side is judged only with respect to data which exist in the sharing region after the synchronous process. This reduces the time required for the judgement compared with the case where the priority side is judged with respect to all the data pairs.

Also, in addition to the arrangement including the inside-outside judge synchronize means, the judging means may include priority side judging means for judging which data should be given a priority with respect to data pairs which exist inside the sharing region and the sharing region of the another party after the synchronous process, the priority side judging means carrying out the judgement by identifying the data pairs based on setting by the inside-outside judge synchronize means, when state information respectively corresponding to the data pairs indicate update, and when the database managing device of the another party notifies update of data making up the data pairs; and data contents synchronize means (synchronize processing section 51) for replacing, when data to be given a priority is decided by the priority side judging means, contents of data on a non-priority side with contents of the data given a priority.

With this arrangement, the priority side judging means can carry out the judgement of the priority side only with respect to data pairs which exist in the sharing region after the synchronous process. Further, the priority side judging means identifies the data pairs based on the result of judgement by the inside-outside judge synchronize means. Therefore, the judging time can be reduced compared with the case where the priority side is judged with respect to all the corresponding data pairs, or the case where whether data exist in the sharing region is judged separately from the judgement of the inside-outside judge synchronize means.

The database managing device (2) in accordance with the present invention having at least one database, as described, is for constituting a database system (1, 11) which includes a plurality of database managing devices (2) and synchronous process means (synchronize processing section 51) for making a coincidence of corresponding data (tip T) between databases (DB) respectively stored in the plurality of database managing devices which are ready to communicate. The database managing device (2) has the following means.

Namely, there are provided: order storing means (database managing section 23) for storing an order of data which are contained at least in a sharing region (bag F) of the database managing device and for setting a same order of data with that of another party in a previous synchronous process; corresponded order storing means (database managing section 23) for storing a corresponded order (sink limit Lim) indicative a last position of the order in the previous synchronous process; and order managing means (database processing section 24) for managing an order of data so that the corresponded order and an order before the corresponded order of the order stored in the order storing means are maintained in a non-synchronous period between the previous synchronous process and a next synchronous process, and data newly contained in the sharing region in the non-synchronous period are placed after the corresponded order.

Note that, as with the state information, the orders of data are stored as being different from one another even with respect to the same single data within the database if the timing of the synchronous process with the data of another party is different. Also, the order may be stored by any method as long as data can be specified on their positions, and, for example, data may be stored as an order of storing information indicative of the data, or information indicative of an order may be added per each data. Further, information indicative of data may be stored in the form of a list.

With this arrangement, at the time when the synchronous process is finished, the order storing means of each database managing device stores the order of data so that the orders of corresponding data are the same between the database managing devices. Also, the corresponded order storing means stores the last position of the data.

Meanwhile, in the non-synchronous period, the order managing means of each database managing device maintains the order of data even when the data corresponding to the order stored in the order managing means do not exist in the sharing region any more, for example, by being deleted or moved, provided that the order of the data is the same as or before the corresponded order. Also, the order of data is managed so that the data newly contained in the sharing region are placed after the corresponded order. As a result, the same orders of the corresponding data are maintained between order storing means of the database managing devices even in the non-synchronous period.

With this arrangement, each database managing device stores the correspondence as the order of data stored in the device. Thus, unlike the case where the correspondence is stored as correspond information indicative of corresponding data, each database managing device can store the correspondence by the storing method which most suitable for the device, regardless of the method by which the data are stored in the other database managing devices. Thus, compared with the case where the correspondence is stored as correspond information, the memory space required for storing the correspondence and the arithmetic volume in the synchronous process can be reduced.

Also, in the synchronous process, it is possible to inform the correspondence to another party, for example, by the information indicative of the order, or by the order in which the information indicative of data (state information, etc.) is sent out. Thus, the correspondence can be specified without transmitting the correspond information, and the amount of data transmitted or processed can be reduced compared with the case where the correspond information is transmitted.

Further, in addition to the described arrangements, it is preferable to include the synchronous process means, and the synchronous process means carries out a synchronous process by communicating with a database managing device of the another party storing a database, and the synchronous process means includes: data adding means (synchronize processing section 51) for adding, with respect to data existing in the sharing region, data whose order stored in the order storing means is after the corresponded order to a sharing region of the another party; added data correspond means (synchronize processing section 51) for updating, with respect to data added to the sharing region of the another party, at least one of the order storing means and order storing means of the another party so that the order stored in the order storing means and an order stored in the order storing means of the another party are made coincided and are before respective orders of data which have not been made corresponded to each other between the both parties; and corresponded order updating means for updating the corresponded order. Note that, the data may be added to another party in a single process one by one or altogether at once.

With this arrangement, the data newly added to the sharing region in the non-synchronous period, for example, by being newly created or moved to the sharing region are added to the sharing region of another database managing device in the synchronous process. Further, by the added data correspond means and the corresponded order updating means, the order of added data and the corresponded order are controlled to be the same between the database managing devices. As a result, the data can be added without disturbing the order and the corresponded order between the database managing devices.

It is also possible to have an arrangement, regardless of the presence or absence of the data adding means, including first order deleting means (synchronize processing section 51) for deleting from the order storing means data whose order is after the corresponded order and which are not contained in the sharing region.

With this arrangement, the order of data after the corresponded order not contained in the sharing region is deleted at an arbitrary timing, for example, during the non-synchronous period or during the synchronous process. Here, the order corresponds to data which were deleted before the next synchronous process after being newly contained in the sharing region in the non-synchronous period, in which no synchronization with the database managing device of another party is allowed; namely, the order corresponds to data which are not reflected in the other database managing devices. Thus, by deleting the order, it is possible to reduce the memory space required for storing the order, and the arithmetic volume for managing the order, and the amount of data transmitted or subjected to arithmetics in the next synchronous process.

Meanwhile, in addition to the described arrangements, it is also possible to include second deleting means (synchronize processing section 51) for deleting in the synchronous process an order corresponding to data which are not contained in the sharing region and the sharing region of the another party, the order being deleted from the order stored in the order storing means and from the order storing means of the another party.

With this arrangement, the order of data, for example, such as the order corresponding to data which were deleted or moved out of the sharing region, which is not contained in any of the sharing regions at the time when the synchronous process is finished is deleted from the order storing means. As a result, it is possible to reduce the memory space required for storing the order, and the arithmetic volume for managing the order, and the amount of data transmitted or subjected to arithmetics in the next synchronous process.

Also, in addition to the described arrangements, the database managing device may include state information storing means (database managing section 23) for storing state information with respect to data which had been contained in the sharing region at least at a time when the previous synchronous process was finished, the state information including update information indicative of whether the data had been updated in the non-synchronous period; and state information update means (database processing section 24) for monitoring in the non-synchronous period data whose corresponding state information is stored in the state information storing means so as to update state information of the data, wherein the order storing means stores an order of the data as an order of storing state information corresponding to the data. Note that, whether the movement information is included in the state information is not significant as long as the state information includes the update information.

With this arrangement, each order is stored as an order of storing the state information. Thus, compared with the case where the order and the state information are separately stored, the memory space required for storage can be reduced, and it becomes easier to decide the order of transmitting the state information in the synchronous process.

Also, in addition to the described arrangements, the database managing device may include sub set setting means for setting a sub set in the at least one database, the sub set being set as a sharing region with a database of another party, wherein the state information includes movement information indicative of whether the corresponding data have been moved in and out of the sub set in the non-synchronous period.

Therefore, as with the arrangement including the order storing means, it is possible to reduce the memory space required for storage and it becomes easier to decide the order of transmitting the state information in the synchronous process. In addition, as with the arrangement including the sub set setting means, it is possible to identify data which have only been moved, and the amount of data transmitted or processed in the synchronous process can be reduced.

Also, in addition to the arrangement including the order storing means and the state information storing means, it is possible to include the synchronous process means, and the synchronous process means carries out a synchronous process by communicating with a database managing device of the another party storing the database, and the synchronous process means transmits state information of the corresponding data in an order in accordance with the order stored in the order storing means.

With this arrangement, in the synchronous process, the state information is transmitted in an order corresponding to the order stored in the order storing means. As a result, in the synchronous process, the correspondence can be transmitted only by transmitting the state information, thus reducing the amount of data transmitted or processed between the database managing devices.

Incidentally, in the database managing device, the synchronous process means comes into operation at the time when the database managing devices are ready to communicate. Thus, when at least one of the database managing devices is provided with the synchronous process means, the synchronous process means is not required to be provided in all the database managing devices. Also, the database managing device including the state information processing means, etc., is capable of reducing the amount of data transmitted or processed in the synchronous process even when the state information storing means, etc., is not provided in the database managing device of another party. Thus, even in the case where the synchronous process means including the judging means is provided in the database managing device which is ready to communicate with the above database managing device, the described effects are sufficiently exhibited.

Specifically, the database managing device (2) in accordance with the present invention includes communications means (communications section 21), as described, for communicating with the database managing device (2) having the state information storing means, etc.; and synchronous process means (synchronize processing section 51) for making a coincidence of corresponding data (tip T) between databases (DB) of database managing devices, and the synchronous process means includes: correspond means (synchronize processing section 51) for making a correspondence between data inside a sharing region (bag F) of the database managing device and data inside a sharing region of the database managing device of another party; and judging means (synchronize processing section 51) for judging, with respect to each pair of data made corresponded to each other, whether it is required to transmit contents of the data based on state information stored in state information storing means of another party.

The synchronous process means having the described arrangement, in the case where the database managing device of another party includes the state information storing means, etc., carries out the synchronous process referring to the state information of the database managing device of another party. Therefore, as with the case where one of the database managing devices is provided with both the state information and the synchronous process means having the described arrangement, it is possible to reduce the amount of data transmitted between the database managing devices in the synchronous process and the amount of data processed in each database managing device.

Incidentally, in the case where the data whose contents are not required to be transmitted in the next synchronous process are to be identified by updating the state information of the data by means of monitoring the movement and update of the data; namely, when identifying data which have only been moved in and out of the sub set and not updated, when the transmission of the contents is to be omitted with respect to all the data, each of the database managing devices is required to maintain the contents of the data in the non-synchronous period even when the data have been removed or deleted from the sub set by being judged to be unnecessary by the respective users of the devices, and this may increase the memory space required to be installed in each database managing device. Note that, when the contents of these data are unnecessarily deleted by the database managing device, in the event where the data are placed inside the sub set and the transmission of the contents is judged to be unnecessary as a result of the next synchronous process, the integrity of the data is lost between the databases.

Thus, in the arrangement including the state information recording means and the state information update means, it is preferable to include corresponded data information storing means (database managing section 23) for storing in the non-synchronous period whether data placed outside of the sub set and the state information correspond to each other; correspondence cancelling means (tip deletion processing section 43) for cancelling a correspondence between data judged to be unnecessary in each of the plurality of the database managing devices and the state information so as to store resultant information in the corresponded data information storing means, the correspondence cancelling means cancelling the correspondence in the non-synchronous period with respect to the data placed outside of the sub set; and data deleting means (tip deletion processing section 43) for deleting contents of data which are not made corresponded to the state information.

Note that, the information indicative of the presence or absence of the correspondence may be a part of the state information, or such information and the state information may be separately provided. Also, as long as the presence or absence of the correspondence can be judged, for example, only the combination of corresponding data and the state information, or only the combination without corresponding data may be stored. Meanwhile, the correspondence cancelling means may cancel the correspondence in accordance with an instruction of the user, or spontaneously in accordance with a free memory space. Also, whether data are not required or not can be judged by an instruction of the user of the database managing system, or by an access frequency to the data.

With this arrangement, the corresponded data information storing means stores whether there is a correspondence between data, which are not considered to be important in the database managing device, and the state information; namely, it is stored whether the data which are not contained in the sub set and the state information correspond to each other, and when the contents of the data are deleted, the correspondence between the data and the state information is cancelled.

Thus, in the non-synchronous period, even when the database managing device deletes the data contents so as to reduce the memory space required, by referring to the corresponded information storing means in the synchronous period, it is ensured that the data whose contents are deleted in the non-synchronous period are identified in the database managing device including the corresponded information storing means.

As a result, an appropriate measure can be taken, for example, such as the transmission of the contents of the data in the synchronous process. Also, when the data contents are not deleted, the amount of data transmitted in the synchronous process can be reduced. Therefore, the amount of data transmitted in the synchronous process can be reduced without losing the integrity between the databases and with a relatively small memory space.

Note that, whether data are required in the database managing system can be judged in each database managing device, and for this reason the correspondence cancelling means can cancel the correspondence without a problem even in a period, such as an arbitrary time in the non-synchronous period, in which communications with other database managing devices are not allowed. However, when the data contents and the correspondence are stored, the transmission of the data contents can be omitted in the synchronous process when it is judged by the exchange of the state information that the transmission thereof is not necessary. Therefore, in order to reduce the amount of data transmitted in the synchronous process, it is preferable that the data contents and the correspondence are cancelled as late as possible. Meanwhile, when the contents of data are kept maintained, the free memory space is reduced, and this may cause a trouble in update and addition of data. On the other hand, when the data contents are deleted at earlier times, the free memory space can be made larger, but the amount of data transmitted in the synchronous period is increased.

Thus, when the correspondence cancelling means is provided, it is preferable that the correspondence cancelling means cancels the correspondence at a time when the amount of free memory space of the database managing device becomes not more than a predetermined threshold value. Note that, provided that the threshold value and the free memory space can be compared with each other, the threshold value may be the free memory space, or it may be set as a ratio of the free memory space to the memory space installed.

With this arrangement, as soon as the free memory space of the database managing device is reduced to be not more than the threshold value, the correspondence cancelling means cancels the correspondence and the data deleting means deletes the contents of the data whose correspondence have been cancelled. As a result, the required free memory space can be secured without unnecessarily increasing the amount of data transmitted in the synchronous process.

Also, regardless of whether the correspondence is cancelled at the value of not more than the threshold value, the correspondence cancelling means may estimate and compare a possibility that contents of data judged to be unnecessary will be transferred from the database managing device of the another party in the next synchronous process so as to cancel the correspondence in an order from data having a small possibility of being transferred. Note that, the possibility that the data contents will be transferred may be judged from the history of the previous synchronous processes, or it may be estimated based on an operation on the database managing device by the user, such as the estimation that the possibility of transfer is higher when the data are removed compared with the case where the data are deleted.

With this arrangement, the contents of data are maintained while the possibility that the data contents will be transferred from the database managing device of another party in the synchronous process is high, and the correspondence is cancelled at the time when the possibility becomes small. As a result, the amount of data transmitted in the synchronous process can be efficiently reduced.

Further, in the arrangement including the inside-outside judge synchronize means, it is preferable to include the corresponded data storing means, the correspondence cancelling means, and the data deleting means, and the synchronous process means, when a correspondence between state information which has been set inside the sub set by the inside-outside judge synchronize means and data is not stored in the corresponded data information storing means, receives contents of data corresponding to the data from the database managing device of the another party.

With this arrangement, in the synchronous process, the synchronous process means, referring to the corresponded data information storing means, replaces the contents of data with the contents of data received from the database managing device of another party, when data which do not correspond to the state information are placed inside the sub set. Thus, even when the contents of the data are deleted in a certain database managing device, the integrity of the data between the databases can be restored by the synchronous process.

Incidentally, in order to reduce the memory space required for storing the database, the data deleting means deletes the contents of data in the non-synchronous period. However, the memory space can also be reduced in the same manner even when the contents of data are deleted at the time when the synchronous process is finished.

Specifically, the database managing device (2) in accordance with the present invention having at least one database, as described, is for constituting a database system (1, 11) which includes a plurality of database managing devices and synchronous process means (synchronize processing section 51) for making a coincidence of corresponding data between databases (DB) respectively stored in the plurality of database managing devices which are ready to communicate, and the database managing device (2) includes: data deleting means (tip deletion processing section 43) for deleting, when the correspondence of data between the databases is cancelled, contents of the data from the at least one database at a time when the synchronous process is finished.

With this arrangement, the data whose correspondence was cancelled by the synchronous process are data whose integrity is not required to be maintained, and in the subsequent synchronous processes, the contents these data are not transferred. Thus, by deleting the contents of these data by the data deleting means, it is possible to increase the free memory space for the database managing device without increasing the amount of data transferred in the synchronous process.

Further, in addition to the described arrangements, it is possible to include deletion selecting means (tip deletion processing section 43) for selecting whether data should be deleted by the data deleting means. Note that, when there exist plural correspondences of the sub sets between the databases, the selection may be made per correspondence or it may be set altogether.

With this arrangement, for example, in the case where the data placed outside of the sub set are to be reused, no deletion of data is selected, and when the free memory space is to be increased, rather than reuse of data, a selection can be made as desired as to whether the data should be deleted by the data deleting means, for example, by selecting the deletion of data, allowing setting in accordance with the request of the user.

Incidentally, in the synchronous process of data pairs between the databases, when whether data should be placed inside the sub set is judged based on the movement information and when the priority side of the data contents is judged based on the update information, there is a case where the database managing device given a priority when placement of the data is judged and the database managing device given a priority when the contents are judged are different from each other. Thus, when the understanding of the user is such that the priority sides are the same between the data placement and the data contents, this can be confusing to the user.

Thus, in the arrangement including the judging means, the judging means may also include inside region priority means (synchronize processing means 51) which gives a priority to contents of data of the each pair of data made corresponded to each other which exist inside respective sharing regions of the database managing device and the database managing device of the another party, rather than contents of data not existing in the sharing regions, irrespective of update information of the state information respectively corresponding to data of the each pair of data, the inside region priority means giving the priority when it is judged with respect to the each pair of data that the data exist in the respective sharing regions of the database managing device and the database managing device of the another party based on the state information stored in the state information storing means and the information received from the database managing device of the another party.

With this arrangement, in the synchronous process, the contents of data existing in the sharing region are given a priority. As a result, it is possible to make a coincidence between the side given the priority when the placement of data was judged and the side given the priority when data contents were judged, thus realizing the database managing device which does not present a confusion to the user.

Further, in addition to the described arrangements, it is preferable to include the inside-outside judge synchronize means having the described arrangements, and the inside region priority means changes update information of state information which was changed to be inside the sub set by the inside-outside judge synchronize means so that the update information indicates no update, and changes update information of state information which was not changed so that the update information indicates update.

With this arrangement, the inside region priority means updates the update information in accordance with the update of the movement information by the inside-outside judge synchronize means. Here, as described, when the inside-outside judge synchronize means and the inside region priority means update the state information, the amount of data transmitted between the database managing devices is considerably smaller than the contents of the data itself, and the result of judgement of each data pair is stored as the state information. Thus, even in the case where the synchronous process is interrupted, for example, by disconnection of the communications before the state information of all the data pairs is updated by the inside-outside judge synchronize means and the inside region priority means, the synchronous process can be restarted without a problem. As a result, even in the database managing device in which the synchronous process may be interrupted, as in the case of the synchronous process by communications, it is ensured that the integrity between the databases is maintained.

Also, when the inside region priority means is provided, it is preferable to include priority selecting means (synchronize processing section 51) for selecting whether to bring the inside region priority means into operation.

With this arrangement, it is possible to select whether the inside region priority means should be brought into operation, and this allows setting as desired by the user, thereby realizing the database managing device which is more user friendly.

Also, the database managing device (2) in accordance with the present invention having at least one database, as described, is for constituting a database system (1, 11) which includes a plurality of database managing devices, sharing setting means (sharing setting processing section 52) for specifying sharing regions (bag F), which store corresponding data (tip T), between databases (DB) before a synchronous process, and synchronous process means for making a coincidence of contents of corresponding data between the databases respectively stored in the plurality of database managing devices which are ready to communicate. The database managing device (2) has the following means.

Namely, there are provided: a plurality of priority side deciding means (synchronize processing section 51) for deciding a priority side in a non-synchronous period between a previous synchronous process and a next synchronous process when data changed in the corresponding data are plural, and for instructing the synchronous process means to replace data contents on a non-priority side with data contents on a priority side; and selecting means (synchronize processing section 51) for selecting, at a time of sharing setting, one of the plurality of priority side deciding means to be used.

With this arrangement, in the case where corresponding data are updated in the plurality of database managing devices (collision of data), the priority side is decided by the priority side deciding means which has been selected beforehand, and the contents of the data on the non-priority side are replaced with the contents of the data on the priority side. As a result, an increase in number of data in the database can be prevented, and the amount of data transmitted or processed in the synchronous process can be reduced.

Also, of the priority side deciding means which decide the priority side by different rules, one is selected. Thus, compared with the case where unnecessary data are deleted when instructing the priority side per data and at the time when the synchronous process is finished, the unnecessary data can be deleted with fewer operations.

Further, the priority side deciding means is selected at the time of the sharing setting in which the database managing devices are ready to communicate. Thus, the priority side deciding means which are agreed by the database managing devices can be used, and the database managing devices can refuse to use an undesirable priority side deciding means. As a result, a safer database managing system can be realized, as compared with the case where the selection is made at the time when the database managing devices are not in communications.

In addition to the described arrangements, it is also possible to include copying means (synchronize processing section 51) for adding the data changed to other databases in the non-synchronous period when data changed in the corresponding data are plural, and the selecting means selects one of (i) the plurality of priority side deciding means and (ii) the copying means.

With this arrangement, the selecting means selects the copying means at the time of the sharing setting, thus preventing unnecessary data from being deleted with certainty. As a result, the safety of the database managing device is further increased.

Also, the database managing device (2) in accordance with the present invention having at least one database, as described, is for constituting a database system (1, 11) which includes a plurality of database managing devices and synchronous process means (synchronize processing section 51) for making a coincidence of contents of corresponding data (tip T) between the databases (DB) respectively stored in the plurality of database managing devices which are ready to communicate, the synchronous process means making the correspondence based on instructions of the plurality of database managing devices. The database processing means (2) has the following means.

Namely, there is provided: priority side deciding means (synchronize processing section 51) for deciding, when data changed in the corresponding data are plural, a priority side in a non-synchronous period between a previous synchronous process and a next synchronous process based on a database managing device which instructed a start of the synchronous process, and the priority side deciding means for instructing the synchronous process means to replace data contents on a non-priority side with data contents on a priority side. Note that, the priority side deciding means may decide the priority side so that the priority side is given to the side (synchronous process promoting side) which instructed the start of the synchronous process, or to the side (synchronous process receiving side) which received the instruction for starting the synchronous process.

With this arrangement, in the synchronous process, in the case where data changed in the corresponding data pair are plural (collision of data), the data to be given the priority side are decided, and the contents on the non-priority side are replaced with the contents on the priority side. As a result, even when there is a collision of data, the number of data contained in the database can be maintained constant. Further, because the priority side is decided at the time of the synchronous process, compared with the conventional technique in which an additional step of deleting data on the non-priority side is required after the synchronous process, the number of steps can be reduced, and the amount of data transmitted or processed in the synchronous process can be reduced.

Also, because the priority side can be changed depending on whether the database managing device instructs the start of the synchronous process, the priority side can be changed with fewer steps than the case where an inquiry of the priority side is made per synchronous process.

Note that, even in the case where the database managing devices are equivalent, and which database managing device should be given a priority cannot be specified, the database managing devices, or their respective users, can recognize, from the operation on the database, whether the data have been changed, thus instructing the start of the synchronous process. Therefore, the priority side can be appropriately decided even when the database managing devices are equivalent.

Further, the database managing device (2) in accordance with the present invention having at least one database, as described, is for constituting a database system (1, 11) which includes a plurality of database managing devices, sharing setting means (sharing setting processing section 52) for specifying sharing regions (bag F), which store corresponding data (tip T), between databases based on instructions of the plurality of database managing devices before a synchronous process, and synchronous process means (synchronous process section 51) for making a coincidence of the corresponding data between the databases respectively stored in the plurality of database managing devices which are ready to communicate. The database managing device (2) has the following means.

Namely, there is provided: priority side deciding means (synchronize processing section 51) for deciding, when data changed in the corresponding data are plural, a priority side of the plural data in a non-synchronous period between a previous synchronous process and a next synchronous process in accordance with a database managing device which instructed sharing setting, and the priority side deciding means for instructing the synchronous process means to replace data contents on a non-priority side with data contents on a priority side. Note that, the priority side deciding means may decide the priority side so that the priority side is on the side (sharing promoting side) which instructed sharing, or on the side (sharing receiving side) which received the instruction of the sharing setting.

With this arrangement, as with the arrangement in which the priority side is decided based on the database managing device which instructed the synchronous process, the number of data contained in the database can be maintained constant, and the step of reducing the number of individual data can be omitted, and the amount of data transmitted or processed in the synchronous process can be reduced. Also, because the priority side can be changed depending on the database managing device which instructs the sharing setting, the priority side can be changed with fewer steps than the case where the priority side is decided separately from the sharing setting.

Note that, the described arrangements are suitable for the system in which the database managing device on the priority side can be fixed, for example, as in the case where a database system of a client/server type is structured from the database managing devices, and databases have the relationship of master and copy.

Meanwhile, the database managing device (2) in accordance with the present invention having at least one database, as described, is for constituting a database system (1, 11) which includes a plurality of database managing devices and synchronous process means (synchronize processing section 51) for making a coincidence of the corresponding data (tip T) between the databases (DB) respectively stored in the plurality of database managing devices which are ready to communicate, the synchronous process means making the correspondence based on instructions of the plurality of database managing devices. The database managing device (2) has the following means.

Namely, there is provided: priority side deciding means (synchronize processing section 51) for deciding, when data changed in the corresponding data are plural, a priority side by making an inquiry in a non-synchronous period between a previous synchronous process and a next synchronous process, and the priority side deciding means for instructing the synchronous process means to replace data contents on a non-priority side with data contents on a priority side.

With this arrangement, the priority side deciding means makes an inquiry to the upper application or the user as to which data should be given a priority, by presenting information indicative of a collision of data, or information indicative of a state of the data collision, for example, such as partial or entire contents of each data. Note that, the inquiry may be made per data or per synchronous process. The upper application or the user answers back by deciding the priority side based on the information presented, and instructs the synchronous process means to replace the data.

With this arrangement, as with the arrangement including the priority side deciding means, the number of data contained in the database can be maintained constant, and the amount of data transmitted or processed in the synchronous process can be reduced. Also, when making an inquiry per synchronous process, the priority side can be decided with a single answer, and even when the inquiry is made per data, the priority side can be decided only by giving back the answer per collision of data. Thus, compared with the conventional technique in which the data changed are all maintained at the time of the data collision and the collided data are extracted and deleted after the synchronous process, the number of steps in the operation can be reduced.

Incidentally, in the synchronous process, when the communications line between the database managing devices is to be maintained, the communications time is increased as a response time between the inquiry by the priority side deciding means and the answer becomes long, for example, as in the case where the user is not present, or complex arithmetics are required for the upper application to decide the priority side. As a result, in the case where an increase in communications fee is proportional to the communications time, for example, as in the case where the public phone lines are used, the communications fee required for the synchronous process may increase by a large amount. Also, in the event when the communications line or the database managing devices are occupied while maintaining the communications line, they cannot be used for other purposes.

Thus, when an inquiry is made by the priority side deciding means, it is preferable, in addition to the described arrangements, that the priority side deciding means disconnects communications with a database managing device of another party between the inquiry of the priority side and the replacement of data contents.

With this arrangement, the total communications time can be maintained constant regardless of the response time, and the communications time can be reduced compared with the case where the communications line is maintained during the response.

Also, regardless of the arrangement of individual priority side deciding means, the priority side deciding means may decide a priority side to be instructed to the synchronous process means based on the priority side decided and a priority side specified by the another party.

With this arrangement, the priority side deciding means decides the priority side based on not only the priority side decided within the device but also the priority side specified by other priority side deciding means. Thus, even when the database managing devices each has the priority side deciding means, and the priority sides are different between the devices, an appropriate priority side can be decided, for example, by reconsidering the priority side.

Meanwhile, regardless of the arrangement of individual priority side deciding means, and even when the priority side deciding means are not provided in the other database managing devices, the priority side deciding means may instruct the priority side decided to the synchronous process means when data changed in the corresponding data are plural and a priority side is not specified by a database managing device of the another party.

With this arrangement, even when there exists a database managing device which is not provided with the priority side deciding means in the database system, when at least one of the database managing devices in communications in the synchronous process is provided with the priority side deciding means, the priority side can be decided.

Also, as yet another arrangement of the priority side deciding means, the priority side deciding means may also decide a priority side when at least single data is changed in the corresponding data.

With this arrangement, the priority side deciding means also decides the priority side when at least one of the data is changed in the same manner as in a collision of data. Therefore, if the priority side has not been changed, the contents of the data on the non-priority side can be restored to the state before the update, thus ensuring download and upload.

Further, the database managing device (2) in accordance with the present invention having at least one database, as described, is for constituting a database system (1, 11) which includes a plurality of database managing devices and synchronous process means (synchronize processing section 51) for making a coincidence of corresponding data (tip T) between databases (DB) respectively stored in the plurality of database managing devices which are ready to communicate. The database managing device (2) has the following means.

Namely, there is provided: sharing setting means (sharing setting processing section 52) for specifying before a synchronous process a sharing region which stores the corresponding data between the databases, and the sharing setting means may newly create a sub set to be the sharing region in at least one of databases to which sharing was instructed. Note that, in the other sharing regions, a sub set which already exists may be specified, or the entire database may be specified, or alternatively a sub set may be created by the entire database.

With this arrangement, the sharing region can be specified independently from the size of the database, and it is not required to newly create the database only for sharing use. As a result, the memory space required for the database managing device can be reduced, and in the synchronous process, the amount of data transmitted or processed between the database managing devices can be reduced. Also, because whether to carry out the synchronous process can be decided by whether the data are contained in the sharing region, compared with the case where whether to carry out the synchronous process is specified per data, the number of steps in the sharing setting can be reduced.

Also, because the sub set is created in at least one of the databases, in the sharing setting, it is possible to make a correspondence between the sharing regions without instructing the database managing device which does not have corresponding data to create a new sub set, thereby further reducing the number of steps in the sharing setting.

Meanwhile, the database managing device (2) in accordance with the present invention having at least one database, as described, is for constituting a database system (1, 11) which includes a plurality of database managing devices and synchronous process means (synchronize processing section 51) for making a coincidence of corresponding data (tip T) between databases (DB) respectively stored in database managing devices which are ready to communicate. The database managing device (2) has the following means.

Namely, there is provided: sharing setting means (sharing setting processing section 52) for specifying a sharing region (bag F), which stores the corresponding data, between the databases at a time before the synchronous process, and the sharing setting means instructs, after sharing setting, the synchronous process means to carry out a synchronous process between sharing regions made corresponded to each other.

With this arrangement, the synchronous process is also carried out at the time of the sharing setting. Thus, after the sharing setting, the contents of the sharing regions can be made coincided without especially instructing the synchronous process.

The database managing device (2) in accordance with the present invention having at least one database, as described, is for constituting a database system (1, 11) which includes a plurality of database managing devices, sharing setting means (sharing setting processing section 52) for specifying sharing regions (bag F), which store corresponding data (tip T), between databases based on instructions of the plurality of database managing devices before a synchronous process, and synchronous process means (synchronize processing section 51) for making a coincidence of the corresponding data between the databases respectively stored in the plurality of database managing devices which are ready to communicate. The database managing device (2) has the following means. Namely, there is provided: sharing releasing means (sharing release processing section 53) for canceling a correspondence between the sharing regions specified by the sharing setting means, and the sharing releasing means instructs, before sharing release, the synchronous process means to carry out a synchronous process between the sharing regions made corresponded to each other.

With this arrangement, the synchronous process is also carried out at the time of the sharing setting. Thus, the sharing can be released prior to the sharing setting without especially instructing the synchronous process while maintaining the coincided state of the contents between the sharing regions.

Also, the database managing device (2) in accordance with the present invention having at least one database, as described, is for constituting a database system (1, 11) which includes a plurality of database managing devices, sharing setting means (sharing setting processing section 52) for specifying sharing regions (bag F), which store corresponding data (tip T), between databases before a synchronous process, and synchronous process means (synchronize processing section 51) for making a coincidence of the corresponding data between the databases respectively stored in the plurality of database managing devices which are ready to communicate. The database managing device (2) has the following means.

Namely, there is provided: sharing releasing means (sharing release processing section 53) for cancelling a correspondence between the sharing regions specified by the sharing setting means, and the sharing releasing means deletes data contained in at least one of the sharing regions. Note that, the sharing releasing means may cancel the data with respect to all the sharing regions.

Incidentally, in the synchronous process, all the data in the sharing region are made corresponded with the data in the sharing region of another party, and the contents of the data are transferred in accordance with the presence or absence of a change in data of respective parties. Thus, the amount of data transferred or processed is increased as the number of data contained in the sharing region is increased.

Also, after the sharing setting, the corresponding data remain in their respective database managing devices. As a result, the amount of data of the whole database system tend to be large compared with the amount before the sharing setting. Here, when unnecessary data of the corresponding data are to be deleted, it is required to instruct deletion of data in each database managing devices, which is troublesome.

On the other hand, with the above arrangement, the sharing setting is released at the time when the synchronous process is not required. As a result, the sharing region is prevented from being increased unnecessarily, and the amount of data transmitted or processed in the sharing setting can be reduced. Further, in the sharing setting, it is possible to delete data which are contained in at least one of the sharing regions, without instructing deletion of data in the sharing region. As a result, the amount of data contained in the whole database system can be reduced without increasing the number of steps in the operation.

Further, in addition to the described arrangements, the sharing releasing means may delete no data in one of the sharing regions whose correspondence is to be cancelled, and delete data in the other of the sharing regions.

Incidentally, after the sharing setting, when the corresponding data remain in the plurality of database managing devices, there is a case where the data are changed independently in each device. Thus, in order to make a correspondence of these data again, for example, it is required to treat the data as being different, or make a correspondence by referring to the contents of the data. Thus, when the sharing release and the sharing setting are repeated, the amount of data contained in each database managing device may be increased, or complex operations and arithmetics may be required in making a correspondence.

However, with the above arrangement, in the sharing release, only the data of the corresponding data which exist in a certain sharing region remain. Thus, even when the sharing release and the sharing setting are repeated, it is possible to prevent an increase in the amount of data in the database system, and the procedure of making the correspondence can be simplified, and an increase in the arithmetic volume can be suppressed.

The database managing device (2) in accordance with the present invention having at least one database, as described, is for constituting a database system (1, 11) which includes a plurality of database managing devices, sharing setting means (sharing setting processing section 52) for specifying sharing regions (bag F), which store corresponding data (tip T), between databases based on instructions of the plurality of database managing devices before a synchronous process, and synchronous process means (synchronize processing section 51) for making a coincidence of the corresponding data between the databases respectively stored in the plurality of database managing devices which are ready to communicate, and the database managing device (2) includes sharing releasing means (sharing release processing section 53) for cancelling a correspondence of the sharing regions (bag F) specified by the sharing setting means, and the sharing releasing means deletes at least one of sub sets (bag F) to be the sharing regions.

With this arrangement, the sharing setting can be cancelled at the time when the synchronous process is not required. As a result, it is possible to prevent the sharing region from being increased unnecessarily, and the amount of data transmitted or processed in the synchronous process can be reduced. Further, the number of sharing regions can be reduced at least by one without instructing the deletion of the sharing region. As a result, it is possible to reduce the memory space required in each database managing device without complicating the operations.

The database managing device (2) in accordance with the present invention having at least one database, as described, is for constituting a database system (1, 11) which includes a plurality of database managing devices, sharing setting means (sharing setting processing section 52) for specifying sharing regions (bag F), which store corresponding data (tip T), between databases based on instructions of the plurality of database managing devices before a synchronous process, and synchronous process means (synchronize processing section 51) for making a coincidence of the corresponding data between the databases respectively stored in the plurality of database managing devices which are ready to communicate. The database managing device (2) has the following means.

Namely, there are provided: a plurality of different sharing releasing means (sharing release processing section 53) including at least one of the sharing releasing means having the described arrangement; and selecting means for making a selection, at a time of sharing setting, as to which of the plurality of sharing releasing means should be used.

With this arrangement, the sharing setting is cancelled at the time when the synchronous process is not required. Thus, the sharing region is prevented from being increased unnecessarily, and the amount of data transmitted or processed in the synchronous process can be reduced.

Here, the sharing releasing means deletes data or the sharing region at least one of the database managing devices. Therefore, in the event where each database managing device can specify the sharing releasing means independently, there is a case where the data or sharing region is deleted undesirably by the sharing releasing means of another party.

On the other hand, with the above arrangement, the time the sharing releasing means is selected is limited to the time of the sharing setting, allowing the use of the sharing releasing means which is agreed by the database managing devices. As a result, each database managing device can reject the use of an undesirable sharing releasing means, and a safer database system is realized, as compared with the case where the selection is made independently by the database managing devices.

Incidentally, the database managing device may be realized by hardware, or, as described below, by execution of a predetermined program by a computer. Namely, a program for operating a computer in the same manner as the operations of the components of the abovedescribed database managing device is recorded on a recording medium such as a CD-ROM or a floppy disk for distribution, or alternatively, such a program is executed by a computer by transmitting the program via a communications line. As a result, the computer operates as the database managing device, and the same effect as that of the described database managing device is obtained.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A database managing device for constituting a database system which includes a plurality of database managing devices and synchronous process means for making a coincidence of corresponding data between databases respectively stored in the plurality of database managing devices which are ready to communicate, said database managing device comprising:

at least one database;

state information storing means for storing state information indicative of a change in data which occurs in a non-synchronous period between a previous synchronous process and a next synchronous process, said state information storing means storing the state information per data corresponding to data of a database of another party;

collision detecting means for detecting in a synchronous process whether data changed in a pair of the corresponding data are plural based on state information of each data of the pair; and priority side deciding means for deciding, when data changed are plural, which of the data should be given a priority before transmitting all contents of the plural data changed so that data contents on a non-priority side are replaced with data contents on a priority side by the synchronous process means.

2. The database managing device as set forth in claim 1, wherein said priority side deciding means decides the priority side by comparing respective partial contents of the plural data changed.

3. The database managing device as set forth in claim 1, wherein, when data changed are plural, said priority side deciding means makes an inquiry as to which of the data should be given a priority.

4. The database managing device as set forth in claim 3, wherein, when data changed are plural, said priority side deciding means decides the priority side by making an inquiry as to which of the data should be given a priority so as to instruct the priority side to the synchronous process means based on the priority side decided and a priority side specified by the another party, and said priority side deciding means disconnects communications with the another party between the inquiry and the instruction of the priority side.

5. The database managing device as set forth in claim 1, comprising:

priority side information storing means for storing priority side information indicative of which of the data should be given a priority when data changed are plural, wherein said priority side deciding means decides the priority side based on the priority side information.

6. The database managing device as set forth in claim 1, comprising:

detecting means for detecting a non-coincidence between the priority side decided by said priority side deciding means and a priority side specified by the another party.

7. The database managing device as set forth in claim 1, comprising:

sub set setting means for setting a sub set in said at least one database, wherein said state information storing means stores the state information with respect to data which had been contained, at a time of the previous synchronous process, in the sub set which was shared with the database of the another party.

8. The database managing device as set forth in claim 1, wherein the synchronous process means carries out the synchronous process with respect to data contained in a sharing region of each of the databases, said database managing device including sharing setting means for making a correspondence of sharing regions between said at least one database and the database of the another party.

9. The database managing device as set forth in claim 1, wherein the synchronous process means carries out the synchronous process with respect to data contained in a sharing region of each of the databases, said database managing device including sharing releasing means for cancelling a correspondence between sharing regions which are made corresponded to each other.

10. The database managing device as set forth in claim 1, comprising:

sharing setting means for specifying before a synchronous process a sharing region which stores the corresponding data between the databases, wherein said sharing setting means newly creates a sub set to be a sharing region in at least one of the databases to which sharing was instructed.

11. The database managing device as set forth in claim 1, comprising:

sharing setting means for specifying a sharing region, which stores the corresponding data, between the databases at a time before a synchronous process, wherein said sharing setting means instructs, after sharing setting, the synchronous process means to carry out a synchronous process between sharing regions made corresponded to each other.

12. The database managing device as set forth in claim 1, wherein said database system includes sharing setting means for specifying sharing regions, which store the corresponding data, between databases based on instructions of the plurality of database managing devices before a synchronous process, and wherein said database managing device comprises:

sharing releasing means for canceling a correspondence between the sharing regions specified by said sharing setting means, wherein said sharing releasing means instructs, before sharing release, the synchronous process means to carry out a synchronous process between the sharing regions made corresponded to each other.

13. The database managing device as set forth in claim 1, wherein said database system includes sharing setting means for specifying sharing regions, which store the corresponding data, between databases before a synchronous process, and wherein said database managing device comprises:

at least one sharing releasing means for cancelling a correspondence between the sharing regions specified by the sharing setting means, wherein one of said at least one sharing releasing means deletes data contained in at least one of the sharing regions.

14. The database managing device as set forth in claim 13, wherein said at least one sharing releasing means deletes no data in one of the sharing regions whose correspondence is to be cancelled, and deletes data in the other of the sharing regions.

15. The database managing device as set forth in claim 13, wherein:

said at least one sharing releasing means is plural, and said database managing device further includes selecting means for making, at a time of sharing setting, a selection as to which of said at least one sharing releasing means should be used.

16. The database managing device as set forth in claim 1, wherein said database system includes sharing setting means for specifying sharing regions, which store the corresponding data, between databases based on instructions of the plurality of database managing devices before a synchronous process, and wherein said database managing device comprises:

at least one sharing releasing means for cancelling a correspondence of the sharing regions specified by the sharing setting means, wherein one of said at least one sharing releasing means deletes at least one of sub sets to be the sharing regions.

17. The database managing device as set forth in claim 16, wherein:

said at least one sharing releasing means is plural, and said database managing device further includes selecting means for making a selection, at a time of sharing setting, as to which of said at least one sharing releasing means should be used.

18. A recording medium recording a program for managing and making a coincidence of contents of corresponding data between a plurality of databases, said recording medium recording a program for operating a computer, the program being recorded in a form of:

at least one database;

state information storing means for storing state information indicative of a change in data which occurs in a non-synchronous period between a previous synchronous process and a next synchronous process, said state information storing means storing the state information per data corresponding to data of a database of another party, the synchronous process for making a coincidence of corresponding data between a plurality of databases respectively stored in a plurality of database managing devices which are ready to communicate;

collision detecting means for detecting in the synchronous process whether data changed in a pair of the corresponding data are plural based on state information of each data of the pair; and priority side deciding means for deciding, when data changed are plural, which of the data should be given a priority before transmitting all contents of the plural data changed so that data contents on a non-priority side are replaced with data contents on a priority side by the synchronous process means.

19. A method for managing a database, comprising the steps of:

(1) managing and making a coincidence of contents of corresponding data between databases respectively stored in a plurality of database managing devices which are ready to communicate; and (2) updating state information indicative of a change in data, in which each of the plurality of database managing devices individually monitors a change in data in a non-synchronous period between a previous said step (1) and a next said step (1) per data corresponding to data of a database of another party, said step (1) including the steps of:

(i) detecting whether data changed in a pair of the corresponding data are plural based on state information of each data of the pair; and (ii) deciding, when data changed are plural, which of the data should be given a priority before transmitting all contents of the plural data changed so that data contents on a non-priority side are replaced with data contents on a priority side.

20. A database managing device for constituting a database system which includes a plurality of database managing devices and synchronous process means for making a coincidence of corresponding data between databases respectively stored in the plurality of database managing devices which are ready to communicate, said database managing device comprising:

at least one database;

sub set setting means for setting a sub set in said at least one database, the sub set being set as a sharing region with a database of another party;

state information storing means for storing state information with respect to data which had been contained in the sub set at least at a time when a previous synchronous process was finished, the state information including (a) update information indicative of whether the data had been updated in a non-synchronous period between the previous synchronous process and a next synchronous process and (b) movement information indicative of whether the data had been moved in and out of the sub set in the non-synchronous period; and state information update means for monitoring data whose corresponding state information is stored in said state information storing means so as to update respective state information of the data in the non-synchronous period.

21. The database managing device as set forth in claim 20, comprising the synchronous process means, said synchronous process means including:

correspond means for making a correspondence of data between the sharing region and a sharing region of the another party; and judging means for judging, with respect to each pair of data made corresponded to each other, whether it is required to transmit contents of the data based on the state information stored in said state information storing means and information received from a database managing device of the another party.

22. The database managing device as set forth in claim 21, wherein said judging means includes inside-outside judge synchronize means for setting the state information inside and outside of the sub set with respect to the each pair of data made corresponded to each other, said inside-outside judge synchronize means setting the state information inside the sub set when state information indicating that the data had been moved into and have been currently existing in the sub set is stored in at least one of the plurality of database managing devices, and when the state information of said database managing device indicates that the data are inside the sub set and the database managing device of the another party notifies that the data making up the each pair of data are inside the sharing region of the another party, and said inside-outside judge synchronize means setting the state information outside the sub set when otherwise.

23. The database managing device as set forth in claim 22, wherein said judging means includes:

priority side judging means for judging which data should be given a priority with respect to data pairs which exist inside the sharing region and the sharing region of the another party after the synchronous process, said priority side judging means carrying out the judgement by identifying the data pairs based on setting by said inside-outside judge synchronize means, when state information respectively corresponding to the data pairs indicate update, and when the database managing device of the another party notifies update of data making up the data pairs; and data contents synchronize means for replacing, when data to be given a priority is decided by said priority side judging means, contents of data on a non-priority side with contents of the data given a priority.

24. The database managing device as set forth in claim 22, comprising:

corresponded data information storing means for storing in the non-synchronous period whether data placed outside of the sub set and the state information correspond to each other;

correspondence cancelling means for cancelling a correspondence between data judged to be unnecessary in each of the plurality of the database managing devices and the state information so as to store resultant information in said corresponded data information storing means, said correspondence cancelling means cancelling the correspondence in the non-synchronous period with respect to the data placed outside of the sub set; and data deleting means for deleting contents of data which are not made corresponded to the state information, wherein said synchronous process means, when a correspondence between state information which has been set inside the sub set by said inside-outside judge synchronize means and data is not stored in said corresponded data information storing means, receives contents of data corresponding to the data from the database managing device of the another party.

25. The database managing device as set forth in claim 21, wherein said judging means includes:

priority side judging means for judging which of each pair of corresponding data should be given a priority with respect to data which exist inside the sharing region and the sharing region of the another party at least after the synchronous process, said priority side judging means carrying out the judgement when state information respectively corresponding to the each pair of corresponding data indicate update, and when the database managing device of the another party notifies update of data making up the each pair of corresponding data; and data contents synchronize means for replacing, when data to be given a priority is decided by said priority side judging means, contents of data on a non-priority side with contents of the data given a priority.

26. The database managing device as set forth in claim 21, wherein said judging means includes inside region priority means which gives a priority to contents of data of the each pair of data made corresponded to each other which exist inside respective sharing regions of said database managing device and the database managing device of the another party, rather than contents of data not existing in the sharing regions, irrespective of update information of the state information respectively corresponding to data of the each pair of data, said inside region priority means giving the priority when it is judged with respect to the each pair of data that the data exist in the respective sharing regions of said database managing device and the database managing device of the another party based on the state information stored in said state information storing means and the information received from the database managing device of the another party.

27. The database managing device as set forth in claim 26, wherein:

said judging means includes inside-outside judge synchronize means for setting the state information inside and outside of the sub set with respect to the each pair of data made corresponded to each other, said inside-outside judge synchronize means setting the state information inside the sub set when state information indicating that the data had been moved into and have been currently existing in the sub set is stored in at least one of the plurality of database managing devices, and when the state information of said database managing device indicates that the data are inside the sub set and the database managing device of the another party notifies that the data making up the each pair of data are inside the sharing region, and said inside-outside judge synchronize means setting the state information outside the sub set when otherwise, and said inside region priority means changes update information of state information which was changed to be inside the sub set by said inside-outside judge synchronize means so that the update information indicates no update, and changes update information of state information which was not changed so that the update information indicates update.

28. The database managing device as set forth in claim 26, comprising:

priority selecting means for selecting whether to bring said inside region priority means into operation.

29. The database managing device as set forth in claim 20, comprising:

corresponded data information storing means for storing in the non-synchronous period whether data placed outside of the sub set and the state information correspond to each other;

correspondence cancelling means for cancelling a correspondence between data judged to be unnecessary in each of the plurality of the database managing devices and the state information so as to store resultant information in said corresponded data information storing means, said correspondence cancelling means cancelling the correspondence with respect to the data placed outside of the sub set in the non-synchronous period; and data deleting means for deleting contents of data which are not made corresponded to the state information.

30. The database managing device as set forth in claim 29, wherein said correspondence cancelling means cancels the correspondence at a time when an amount of free memory space of said database managing device becomes not more than a predetermined threshold value.

31. The database managing device as set forth in claim 29, wherein said correspondence cancelling means estimates and compares a possibility that contents of data judged to be unnecessary will be transferred from the database managing device of the another party in the next synchronous process so as to cancel the correspondence in an order from data having a small possibility of being transferred.

32. The database managing device as set forth in claim 29, wherein said data deleting means deletes the contents of the data when the synchronous process is finished.

33. The database managing device as set forth in claim 32, comprising:

deletion selecting means for selecting whether data should be deleted by said data deleting means.

34. A database managing device, comprising:
at least one database;
communication means for communicating with another database managing device; and synchronous process means for making a coincidence of corresponding data between a database stored in the another database managing device and said at least one database,
said synchronous process means including:
correspond means for making a correspondence between data inside a sharing region of said database managing device and data inside a sharing region of the another database managing device; and
judging means for judging, with respect to each pair of data made corresponded to each other, whether it is required to transmit contents of the data based on state information stored in state information storing means of the another database managing device and information received from the another database managing device,
wherein the another database managing device is for constituting a database system which includes a plurality of database managing devices and synchronous process means for making a coincidence of corresponding data between databases respectively stored in the plurality of database managing devices which are ready to communicate, the another database managing device comprising:
at least one database;
sub set setting means for setting a sub set in said at least one database thereof, the sub set being set as a sharing region with a database of another party;
state information storing means for storing state information with respect to data which had been contained in the sub set at least at a time when a previous synchronous process was finished, the stare information including (a) update information indicative of whether the data had been updated in a non-synchronous period between the previous synchronous process and a next synchronous process and (b) movement information indicative of whether the data had been moved in and out of the sub set in the non-synchronous period; and
state information update means for monitoring data whose corresponding state information is stored in said state information storing means so as to update respective state information of the data in the non-synchronous period.

35. The database managing device as set forth in claim 20, wherein:
said sub set setting means specifies the sharing region before a synchronous process,
wherein said sub set setting means newly sets a sub set to be a sharing region in at least one of the databases to which sharing was instructed.

36. The database managing device as set forth in claim 20, wherein:
said sub set setting means specifies sharing regions, which store the corresponding data, between the databases at a time before a synchronous process,
wherein said sub set setting means instructs, after sharing setting, the synchronous process means to carry out a synchronous process between sharing regions made corresponded to each other.

37. The database managing device as set forth in claim 20, comprising:
sharing releasing means for canceling a correspondence between sharing regions,
wherein said sharing releasing means instructs, before sharing release, the synchronous process means to carry out a synchronous process between sharing regions made corresponded to each other.

38. The database managing device as set forth in claim 20, comprising:
at least one sharing releasing means for canceling a correspondence between sharing regions,
wherein one of said at least one sharing releasing means deletes data contained in at least one of the sharing regions.

39. The database managing device as set forth in claim 20, comprising:
at least one sharing releasing means for canceling a correspondence of sharing regions,
wherein one of said at least one sharing releasing means deletes at least one of sub sets to be the sharing regions.

40. A recording medium recording a program for managing and making a coincidence of contents of corresponding data between a plurality of databases,
said recording medium recording a program for operating a computer, the program being recorded in a form of:
at least one database;
sub set setting means for setting a sub set in said at least one database, the sub set being set as a sharing region with a database stored in a database managing device of another party;
state information storing means for storing state information with respect to data which had been contained in the sub set at least at a time when a previous synchronous process was finished, the synchronous process for making a coincidence of corresponding data between the plurality of databases respectively stored in a plurality of database managing devices which are ready to communicate, the state information including (a) update information indicative of whether the data had been updated in a non-synchronous period between the previous synchronous process and a next synchronous process and (b) movement information indicative of whether the data had been moved in and out of the sub set in the non-synchronous period; and
state information update means for monitoring data whose corresponding state information is stored in said state information storing means so as to update respective state information of the data in the non-synchronous period.

41. A recording medium recording a program for operating a computer, the program being recorded in a form of:
(1) at least one database;
(2) communications means for communicating with a database managing device which includes state information storing means storing state information with respect to data which had been contained in a sub set as a sharing region at least at a time when a previous synchronous process was finished, the state information including (a) update information indicative of whether the data had been updated in a non-synchronous period between the previous synchronous process and a next synchronous process and (b) movement information indicative of whether the data had been moved in and out of the sub set in the non-synchronous period; and
(3) synchronous process means for making a coincidence of contents of corresponding data between the sharing region of said at least one database and the sub set at a time when the database managing device and said computer are ready to communicate, said synchronous process means including correspond means for making a correspondence between data of the sharing region of said at least one database and data of the subset, and judging means for judging, with respect to each pair of data made corresponded to each other, whether it is required to transmit contents of the data based on the state information stored in the state information storing means.

42. A method for managing a database, comprising the steps of:
(1) managing and making a coincidence of contents of corresponding data between databases respectively stored in a plurality of database managing devices which are ready to communicate;
(2) setting a sub set in a database, the sub set being set as a sharing region with a database of another party; and
(3) monitoring a change in data in a non-synchronous period between a previous said step (1) and a next said step (2) with respect to data which had been contained in the sub set at least at a time when the previous said step (1) was finished, said step (3) being individually carried out by the plurality of database managing devices,
wherein said step (3) updates state information which includes (a) update information indicative of whether data had been updated in the non-synchronous period and (b) movement information indicative of whether the data had been moved in and out of the sub set in the non-synchronous period.

43. A database managing device for constituting a database system which includes a plurality of database managing devices and synchronous process means for making a coincidence of corresponding data between databases respectively stored in the plurality of database managing devices which are ready to communicate,
said database managing device comprising:
at least one database;
order storing means for storing an order of data which are contained at least in a sharing region of said database managing device and for setting a same order of data with that of another party in a previous synchronous process;
corresponded order storing means for storing a corresponded order indicative of a last position of the order in the previous synchronous process; and
order managing means for managing an order of data so that the corresponded order and an order before the corresponded order of the order stored in said order storing means are maintained in a non-synchronous period between the previous synchronous process and a next synchronous process, and data newly contained in the sharing region in the non-synchronous period are placed after the corresponded order.

44. The database managing device as set forth in claim 43, comprising the synchronous process means,
wherein said synchronous process means carries out a synchronous process by communicating with a database managing device of the another party storing a database, and
said synchronous process means includes:
data adding means for adding, with respect to data existing in the sharing region, data whose order stored in said order storing means is after the corresponded order to a sharing region of the another party;
added data correspond means for updating, with respect to data added to the sharing region of the another party, at least one of said order storing means and order storing means of the another party so that the order stored in said order storing means and an order stored in the order storing means of the another party are made coincided and are before respective orders of data which have not been made corresponded to each other between the both parties; and
corresponded order updating means for updating the corresponded order.

45. The database managing device as set forth in claim 43, comprising:
first order deleting means for deleting from said order storing means data whose order is after the corresponded order and which are not contained in the sharing region.

46. The database managing device as set forth in claim 43, comprising:
second deleting means for deleting in the synchronous process an order corresponding to data which are not contained in the sharing region and the sharing region of the another party, the order being deleted from the respective order storing means of the both parties.

47. The database managing device as set forth in claim 43, comprising:
state information storing means for storing state information with respect to data which had been contained in the sharing region at least at a time when the previous synchronous process was finished, the state information including update information indicative of whether the data had been updated in the non-synchronous period; and
state information update means for monitoring in the non-synchronous period data whose corresponding state information is stored in said state information storing means so as to update state information of the data,
wherein said order storing means stores an order of the data as an order of storing state information corresponding to the data.

48. The database managing device as set forth in claim 47, comprising:
sub set setting means for setting a sub set in said at least one database, the sub set being set as a sharing region with a database of another party,
wherein the state information includes movement information indicative of whether the corresponding data have been moved in and out of the sub set in the non-synchronous period.

49. The database managing device as set forth in claim 47, comprising the synchronous process means,
wherein said synchronous process means carries out a synchronous process by communicating with a database managing device of the another party storing the database, and
said synchronous process means transmits state information of the corresponding data in an order in accordance with the order stored in said order storing means.

50. The database managing device as set forth in claim 43, comprising:
sharing setting means for specifying sharing regions before a synchronous process,
wherein said sharing setting means newly creates a sub set to be a sharing region in at least one of the databases to which sharing was instructed.

51. The database managing device as set forth in claim 43, comprising:
sharing setting means for specifying sharing regions, which store the corresponding data, between the databases at a time before a synchronous process,
wherein said sharing setting means instructs, after sharing setting, the synchronous process means to carry out a synchronous process between sharing regions made corresponded to each other.

52. The database managing device as set forth in claim 43, wherein said database system includes sharing setting means for specifying sharing regions, which store the corresponding data, between databases based on instructions of the plurality of database managing devices before a synchronous process, and wherein said database managing device comprises:
sharing releasing means for canceling a correspondence between the sharing regions specified by said sharing setting means,
wherein said sharing releasing means instructs, before sharing release, the synchronous process means to carry out a synchronous process between the sharing regions made corresponded to each other.

53. The database managing device as set forth in claim 43, wherein said database system includes sharing setting means for specifying sharing regions, which store the corresponding data, between databases before a synchronous process, and wherein said database managing device comprises:
at least one sharing releasing means for canceling a correspondence between the sharing regions specified by the sharing setting means,
wherein one of said at least one sharing releasing means deletes data contained in at least one of the sharing regions.

54. The database managing device as set forth in claim 43, wherein said database system includes sharing setting means for specifying sharing regions, which store the corresponding data, between databases based on instructions of the plurality of database managing devices before a synchronous process, and wherein said database managing device comprises:
at least one sharing releasing means for canceling a correspondence of the sharing regions specified by the sharing setting means,
wherein one of said at least one sharing releasing means deletes at least one of sub sets to be the sharing regions.

55. A recording medium recording a program for managing and making a coincidence of corresponding data between a plurality of databases,
said recording medium recording a program for operating a computer, the program being recorded in a form of:
at least one database;
order storing means for storing an order of data which are contained at least in a sharing region of the computer and for setting a same order of data with that of another party in a previous synchronous process, the synchronous process for making a coincidence of corresponding data between the plurality of databases respectively stored in a plurality of database managing devices which are ready to communicate,
corresponded order storing means for storing a corresponded order indicative a last position of the order in the previous synchronous process; and
order managing means for managing an order of data so that the corresponded order and an order before the corresponded order of the order stored in said order storing means are maintained in a non-synchronous period between the previous synchronous process and a next synchronous process, and data newly contained in the sharing region in the non-synchronous period are placed after the corresponded order.

56. A method for managing a database, comprising the steps of:
(1) managing and making a coincidence of data which correspond to each other between databases respectively stored in a plurality of database managing devices which are ready to communicate;
(2) storing the correspondence of the data between the databases, the correspondence being stored as an order of the data,
wherein said step (2) includes the steps of:
(i) setting a same order of data as that of another party in a previous said step (1);
(ii) storing a corresponded order indicative of a last position of the order in the previous said step (1); and
(iii) managing order of data which are contained at least in a sharing region of a party to which the method is applied in a non-synchronous period between the previous said step (1) and a next said step (1) so that the corresponded order and an order before the corresponded order are maintained, and that data newly contained in the sharing region in the non-synchronous period are placed after the corresponded order.

57. A database managing device for constituting a database system which includes a plurality of database managing devices, sharing setting means for specifying sharing regions, which store corresponding data, between databases before a synchronous process, and synchronous process means for making a coincidence of contents of corresponding data between the databases respectively stored in the plurality of database managing devices which are ready to communicate,
said database managing device comprising:
a plurality of priority side deciding means for deciding a priority side when data changed in the corresponding data in a non-synchronous period between a previous synchronous process and a next synchronous process are plural, and for instructing the synchronous process means to replace data contents on a non-priority side with data contents on a priority side;
at least one database; and
selecting means for selecting, at a time of sharing setting, one of said plurality of priority side deciding means to be used.

58. The database managing device as set forth in claim 57, further comprising:
copying means for adding the data changed to other databases in the non-synchronous period when data changed in the corresponding data are plural,
wherein said selecting means selects one of (i) said plurality of priority side deciding means and (ii) said copying means.

59. The database managing device as set forth in claim 57, wherein one of said plurality of priority side deciding means decides a priority side to be instructed to the synchronous process means, based on the priority side decided and a priority side specified by another party.

60. The database managing device as set forth in claim 57, wherein one of said plurality of priority side deciding means instructs the priority side decided to the synchronous process means when data changed in the corresponding data are plural and a priority side is not specified by another party.

61. The database managing device as set forth in claim 57, wherein one of said plurality of priority side deciding means also decides the priority side when at least single data is changed in the corresponding data.

62. The database managing device as set forth in claim 57, wherein said sharing setting means newly creates a sub set to be a sharing region in at least one of the databases to which sharing was instructed.

63. The database managing device as set forth in claim 57, wherein said sharing setting means instructs, after sharing setting, the synchronous process means to carry out a synchronous process between sharing regions made corresponded to each other.

64. The database managing device as set forth in claim 57, wherein said sharing setting means specifies the sharing regions based on instructions of the plurality of database managing devices before a synchronous process, and wherein said database managing device comprises:
    sharing releasing means for canceling a correspondence between the sharing regions specified by said sharing setting means,
    wherein said sharing releasing means instructs, before sharing release, the synchronous process means to carry out a synchronous process between the sharing regions made corresponded to each other.

65. The database managing device as set forth in claim 57, comprising:
    at least one sharing releasing means for canceling a correspondence between the sharing regions specified by the sharing setting means,
    wherein one of said at least one sharing releasing means deletes data contained in at least one of the sharing regions.

66. The database managing device as set forth in claim 57, wherein said sharing setting means specifies the sharing regions based on instructions of the plurality of database managing devices before a synchronous process, and wherein said database managing device comprises:
    at least one sharing releasing means for canceling a correspondence of the sharing regions specified by the sharing setting means,
    wherein one of said at least one sharing releasing means deletes at least one of sub sets to be the sharing regions.

67. A recording medium recording a program for managing and making a coincidence of corresponding data between a plurality of databases,
    said recording medium recording a program for operating a computer, the program being recorded in a form of:
        at least one database;
        a plurality of priority side deciding means for deciding, when data changed in the corresponding data in a non-synchronous period between a previous synchronous process and a next synchronous process are plural, a priority side to be used for replacing data contents on a non-priority side with data contents on a priority side, the synchronous process for making a coincidence of contents of corresponding data between databases respectively stored in database managing devices which are ready to communicate; and
        selecting means for selecting one of said plurality of priority side deciding means to be used at a time, prior to the synchronous process, of sharing setting for specifying sharing regions which store corresponding data between databases.

68. A method for managing a database, comprising the steps of:
    (1) managing same contents of data which correspond to each other between databases respectively stored in database managing devices which are ready to communicate;
    (2) specifying, at a time before said step (1), sharing regions which store the corresponding data between the databases;
    (3) selecting, at a time of said step (2), one of plural priority side selecting methods to be used; and
    (4) deciding, when data changed in the corresponding data in a non-synchronous period between a previous said step (1) and a next said step (1) are plural, a priority side of the plural data in accordance with a priority side deciding method selected in said step (3) so as to replace data contents on a non-priority side with data contents on a priority side.

69. A database managing device for constituting a database system which includes a plurality of database managing devices and synchronous process means for making a coincidence of contents of corresponding data between the databases respectively stored in the plurality of databases which are ready to communicate, the synchronous process means making the correspondence based on instructions of the plurality of database managing devices,
    said database managing device comprising:
        at least one database; and
        priority side deciding means for deciding, when data changed in the corresponding data in a non-synchronous period between a previous synchronous process and a next synchronous process are plural, a priority side based on a database managing device which instructed a start of the synchronous process, and said priority side deciding means for instructing the synchronous process means to replace data contents on a non-priority side with data contents on a priority side.

70. The database managing device as set forth in claim 69, wherein said priority side deciding means decides a priority side to be instructed to the synchronous process means based on the priority side decided and a priority side specified by another party.

71. The database managing device as set forth in claim 69, wherein said priority side deciding means instructs the priority side decided by said database managing device to the synchronous process means when data changed in the corresponding data are plural and when a priority side is not specified by another party.

72. The database managing device as set forth in claim 69, wherein said priority side deciding means also decides the priority side when at least single data is changed in the corresponding data.

73. The database managing device as set forth in claim 69, comprising:
    sharing setting means for specifying before a synchronous process sharing regions which store the corresponding data between the databases,
    wherein said sharing setting means newly creates a sub set to be a sharing region in at least one of the databases to which sharing was instructed.

74. The database managing device as set forth in claim 69, comprising:
    sharing setting means for specifying sharing regions, which store the corresponding data, between the databases at a time before a synchronous process, wherein said sharing setting means instructs, after sharing setting, the synchronous process means to carry out a synchronous process between sharing regions made corresponded to each other.

75. The database managing device as set forth in claim 69, wherein said database system includes sharing setting means for specifying sharing regions, which store the corresponding data, between databases based on instructions of the plurality of database managing devices before a synchronous process, and wherein said database managing device comprises:

sharing releasing means for canceling a correspondence between the sharing regions specified by said sharing setting means, wherein said sharing releasing means instructs, before sharing release, the synchronous process means to carry out a synchronous process between the sharing regions made corresponded to each other.

76. The database managing device as set forth in claim 69, wherein said database system further includes sharing setting means for specifying sharing regions, which store the corresponding data, between databases before a synchronous process, and wherein said database managing device comprises:

at least one sharing releasing means for canceling a correspondence between the sharing regions specified by the sharing setting means, wherein one of said at least one sharing releasing means deletes data contained in at least one of the sharing regions.

77. The database managing device as set forth in claim 69, wherein said database system includes sharing setting means for specifying sharing regions, which store the corresponding data, between databases based on instructions of the plurality of database managing devices before a synchronous process, and wherein said database managing device comprises:

at least one sharing releasing means for canceling a correspondence of the sharing regions specified by the sharing setting means, wherein one of said at least one sharing releasing means deletes at least one of sub sets to be the sharing regions.

78. A recording medium recording a program for managing same contents of corresponding data between a plurality of databases, said recording medium recording a program for operating a computer, the program being recorded in a form of:
at least one database;
priority side deciding means for deciding, when data changed in the corresponding data in a non-synchronous period between a previous synchronous process and a next synchronous process are plural, a priority side to be used for replacing data contents on a non-priority side with data contents on a priority side, the priority side being decided based on a party which instructed a start of the synchronous process, the synchronous process for making a coincidence of contents of corresponding data between databases respectively stored in database managing devices which are ready to communicate.

79. A method for managing a database, comprising the steps of:

(1) managing same contents of data which correspond to each other between databases respectively stored in database managing devices which are ready to communicate; and (2) deciding, when data changed in the corresponding data in a non-synchronous period between a previous said step (1) and a next said step (1) are plural, a priority side of the plural data in accordance with a database managing device which instructed a start of the synchronous process so as to replace data contents on a non-priority side with data contents on a priority side.

80. A database managing device for constituting a database system which includes a plurality of database managing devices, sharing setting means for specifying sharing regions, which store corresponding data, between databases based on instructions of the plurality of database managing devices before a synchronous process, and synchronous process means for making a coincidence of the corresponding data between the databases respectively stored in the plurality of database managing devices which are ready to communicate, said database managing device comprising:
at least one database;
priority side deciding means for deciding, when data changed in the corresponding data in a non-synchronous period between a previous synchronous process and a next synchronous process are plural, a priority side of the plural data in accordance with a database managing device which instructed sharing setting, and said priority side deciding means for instructing the synchronous process means to replace data contents on a non-priority side with data contents on a priority side.

81. The database managing device as set forth in claim 80, wherein said priority side deciding means decides a priority side to be instructed to the synchronous process means based on the priority side decided and a priority side instructed from another party.

82. The database managing device as set forth in claim 80, wherein said priority side deciding means instructs the priority side decided to the synchronous process means when data changed in the corresponding data are plural and a priority side is not specified by a database managing device of another party.

83. The database managing device as set forth in claim 80, wherein said priority side deciding means also decides the priority side when at least single data is changed in the corresponding data.

84. The database managing device as set forth in claim 80, wherein said sharing setting means newly creates a sub set to be a sharing region in at least one of the databases to which sharing was instructed.

85. The database managing device as set forth in claim 80, wherein said sharing setting means instructs, after sharing setting, the synchronous process means to carry out a synchronous process between sharing regions made corresponded to each other.

86. The database managing device as set forth in claim 80, comprising:

sharing releasing means for canceling a correspondence between the sharing regions specified by said sharing setting means, wherein said sharing releasing means instructs, before sharing release, the synchronous process means to carry out a synchronous process between the sharing regions made corresponded to each other.

87. The database managing device as set forth in claim 80, comprising:

at least one sharing releasing means for canceling a correspondence between the sharing regions specified by the sharing setting means, wherein one of said at least one sharing releasing means deletes data contained in at least one of the sharing regions.

88. The database managing device as set forth in claim 80, comprising:
at least one sharing releasing means for canceling a correspondence of the sharing regions specified by the sharing setting means,
wherein one of said at least one sharing releasing means deletes at least one of sub sets to be the sharing regions.

89. A recording medium recording a program for managing same contents of corresponding data between a plurality of databases,
said recording medium recording a program for operating a computer, the program being recorded in a form of:
at least one database;
priority side deciding means for deciding, when data changed in the corresponding data in a non-synchronous period between a previous synchronous process and a next synchronous process are plural, a priority side to be used for replacing data contents on a non-priority side with data contents on a priority side based on a party which instructed sharing setting, the priority side being decided at a time, before a synchronous process, of sharing setting for specifying sharing regions which store the corresponding data between the plurality of databases, the synchronous process for making a coincidence of contents of corresponding data between the plurality of databases respectively stored in database managing devices which are ready to communicate.

90. A method for managing a database, comprising the steps of:
(1) managing same contents of data which correspond to each other between databases respectively stored in database managing devices which are ready to communicate;
(2) specifying, at a time before said step (1), sharing regions which store the corresponding data between the databases; and
(3) deciding, when data changed in the corresponding data in a non-synchronous period between a previous synchronous process and a next synchronous process are plural, a priority side in accordance with a database managing device which instructed sharing setting so as to replace data contents on a non-priority side with data contents on a priority side.

91. A database managing device for constituting a database system which includes a plurality of database managing devices and synchronous process means for making a coincidence of the corresponding data between the databases respectively stored in the plurality of database managing devices which are ready to communicate, the synchronous process means making the correspondence based on instructions of the plurality of database managing devices,
said database managing device comprising:
at least one database; and
priority side deciding means for deciding, when data changed in the corresponding data in a non-synchronous period between a previous synchronous process and a next synchronous process are plural, a priority side by making an inquiry, and said priority side deciding means for instructing the synchronous process means to replace data contents on a non-priority side with data contents on a priority side.

92. The database managing device as set forth in claim 91, wherein said priority side deciding means disconnects communications with a database managing device of another party between the inquiry of the priority side and the replacement of data contents.

93. The database managing device as set forth in claim 91, wherein said priority side deciding means decides a priority side to be instructed to the synchronous process means based on the priority side decided and a priority side specified by another party.

94. The database managing device as set forth in claim 91, wherein said priority side deciding means instructs the priority side decided to the synchronous process means when data changed in the corresponding data are plural and a priority side is not specified by a database managing device of another party.

95. The database managing device as set forth in claim 91, wherein said priority side deciding means also decides a priority side when at least single data is changed in the corresponding data.

96. The database managing device as set forth in claim 91, comprising:
sharing setting means for specifying before a synchronous process sharing regions which store the corresponding data between the databases,
wherein said sharing setting means newly creates a sub set to be a sharing region in at least one of the databases to which sharing was instructed.

97. The database managing device as set forth in claim 91, comprising:
sharing setting means for specifying sharing regions, which store the corresponding data, between the databases at a time before a synchronous process,
wherein said sharing setting means instructs, after sharing setting, the synchronous process means to carry out a synchronous process between sharing regions made corresponded to each other.

98. The database managing device as set forth in claim 91, wherein said database system includes sharing setting means for specifying sharing regions, which store the corresponding data, between databases based on instructions of the plurality of database managing devices before a synchronous process, and wherein said database managing device comprises:
sharing releasing means for canceling a correspondence between the sharing regions specified by said sharing setting means,
wherein said sharing releasing means instructs, before sharing release, the synchronous process means to carry out a synchronous process between the sharing regions made corresponded to each other.

99. The database managing device as set forth in claim 91, wherein said database system includes sharing setting means for specifying sharing regions, which store the corresponding data, between databases before a synchronous process, and wherein said database managing device comprises:
at least one sharing releasing means for canceling a correspondence between the sharing regions specified by the sharing setting means,
wherein one of said at least one sharing releasing means deletes data contained in at least one of the sharing regions.

100. The database managing device as set forth in claim 91, wherein said database system includes sharing setting means for specifying sharing regions, which store the corresponding data, between databases based on instructions of the plurality of database managing devices before a synchronous process, and wherein said database managing device comprises:

at least one sharing releasing means for canceling a correspondence of the sharing regions specified by the sharing setting means, wherein one of said at least one sharing releasing means deletes at least one of sub sets to be the sharing regions.

101. A recording medium recording a program for managing same contents of corresponding data between a plurality of databases, said recording medium recording a program for operating a computer, the program being recorded in a form of:
at least one database;
priority side deciding means for deciding, when data changed in the corresponding data in a non-synchronous period between a previous synchronous process and a next synchronous process are plural, a priority side to be used for replacing data contents on a non-priority side with data contents on a priority side, the priority side being decided by making an inquiry, and the synchronous process for making a coincidence of contents of corresponding data between the plurality of databases respectively stored in database managing devices which are ready to communicate.

102. A method for managing a database, comprising the steps of:
(1) managing same contents of data which correspond to each other between databases respectively stored in database managing devices which are ready to communicate; and
(2) deciding, when data changed in the corresponding data in a non-synchronous period between a previous synchronous process and a next synchronous process are plural, a priority side by making an inquiry so as to replace data contents on a non-priority side with data contents on a priority side.

* * * * *